United States Patent
Tsutsui et al.

(10) Patent No.: US 10,252,557 B2
(45) Date of Patent: Apr. 9, 2019

(54) TRANSFER MATERIAL, IMAGE SUPPORT WITH COLORING MATERIAL-RECEIVING LAYER AND RECORDED MATTER, AND MANUFACTURING METHODS AND MANUFACTURING APPARATUS FOR THE SAME

(71) Applicant: CANON FINETECH INC., Misato-shi, Saitama (JP)

(72) Inventors: Takahiro Tsutsui, Matsudo (JP); Yusuke Sumikawa, Kashiwa (JP); Yuya Obata, Minaminagareyama (JP); Hiroyuki Ishinaga, Tokyo (JP); Hiromitsu Hirabayashi, Yokohama (JP)

(73) Assignee: CANON FINETECH NISCA INC., Misato-shi, Saitama (JP)

(*) Notice: Subject to any disclaimer, the term of this patent is extended or adjusted under 35 U.S.C. 154(b) by 169 days.

(21) Appl. No.: 14/886,779

(22) Filed: Oct. 19, 2015

(65) Prior Publication Data

US 2016/0114609 A1   Apr. 28, 2016

(30) Foreign Application Priority Data

Oct. 24, 2014  (JP) ................. 2014-217824
Oct. 24, 2014  (JP) ................. 2014-217825
(Continued)

(51) Int. Cl.
*B41M 5/50* (2006.01)
*B41M 5/48* (2006.01)
(Continued)

(52) U.S. Cl.
CPC ............ *B41M 5/48* (2013.01); *B41J 2/0057* (2013.01); *B41M 5/41* (2013.01); *B41M 5/506* (2013.01);
(Continued)

(58) Field of Classification Search
CPC ............................ B41M 5/506; B41M 5/508
See application file for complete search history.

(56) References Cited

U.S. PATENT DOCUMENTS

| | | |
|---|---|---|
| 4,923,848 A | 5/1990 | Akada et al. |
| 5,451,560 A | 9/1995 | Akada et al. |

(Continued)

FOREIGN PATENT DOCUMENTS

| | | |
|---|---|---|
| CN | 1553853 A | 12/2004 |
| CN | 101316717 A | 12/2008 |

(Continued)

OTHER PUBLICATIONS

Esin Gulari et al., "Photon Correlation Spectroscopy of Particle Distributions," 70(8) J. Chem. Phys. 3965-3972 (Apr. 1979).

(Continued)

*Primary Examiner* — Betelhem Shewareged
(74) *Attorney, Agent, or Firm* — Venable LLP

(57) ABSTRACT

Provided is a transfer material, including: a coloring material-receiving layer; and a base material sheet. The transfer material has a laminated structure in which the base material sheet and the coloring material-receiving layer are sequentially laminated, the coloring material-receiving layer contains at least inorganic fine particles, a water-soluble resin, and a cationic resin having a weight-average molecular weight of 15,000 or less, and a difference SP2 between a SP value of an image support onto which the transfer material is transferred and a SP value of the coloring material- (Continued)

receiving layer to be brought into abutment with the image support satisfies a relationship of $0 \leq SP2 \leq 1.0$.

15 Claims, 37 Drawing Sheets

(30) Foreign Application Priority Data

Aug. 7, 2015 (JP) .................................. 2015-156741
Oct. 8, 2015 (JP) .................................. 2015-200612

(51) Int. Cl.
  *B41M 5/52* (2006.01)
  *B41J 2/005* (2006.01)
  *B41M 5/41* (2006.01)
  *C09D 11/30* (2014.01)
  *B41M 5/025* (2006.01)
  *B41M 5/03* (2006.01)

(52) U.S. Cl.
  CPC .............. *B41M 5/508* (2013.01); *B41M 5/52* (2013.01); *B41M 5/5218* (2013.01); *C09D 11/30* (2013.01); *B41M 5/0256* (2013.01); *B41M 5/03* (2013.01); *B41M 5/502* (2013.01); *B41M 5/5245* (2013.01); *B41M 5/5254* (2013.01)

(56) References Cited

U.S. PATENT DOCUMENTS

| | | | |
|---|---|---|---|
| 5,629,259 A | | 5/1997 | Akada et al. |
| 5,695,588 A | | 12/1997 | Daems et al. |
| 5,707,925 A | | 1/1998 | Akada et al. |
| 5,766,398 A | * | 6/1998 | Cahill ................... B41M 5/0256 156/240 |
| 5,940,111 A | | 8/1999 | Akada et al. |
| 5,989,650 A | | 11/1999 | Inamoto et al. |
| 6,139,672 A | | 10/2000 | Sato et al. |
| 6,284,708 B1 | | 9/2001 | Oshima et al. |
| 6,392,680 B2 | | 5/2002 | Akada et al. |
| 6,773,770 B1 | * | 8/2004 | Sugiyama ................ B41M 5/52 347/105 |
| 6,917,375 B2 | | 7/2005 | Akada et al. |
| 6,979,141 B2 | | 12/2005 | Karst et al. |
| 7,037,013 B2 | | 5/2006 | Klinefelter et al. |
| 8,883,276 B2 | | 11/2014 | Asao |
| 9,022,509 B2 | | 5/2015 | Sonehara |
| 2002/0015828 A1 | * | 2/2002 | Ast ........................ B41M 3/12 428/195.1 |
| 2002/0127042 A1 | | 9/2002 | Klinefelter |
| 2003/0112311 A1 | | 6/2003 | Naik et al. |
| 2004/0146329 A1 | | 7/2004 | Klinefelter |
| 2005/0233902 A1 | | 10/2005 | Mizukami |
| 2008/0302470 A1 | | 12/2008 | Sumita et al. |
| 2009/0242114 A1 | | 10/2009 | Nishimura |
| 2009/0244248 A1 | | 10/2009 | Nakano et al. |

FOREIGN PATENT DOCUMENTS

| | | |
|---|---|---|
| EP | 0 799 712 A1 | 10/1997 |
| EP | 0 881 092 A2 | 12/1998 |
| EP | 0 968 836 A2 | 1/2000 |
| EP | 1 323 860 A1 | 7/2003 |
| JP | 56-120508 A | 9/1981 |
| JP | 62-238791 A | 10/1987 |
| JP | 11-277895 A | 10/1999 |
| JP | 2000-238439 A | 9/2000 |
| JP | 2002-200840 A | 7/2002 |
| JP | 2002-211148 A | 7/2002 |
| JP | 2002-283713 A | 10/2002 |
| JP | 2003-211761 A | 7/2003 |
| JP | 2003-312195 A | 11/2003 |
| JP | 2005-186486 A | 7/2005 |
| JP | 2005-199479 A | 7/2005 |
| JP | 2006-517871 A | 8/2006 |
| JP | 2008-044130 A | 2/2008 |
| JP | 2008-105356 A | 5/2008 |
| JP | 2009-018464 A | 1/2009 |
| JP | 2009-233970 A | 10/2009 |
| JP | 4956917 B2 | 6/2012 |
| JP | 2013-022826 A | 2/2013 |
| JP | 2013-136156 A | 7/2013 |
| JP | 2014-012400 A | 1/2014 |

OTHER PUBLICATIONS

Hans-Joachim Streitberger, "Löslichkeitsparameter," Georg Thieme Verlag KG, pp. 1-9; https://roempp.thieme.de/roempp4.0/do/data/RD-12-01482 (Jul. 2007) (XP055100021).

Extended European Search Report in European Application No. 15191203.7 (dated Mar. 3, 2016).

Notification of the First Office Action in Chinese Application No. 201510696324.8 (dated Jul. 20, 2017).

Notification of the Second Office Action in Chinese Application No. 201510696324.8 (dated Apr. 16, 2018).

* cited by examiner

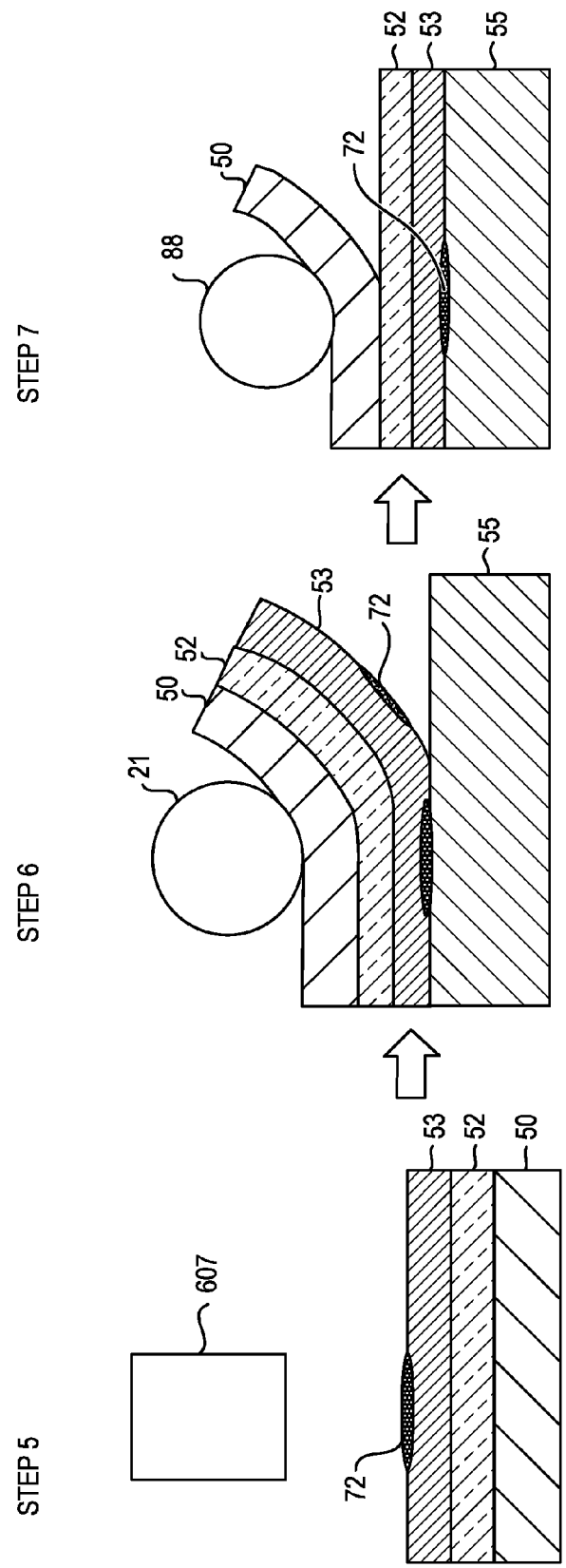

TRANSFER MATERIAL, IMAGE SUPPORT WITH COLORING MATERIAL-RECEIVING LAYER AND RECORDED MATTER, AND MANUFACTURING METHODS AND MANUFACTURING APPARATUS FOR THE SAME

BACKGROUND OF THE INVENTION

Field of the Invention

The present invention relates to a transfer material having a laminated structure in which a base material sheet and a coloring material-receiving layer are sequentially laminated, an image support with a coloring material-receiving layer and a recorded matter each using the transfer material, and manufacturing methods and manufacturing apparatus for the same.

Description of the Related Art

Various thermal transfer recording methods have heretofore been known. Of those, the following thermal transfer method is generally used (Japanese Patent Application Laid-Open No. S62-238791). An image is formed by heating a thermal transfer sheet, the sheet having formed on its base material sheet a colored transfer layer, from its back surface with a thermal head or the like according to the shape of the image to be formed to thermally transfer the colored transfer layer onto the surface of a thermal transfer image-receiving sheet. The thermal transfer method has been expanding its market as a full-color hard copy system for various images typified by computer graphics, still images provided by satellite communications, digital images recorded on CD-ROMs or the like, and analog images, such as a video, because of the development of various kinds of hardware and software related to multimedia.

When recorded matters are obtained by forming images on objects formed of various kinds of materials, such as paper, a resin product, and a metal, the images have heretofore been formed on the objects by thermal transfer systems. The thermal transfer systems are roughly classified into a thermal fusion transfer type and a sublimation transfer type depending on the construction of the colored transfer layer. Each of both systems can form a full-color image, and involves: preparing thermal transfer sheets for three to four colors, such as yellow, magenta, cyan, and black colors (as required); and superimposing and thermally transferring respective color images onto the surface of one thermal transfer image-receiving sheet to form the full-color image.

For example, the following recorded matter-manufacturing method has been proposed as a method of manufacturing a recorded matter involving employing a thermal fusion transfer-type thermal transfer system (Japanese Patent Application Laid-Open No. 2000-238439). A transfer material in which a receiving layer is provided on a base material in a peelable manner, and a thermal transfer sheet having a dye layer are used, an image is formed on the transfer material by transferring the dye of the dye layer onto the receiving layer, and then the recorded matter is manufactured by heating the transfer material under a state of being brought into abutment with an object to transfer the receiving layer onto the object.

A recorded matter-manufacturing method involving forming an image with a sublimation transfer-type thermal transfer sheet has also been proposed as a method of manufacturing a recorded matter involving employing a sublimation transfer-type thermal transfer system (Japanese Patent Application Laid-Open No. 2003-211761).

The sublimation transfer-type thermal transfer sheet enables precise formation of a gray-scale image, such as a face photograph. On the other hand, the image has the following inconvenience unlike an image formed by using an ordinary recording ink. The image is deficient in durability, such as weatherability, abrasion resistance, or chemical resistance. The following has been performed as a solution to the inconvenience (Japanese Patent Application Laid-Open No. 2008-044130). A protective layer thermal transfer film having a thermally transferable resin layer is superimposed on a thermal transfer image, and the thermally transferable resin layer having transparency is transferred with a thermal head, a heating roll, or the like to form a protective layer on the recorded image.

In addition, a method involving forming an image on an object by an inkjet system instead of forming the image by the thermal transfer system has been proposed. For example, there has been proposed a technology involving printing an image on the receiving layer of a transfer material by the inkjet system, and heating the transfer material and a transfer body, while superimposing the material and the body, to transfer the receiving layer onto the transfer body (Japanese Patent Translation Publication No. 2006-517871).

SUMMARY OF THE INVENTION

However, such method involving forming an image by the thermal transfer system as described in Japanese Patent Application Laid-Open No. 2008-044130 has involved a large problem in terms of productivity because of the following reason. While the forward and backward movements of the transfer body are repeated, the image transfer regions of the respective colors are sequentially transferred onto the thermal transfer film in the order of black, cyan, magenta, and yellow to form the image, and then the transparent protective layer is formed. In addition, the method involving forming an image by the thermal transfer system has involved a large problem in terms of information security because recorded information remains as a negative on the thermal transfer film and hence special consideration is needed for the disposal of the thermal transfer film after its use. Further, the thermal transfer system has involved a large problem in terms of its economic efficiency because of the following reason. When the system is adopted, the thermal transfer film corresponding to the entirety of a recording surface serving as an object is needed irrespective of the size and position of an image to be formed. Accordingly, the ratio of a recording cost concerning a non-recording portion that does not contribute to image formation is large.

The inkjet system has an advantage in that as compared to the thermal transfer system, the inkjet system enables high-definition printing and can perform full-color printing at a high speed. However, in order to obtain recorded matters by forming images on various objects, a coloring material-receiving layer needs to be formed on each of the objects. In particular, in order to realize a sufficient image density, the coloring material-receiving layer needs to absorb a large amount of an ink and hence the coloring material-receiving layer on the transfer material needs to be made somewhat thick. However, it is not easy to arrange the coloring material-receiving layer on each of the various objects. When the transfer material and an image support are completely transferred (brought into close contact with each other), adhesiveness reduces depending on, for example, materials to be used in the image support and the transfer material. Accordingly, the inkjet system has involved problems in terms of peelability and adhesiveness, and hence it has been necessary to strictly control a constituent material of the coloring material-receiving layer, a manufacturing method therefor, and the like depending on the kinds of the objects.

Despite such circumstances, Japanese Patent Translation Publication No. 2006-517871 has no specific description concerning the constructions of the coloring material-receiving layer and the object. Accordingly, a coloring material-receiving layer suitable for transfer cannot be produced and hence it has been difficult to reliably transfer the coloring material-receiving layer onto the object. In particular, when the ink is present on the surface of an ink-receiving layer, at the time of the transfer, the image support and the ink do not bond to each other, and the coloring material-receiving layer and the ink also do not bond to each other. Accordingly, the technology described in Japanese Patent Translation Publication No. 2006-517871 has involved a problem in terms of transferability.

That is, according to embodiments of the present invention, there are provided a transfer material, an image support with a coloring material-receiving layer and a recorded matter, and manufacturing methods and manufacturing apparatus for the same described below useful in solving the problems listed above.

[1] First Transfer Material

According to one embodiment of the present invention, there is provided a transfer material, including:

a coloring material-receiving layer; and a base material sheet, wherein the transfer material has a laminated structure in which the base material sheet and the coloring material-receiving layer are sequentially laminated, the coloring material-receiving layer contains at least inorganic fine particles, a water-soluble resin, and a cationic resin having a weight-average molecular weight of 15,000 or less; and a difference SP2 between a SP value of an image support onto which the transfer material is transferred and a SP value of the coloring material-receiving layer to be brought into abutment with the image support satisfies a relationship represented by the following formula (1).

$$0 \leq SP2 \leq 1.0 \tag{1}$$

In the transfer material according to the embodiment of the present invention, it is more preferred that a difference SP1 between a SP value of the base material sheet and a SP value of a layer to be brought into abutment with the base material sheet satisfies a relationship represented by the following formula (2).

$$1.1 \leq SP1 \leq 3 \tag{2}$$

[2] Image Support with Coloring Material-Receiving Layer

According to one embodiment of the present invention, there is provided an image support with a coloring material-receiving layer, including:

an image support on which an image is supported; and a coloring material-receiving layer, wherein the coloring material-receiving layer is formed by peeling the base material sheet from the transfer material of the above-mentioned item [1], and contains at least inorganic fine particles, a water-soluble resin, and a cationic resin having a weight-average molecular weight of 15,000 or less, the image support with a coloring material-receiving layer has a laminated structure in which the image support and the coloring material-receiving layer are sequentially laminated, and a difference SP2 between a SP value of the image support and a SP value of a layer of the transfer material to be brought into abutment with the image support satisfies a relationship represented by the following formula (1).

$$0 \leq SP2 \leq 1.0 \tag{1}$$

[3] Method of Manufacturing Image Support with Coloring Material-Receiving Layer According to one embodiment of the present invention, there is provided a method of manufacturing an image support with a coloring material-receiving layer including an image support and a coloring material-receiving layer containing at least inorganic fine particles, a water-soluble resin, and a cationic resin having a weight-average molecular weight of 15,000 or less, the method including:

a step 1 of thermally pressure-bonding the coloring material-receiving layer of the transfer material of the above-mentioned item [1] having a laminated structure, in which a base material sheet and the coloring material-receiving layer are sequentially laminated, onto the image support to laminate the transfer material; and a step 2 of peeling the base material sheet from the transfer material after the step 1, wherein, in the step 1, a difference SP2 between a SP value of the image support and a SP value of a layer of the transfer material to be brought into abutment with the image support satisfies a relationship represented by the following formula (1).

$$0 \leq SP2 \leq 1.0 \tag{1}$$

[4] Apparatus for Manufacturing Image Support with Coloring Material-Receiving Layer According to one embodiment of the present invention, there is provided an apparatus for manufacturing an image support with a coloring material-receiving layer, including:

a supply portion configured to feed the transfer material of the above-mentioned item [1] including the base material sheet and the coloring material-receiving layer to a conveying path;

an image support-supplying portion configured to feed an image support to the conveying path;

an adhesion portion configured to allow the coloring material-receiving layer of the transfer material to adhere to the image support fed to the conveying path; and a peeling portion configured to peel the base material sheet from the transfer material, wherein a difference SP2 between a SP value of the image support and a SP value of a layer of the transfer material to be brought into abutment with the image support satisfies a relationship represented by the following formula (1).

$$0 \leq SP2 \leq 1.0 \tag{1}$$

[5] First Recorded Matter

According to one embodiment of the present invention, there is provided a recorded matter, including:

an image support having an image supported thereon; and a coloring material-receiving layer having the image recorded thereon, wherein the image is recorded on the coloring material-receiving layer of the image support with a coloring material-receiving layer of the above-mentioned item [2], and the recorded matter has a laminated structure in which the image support and the coloring material-receiving layer are sequentially laminated.

[6] First Method of Manufacturing Recorded Matter

According to one embodiment of the present invention, there is provided a method of manufacturing a recorded matter including an image support and a coloring material-receiving layer having an image recorded thereon, the method including:

a step 4 of recording the image on the coloring material-receiving layer of the image support with a coloring material-receiving layer of the above-mentioned item [2].

[7] First Apparatus for Manufacturing Recorded Matter

According to one embodiment of the present invention, there is provided an apparatus for manufacturing a recorded matter for recording an image on the image support with a coloring material-receiving layer of the above-mentioned item [2], including:

a conveying unit configured to convey the image support with a coloring material-receiving layer; and a recording portion configured to apply a coloring material to the coloring material-receiving layer of the image support with a coloring material-receiving layer to record the image.

[8] Second Transfer Material

According to one embodiment of the present invention, there is provided a transfer material, including:

a base material sheet, a coloring material-receiving layer; and a transparent sheet;

wherein the transfer material has a laminated structure in which the base material sheet, the transparent sheet, and the coloring material-receiving layer are sequentially laminated, the coloring material-receiving layer contains at least inorganic fine particles, a water-soluble resin, and a cationic resin having a weight-average molecular weight of 15,000 or less, and a difference SP2 between a SP value of an image support onto which the transfer material is transferred and a SP value of the coloring material-receiving layer to be brought into abutment with the image support satisfies a relationship represented by the following formula (1).

$$0 \leq SP2 \leq 1.0 \quad (1)$$

[9] Second Recorded Matter

According to one embodiment of the present invention, there is provided a recorded matter, including:

an image support having an image supported thereon; and a recording medium having the image recorded thereon, wherein the image is recorded on the coloring material-receiving layer of the transfer material of the above-mentioned item [8] including the base material sheet, the coloring material-receiving layer, and the transparent sheet, and the recording medium is formed by peeling the base material sheet, the recorded matter has a laminated structure in which the image support, the coloring material-receiving layer, and the transparent sheet are sequentially laminated, and a difference SP2 between a SP value of the image support and a SP value of a layer of the transfer material to be brought into abutment with the image support satisfies a relationship represented by the following formula (1).

$$0 \leq SP2 \leq 1.0 \quad (1)$$

[10] Second Method of Manufacturing Recorded Matter

According to one embodiment of the present invention, there is provided a method of manufacturing a recorded matter including an image support and a recording medium having an image recorded thereon, the method including:

a step 5 of recording the image on a coloring material-receiving layer of the transfer material of the above-mentioned item [8] including the base material sheet, the coloring material-receiving layer, and the transparent sheet;

a step 6 of thermally pressure-bonding the coloring material-receiving layer and the transparent sheet of the transfer material onto the image support to laminate the transfer material; and a step 7 of peeling the base material sheet from the transfer material, wherein, in the step 6, a difference SP2 between a SP value of the image support and a SP value of a layer of the transfer material to be brought into abutment with the image support satisfies a relationship represented by the following formula (1).

$$0 \leq SP2 \leq 1.0 \quad (1)$$

[11] Image-Recording Apparatus

According to one embodiment of the present invention, there is provided an image-recording apparatus, including:

a supply portion configured to feed the transfer material of the above-mentioned item [8] including the base material sheet, the coloring material-receiving layer, and the transparent sheet to a conveying path; and a recording portion configured to apply a coloring material to the coloring material-receiving layer of the transfer material fed to the conveying path to record an image.

[12] Second Apparatus for Manufacturing Recorded Matter

According to one embodiment of the present invention, there is provided an apparatus for manufacturing a recorded matter including the image-recording apparatus of the above-mentioned item [11], the manufacturing apparatus further including:

an image support in which a difference SP2 between a SP value of the image support and a SP value of a layer of a transfer material to be brought into abutment with the image support satisfies a relationship represented by the following formula (1);

an image support-supplying portion configured to feed the image support to a conveying path;

an adhesion portion configured to allow the transfer material to adhere to the image support fed to the conveying path; and a peeling portion configured to peel the base material sheet from the adhered transfer material.

$$0 \leq SP2 \leq 1.0 \quad (1)$$

The present invention has been made to solve the problems. That is, the present invention enables the provision of, for example, the transfer material, the image support with a coloring material-receiving layer and the recorded matter, and the manufacturing methods and manufacturing apparatus for the same that can achieve an improvement in productivity of a recorded matter, an improvement in information security, an improvement in weatherability (rubfastness or lightfastness) of the recorded matter, and a reduction in recording cost.

Further features of the present invention will become apparent from the following description of exemplary embodiments with reference to the attached drawings.

BRIEF DESCRIPTION OF THE DRAWINGS

FIG. 58 is a step view for schematically illustrating the steps of a method of manufacturing the second recorded matter.

DESCRIPTION OF THE EMBODIMENTS

Figure 1:
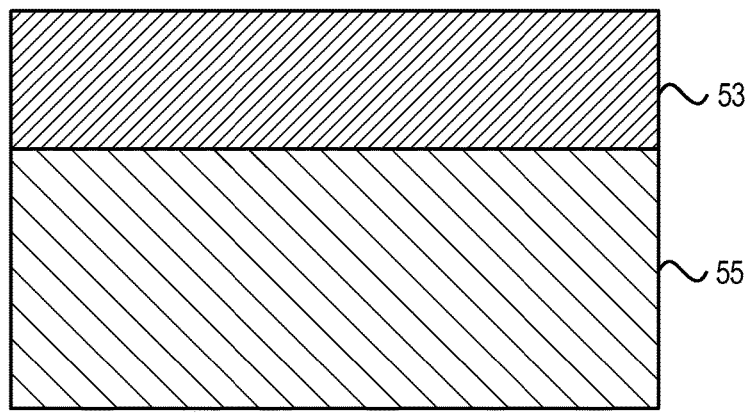
FIG. 1 is a sectional view for schematically illustrating one embodiment of a first recorded matter of the present invention.

The present invention is hereinafter described in detail with reference to the drawings. However, the present invention is not limited to the following embodiments and comprehends all objects having matters to define the invention. It should be noted that members of the same structure are denoted by the same reference symbol in the drawings and description thereof can be omitted.

The inventors of the present invention have made extensive investigations on the problems. As a result, the inventors have realized an image-recording method that is excellent in accuracy of an image and can drastically improve its productivity.

In an inkjet system that can suitably correspond to such method, a coloring material-receiving layer needs to absorb a large amount of an ink in order to realize a sufficient image density. Accordingly, the coloring material-receiving layer forming a transfer material needs to be made somewhat thick, and the transfer and peeling of the thick coloring material-receiving layer cause a problem peculiar to the inkjet system, such as a transfer failure.

In a first embodiment of the present invention, the coloring material-receiving layer of the transfer material needs to be completely transferred onto an image support. However, when the transfer material after recording and the image support are transferred (brought into close contact with each other) by applying heat with a heat roller or the like, problems in terms of peelability and adhesiveness therebetween occur. Specifically, the adhesiveness reduces depending on, for example, materials to be used in the image support and the transfer material. In addition, a problem in terms of the absorbability of the ink occurs owing to a change in pore caused by the heating. In view of the foregoing, the problems are overcome in the first embodiment of the present invention by adding a cationic resin (hereinafter sometimes referred to as "cationic agent") to the coloring material-receiving layer and controlling the molecular weight of the cationic agent to 15,000 or less. The melting point of the cationic agent, the SP values of the image support and the coloring material-receiving layer, and the SP values of a base material sheet and the coloring material-receiving layer are more preferably controlled.

Figure 29:
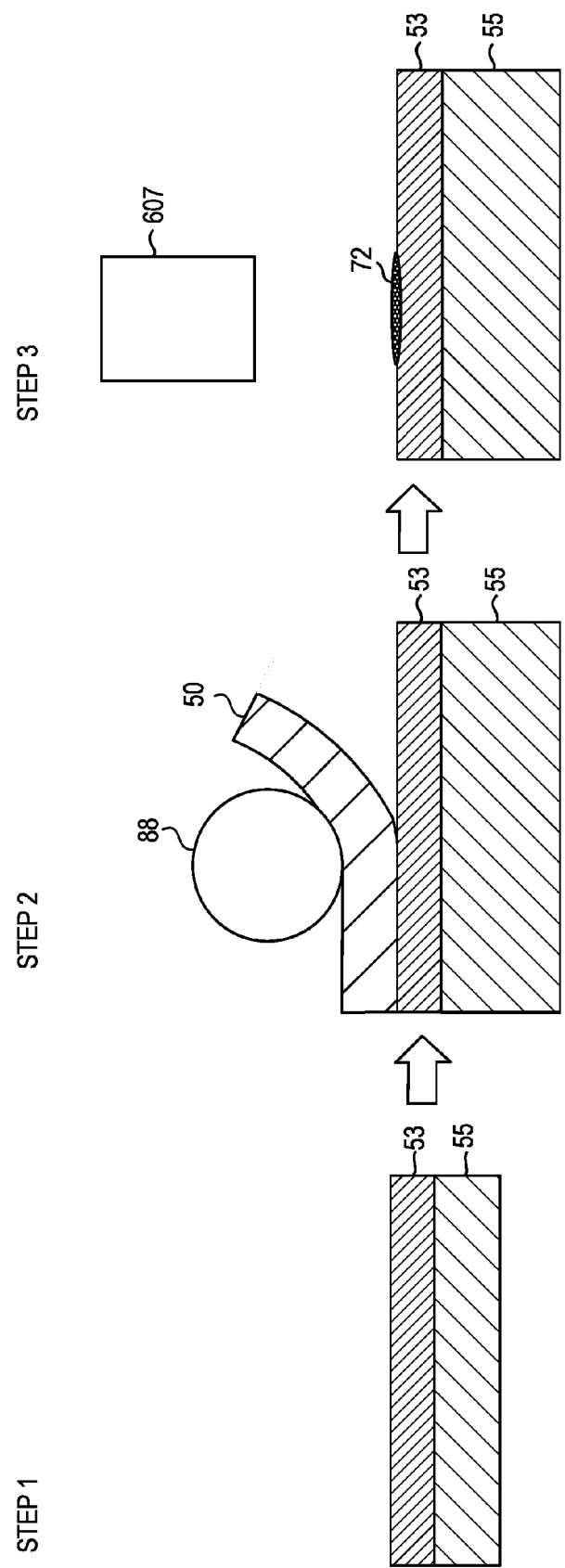
FIG. 29 is a step view for schematically illustrating the steps of a method of manufacturing a recorded matter.

FIG. 1 is a sectional view for illustrating one embodiment of an image support with a coloring material-receiving layer in the first embodiment of the present invention, and for schematically illustrating a section obtained by cutting the image support with a coloring material-receiving layer in its thickness direction. The image support with a coloring material-receiving layer is obtained by thermally pressure-bonding a first transfer material illustrated in FIG. 2 onto an image support 55 and peeling a base material sheet 50. The foregoing steps are specifically described. As illustrated in FIG. 29, first, a coloring material-receiving layer 53 is transferred onto the image support 55 by thermally pressure-bonding the transfer material and the image support with a heat roll (step 1). Next, the base material sheet 50 of the transfer material is peeled with a peeling roll 88 (step 2). Finally, an image 72 is printed on the coloring material-receiving layer 53 of the image support with a coloring material-receiving layer by using a recording head 607 (step 4). Thus, a recorded matter can be obtained.

In addition, in the first embodiment of the present invention, the coloring material-receiving layer contains at least inorganic fine particles, a water-soluble resin, and a cationic resin, and the average molecular weight of the cationic resin is controlled to 15,000 or less. Thus, the coloring material-receiving layer can be satisfactorily transferred onto the image support. A difference SP1 between the SP value of the base material sheet of the transfer material and the SP value of a layer to be brought into abutment with the base material sheet of the transfer material, and a difference SP2 between the SP value of the image support and the SP value of a layer of the transfer material to be brought into abutment with the image support are more preferably controlled to satisfy the following formulae (1) and (2). Thus, the coloring material-receiving layer can be more satisfactorily transferred onto the image support.

$$0 \leq SP2 \leq 1.0 \tag{1}$$

$$1.1 \leq SP1 \leq 3 \tag{2}$$

Meanwhile, in a second embodiment of the present invention, the transparent sheet and coloring material-receiving layer of the transfer material need to be completely transferred onto the image support. However, when the transfer material after recording and the image support are transferred (brought into close contact with each other) by applying heat with a heat roller or the like, problems in terms of peelability and adhesiveness therebetween may occur. Specifically, the adhesiveness reduces depending on, for example, materials to be used in the image support and the transfer material. In view of the foregoing, the problems are overcome in the second embodiment of the present invention by adding the cationic agent to the coloring material-receiving layer and controlling the molecular weight of the cationic agent to 15,000 or less, and more preferably, by further controlling its melting point, the SP values of the image support and the coloring material-receiving layer, and the SP values of the base material sheet and the transparent sheet.

Figure 30:
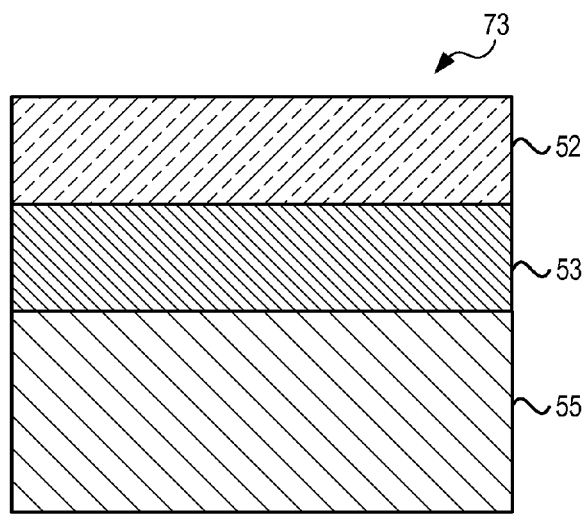
FIG. 30 is a sectional view for schematically illustrating one embodiment of a second recorded matter of the present invention.
Figure 40:
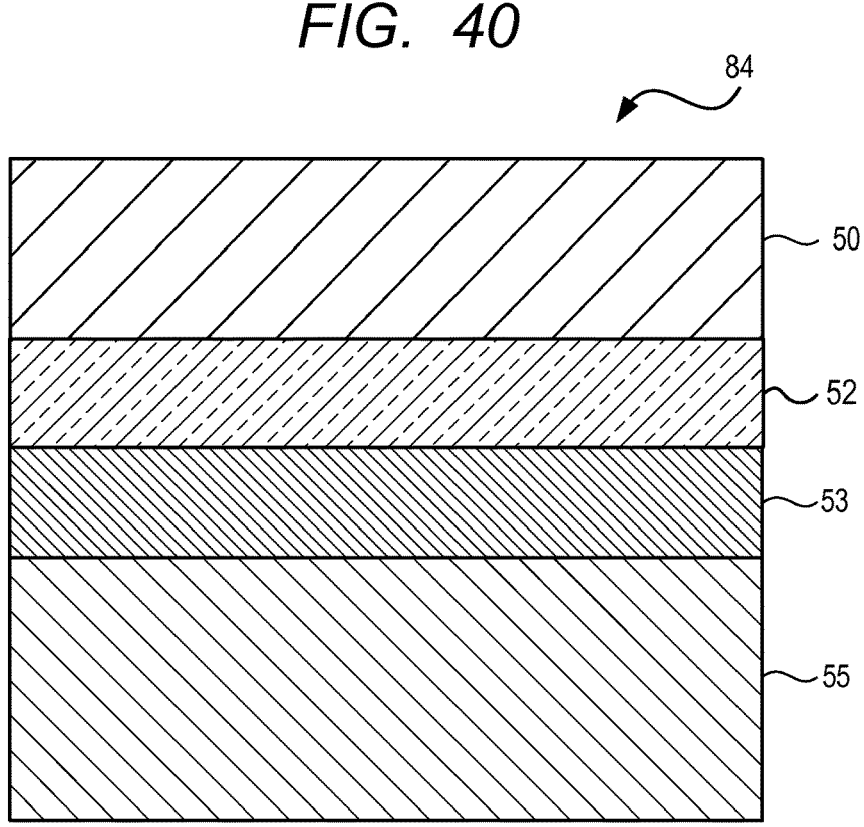
FIG. 40 is a view for illustrating a state in which the second transfer material is attached to the image support, and is a sectional view for schematically illustrating a section obtained by cutting a recording medium in its thickness direction.

In the second embodiment of the present invention, when a transparent sheet 52 and the coloring material-receiving layer 53 laminated on the surface of the base material sheet 50 are transferred onto the image support 55 as illustrated in FIG. 40, adhesiveness between the coloring material-receiving layer 53 and the image support 55 improves. Accordingly, the transfer material can be completely transferred onto the image support 55. After that, the base material sheet 50 of the transfer material is peeled. Thus, as illustrated in FIG. 30, the protective layer of the transparent sheet 52 for protecting the coloring material-receiving layer 53 having printed thereon the image can be formed on the outermost surface layer. Accordingly, a recorded matter excellent in rubfastness and weatherability can be obtained. The foregoing steps are specifically described. As illustrated in FIG. 58, first, the reverse image 72 is recorded on the coloring material-receiving layer 53 of the transfer material with the recording head 607 (step 5). Next, the coloring material-receiving layer 53 is transferred onto the image support 55 by thermally pressure-bonding the transfer material and the image support with a heat roller 21 (step 6). Finally, the base material sheet 50 is peeled with the peeling roll 88 (step 7), whereby the recorded matter is obtained.

Figure 31:
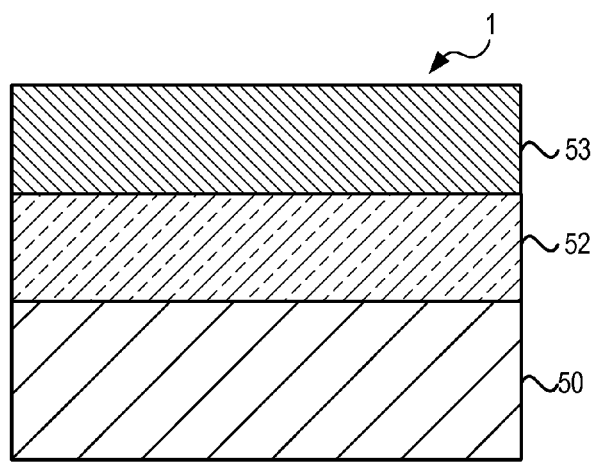
FIG. 31 is a sectional view for schematically illustrating one embodiment of a second transfer material of the present invention.

FIG. 31 is a sectional view for illustrating one embodiment of a second transfer material in the present invention, and for schematically illustrating a section obtained by cutting the transfer material in its thickness direction. As illustrated in FIG. 31, the second transfer material in the present invention includes the base material sheet 50, the transparent sheet 52, and the coloring material-receiving layer 53.

In the transfer material, upon formation of the transparent sheet and the coloring material-receiving layer on the image support by transfer, the coloring material-receiving layer contains at least inorganic fine particles, a water-soluble resin, and a cationic resin, and the average molecular weight of the cationic resin is 15,000 or less. In a more preferred embodiment, the difference SP1 between the SP value of the base material sheet of the transfer material and the SP value of the layer to be brought into abutment with the base material sheet of the transfer material, and the difference SP2 between the SP value of the image support and the SP value of the layer of the transfer material to be brought into abutment with the image support are controlled to satisfy the following formulae (1) and (2). Thus, the transparent sheet and the coloring material-receiving layer can be satisfactorily transferred onto the image support.

$$0 \leq SP2 \leq 1.0 \tag{1}$$

$$1.1 \leq SP1 \leq 3 \tag{2}$$

Now, a SP value is described. The SP value represents a solubility parameter and is also referred to as "Hildebrand parameter." The solubility parameter is used as a measure representing an intermolecular force because in a regular solution theory, it is hypothesized that a force acting between a solvent and a solute is the intermolecular force alone. An actual solution is not necessarily a regular solution, but it has been empirically known that as a difference in SP value between the two components becomes smaller, a solubility becomes larger.

In the regular solution theory, the following modeling has been performed: a force acting between a solvent and a solute is an intermolecular force alone. Accordingly, it can be assumed that an interaction for agglomerating liquid molecules is the intermolecular force alone. A cohesive energy $\Delta E$ of a liquid has a relationship of $\Delta H = \Delta E + P\Delta V$ with its enthalpy of vaporization, and hence the solubility parameter is defined by the following formula with its molar heat of vaporization $\Delta H$ and molar volume V. That is, the parameter is calculated from the square root $(cal/cm^3)^{1/2}$ of heat of vaporization required for 1 $cm^3$ of the liquid to vaporize.

$$\delta = \sqrt{(\Delta H - RT)/V} \tag{3}$$

It is rare that an actual solution is a regular solution. However, a force except an intermolecular force, such as a hydrogen bond, also acts between solvent and solute molecules, and hence whether the two components mix with each other or undergo phase separation is thermodynamically determined by a difference between the mixing enthalpy and mixing entropy of the components. Empirically, however, substances having close solubility parameters tend to easily mix with each other. Accordingly, the SP value also serves as a guideline on the judgment of the ease with which the solute and the solvent mix with each other. However, in the case of a plastic base material, compatibility depends on the polarity of each material to be used. As the polarity becomes higher, the compatibility becomes higher, and as the SP values each represented by the square root of a cohesive energy density (CD) representing a molecular bonding force become closer to each other, the compatibility becomes higher.

The SP value is represented by the following general formula (4). Typical SP values are shown in Table 1. The SP values shown in Table 1 were transcribed from the SP values of various plastics described in "Plastic Processing Technology Handbook", Jun. 12, 1995, edited by The Society of Polymer Science, Japan, published by Nikkan Kogyo Shimbun, Ltd., p. 1474, Table 3.20.

$$(SP)^2 = CEO = \Delta E/V = (\Delta H - RT)/V = d(CE)/M \tag{4}$$

[$\Delta E$: a vaporization energy (kcal/mol), V: a molar volume ($cm^2$/mol), $\Delta H$: a vaporization energy (kcal/mol), R: a gas constant, M: a gram molecular weight (g/mol), T: an absolute temperature (K), d: a density ($g/cm^3$), CE: a cohesive energy (kcal/mol)]

TABLE 1

| Abbreviation | Polymer name | SP (theoretical value) |
|---|---|---|
| PTFE | Polyethylene tetrafluoride | 6.2 |
| PE | Polyethylene | 8.1 |
| PP | Polypropylene | 8.1 |
| PS | Polystyrene | 9.12 |
| PMMA | Polymethyl methacrylate | 9.25 |

TABLE 1-continued

| Abbreviation | Polymer name | SP (theoretical value) |
| --- | --- | --- |
| PVAC | Polyvinyl acetate | 9.4 |
| PVC | Polyvinyl chloride | 9.6 |
| PC | Polycarbonate | 9.8 |
| PET | Polyethylene terephthalate | 10.7 |
| EP | Epoxy resin | 11.0 |
| POM | Polyacetal | 11.2 |
| PAN | Polyacrylonitrile | 12.75 |
| PA | Polyamide (nylon 66) | 13.6 |

In the first embodiment of the present invention, when the difference SP2 between the SP value of the image support and the SP value of the layer of the transfer material to be brought into abutment with the image support (in the case of the embodiment of FIG. 2, the coloring material-receiving layer) satisfies a relationship represented by the following formula (1), compatibility between the image support and the coloring material-receiving layer improves, and hence the image support and the coloring material-receiving layer show a high adhesive property. Meanwhile, when the difference SP1 between the SP value of the base material sheet and the SP value of the layer to be brought into abutment with the base material sheet of the transfer material satisfies a relationship represented by the following formula (2), the coloring material-receiving layer and the base material sheet are laminated under a state in which an adhesive property therebetween is relatively weak. Setting the difference within the range establishes the following situation: the base material sheet can be easily peeled from the coloring material-receiving layer at the time of transfer. Meanwhile, the adhesive property between the coloring material-receiving layer and the image support can be additionally strengthened, and hence transferability at the time of the transfer can be improved.

$$0 \leq SP2 \leq 1.0 \quad (1)$$

$$1.1 \leq SP1 \leq 3 \quad (2)$$

In addition, in the second embodiment of the present invention, when the difference SP2 between the SP value of the image support and the SP value of the layer of the transfer material to be brought into abutment with the image support (in the case of the embodiment of FIG. 31, the coloring material-receiving layer) satisfies the relationship represented by the following formula (1), the compatibility between the image support and the coloring material-receiving layer improves, and hence the image support and the coloring material-receiving layer show a high adhesive property. Meanwhile, when the difference SP1 between the SP value of the base material sheet and the SP value of the layer to be brought into abutment with the base material sheet of the transfer material satisfies the relationship represented by the following formula (2), the transparent sheet and the base material sheet are laminated under a state in which an adhesive property therebetween is relatively weak. Setting the difference within the range establishes the following situation: the base material sheet can be easily peeled from the transparent sheet at the time of the transfer. Meanwhile, the adhesive property between the coloring material-receiving layer and the image support can be additionally strengthened. As a result, the transferability at the time of the transfer can be improved.

$$0 \leq SP2 \leq 1.0 \quad (1)$$

$$1.1 \leq SP1 \leq 3 \quad (2)$$

Figure 2:
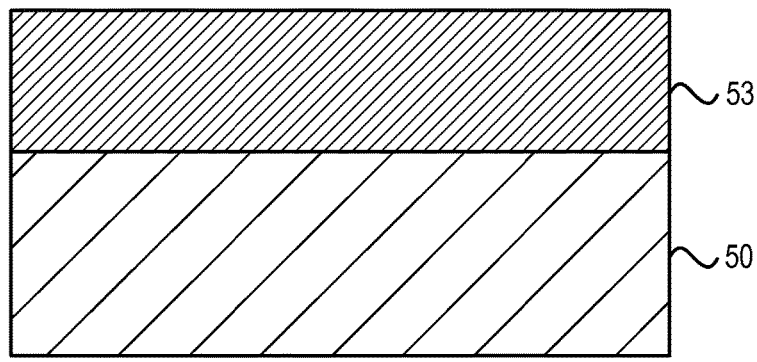
FIG. 2 is a sectional view for schematically illustrating one embodiment of a first transfer material of the present invention.

[1] First Transfer Material:

As illustrated in FIG. 2, the first transfer material includes the coloring material-receiving layer 53 for receiving a coloring material and the base material sheet 50 for supporting the coloring material-receiving layer 53. A coloring material-receiving layer transfer material 1 serves as an intermediate sheet upon transfer of the coloring material-receiving layer onto an image support. When the coloring material-receiving layer of the coloring material-receiving layer transfer material is transferred onto the image support, the coloring material-receiving layer is formed on the image support and hence an image can be formed.

[1-1] Coloring Material-Receiving Layer:

The coloring material-receiving layer receives the coloring material. In addition, the coloring material-receiving layer contains at least inorganic fine particles, a water-soluble resin, and a cationic resin having a weight-average molecular weight of 15,000 or less. The coloring material-receiving layer comes in the following forms: a swelling absorption-type coloring material-receiving layer that receives the coloring material (such as an ink) in the network structure of a water-soluble polymer; and a gap absorption-type coloring material-receiving layer that receives the coloring material in gaps formed by the inorganic fine particles. The transfer material includes the gap absorption-type coloring material-receiving layer formed of a composition containing at least the inorganic fine particles, the water-soluble resin, and the cationic resin having a weight-average molecular weight of 15,000 or less. Even when the gap absorption-type coloring material-receiving layer is thermally pressure-bonded onto the image support, the volume of the gaps formed by the inorganic fine particles can be maintained and hence the coloring material can be quickly absorbed (in the case of a pigment ink, its coloring material is fixed to the surface of the coloring material-receiving layer, and its solvent and water components are absorbed in the coloring material-receiving layer). In addition, the following inconvenience (transfer failure) can be suppressed: the coloring material-receiving layer and the image support are not completely in close contact with each other.

[1-1-1] Inorganic Fine Particles:

The inorganic fine particles are fine particles formed of an inorganic material. The inorganic fine particles have a function of forming a gap configured to receive a coloring material in the coloring material-receiving layer.

The kind of the inorganic material forming the inorganic fine particles is not particularly limited. However, an inorganic material having a high ink-absorbing ability, excellent in color developability, and capable of forming a high-quality image is preferred. Examples thereof can include calcium carbonate, magnesium carbonate, kaolin, clay, talc, hydrotalcite, aluminum silicate, calcium silicate, magnesium silicate, diatomaceous earth, alumina, colloidal alumina, aluminum hydroxide, a hydrated alumina having a boehmite structure, a hydrated alumina having a pseudo-boehmite structure, lithopone (a mixture of barium sulfate and zinc sulfate), and zeolite.

Of the inorganic fine particles formed of those inorganic materials, alumina fine particles formed of at least one kind of substance selected from the group consisting of alumina and a hydrated alumina are preferred. Examples of the hydrated alumina can include a hydrated alumina having a boehmite structure and a hydrated alumina having a pseudo-boehmite structure. Alumina, the hydrated alumina having a boehmite structure, or the hydrated alumina having a pseudoboehmite structure is preferred because any such material can improve the transparency of the coloring material-receiving layer and the recording density of an image.

The hydrated alumina having a boehmite structure can be obtained by adding an acid to a long-chain aluminum alkoxide to perform hydrolysis and peptization (see Japanese Patent Application Laid-Open No. S56-120508). Any one of an organic acid and an inorganic acid can be used in the peptization. However, nitric acid is preferably used. The use of nitric acid can improve the reaction efficiency of the hydrolysis, can provide a hydrated alumina having a controlled shape, and can provide a dispersion liquid having good dispersibility.

The average particle diameter of the inorganic fine particles is preferably 120 nm or more and 250 nm or less. Setting the average particle diameter to 120 nm or more, preferably 140 nm or more can improve the ink absorbability of the coloring material-receiving layer, and hence can suppress the bleeding and beading of the ink in an image after its recording. Meanwhile, setting the average particle diameter to 250 nm or less, preferably 220 nm or less can suppress light scattering due to the inorganic fine particles, and hence can improve the glossiness and transparency of the coloring material-receiving layer. In addition, the setting can increase the number of the inorganic fine particles per unit area of the coloring material-receiving layer, and hence can improve the ink absorbability. Therefore, the setting can increase the recording density of the image and can suppress the lack of luster of the image after the recording.

Known inorganic fine particles can be used as they are, or the known inorganic fine particles whose average particle diameter and polydispersity index have been adjusted with a pulverization dispersing machine or the like can be used. The kind of the pulverization dispersing machine is not particularly limited. For example, a conventionally known pulverization dispersing machine, such as a high-pressure homogenizer, an ultrasonic homogenizer, a wet media-type pulverizer (a sand mill or a ball mill), a continuous high-speed stirring-type dispersing machine, or an ultrasonic dispersing machine, can be used.

More specific examples of the pulverization dispersing machine can include: Manton-Gaulin homogenizer and Sonolator (each of which is manufactured by Doyei Shoji Co., Ltd.); Microfluidizer (manufactured by MIZUHO INDUSTRIAL Co., Ltd.); Nanomizer (manufactured by Tsukishima Kikai Co., Ltd.); Ultimaizer (manufactured by ITOCHU MACHINE-TECHNOS CORPORATION); PEARL MILL, GRAIN MILL, and TORNADO (each of which is manufactured by ASADA IRON WORKS Co., Ltd.); Visco Mill (manufactured by AIMEX Co., Ltd.); MIGHTY MILL, RS MILL, and SF MILL (each of which is manufactured by INOUE MFG., INC.); Ebara Milder (manufactured by EBARA CORPORATION); and FINE FLOW MILL and CAVITRON (each of which is manufactured by Pacific Machinery & Engineering Co., Ltd.), all of which are trade names.

In addition, the inorganic fine particles preferably satisfy the range of the average particle diameter and have a polydispersity index ($\mu/<\Gamma>^2$) of 0.01 or more and 0.20 or less, and the inorganic fine particles more preferably have a polydispersity index of 0.01 or more and 0.18 or less. Setting the index within the range can keep the sizes of the particles constant, and hence can improve the glossiness and transparency of the coloring material-receiving layer. Therefore, the setting can increase the recording density of an image and can suppress the lack of luster of the image after its recording.

The average particle diameter and polydispersity index as used herein can be determined by analyzing values measured by a dynamic light scattering method by a cumulant method described in the "Structure of Polymer (2) Scattering Experiment and Morphological Observation Chapter 1 Light Scattering" (KYORITSU SHUPPAN Co., Ltd., edited by The Society of Polymer Science, Japan) or J. Chem. Phys., 70(8), 15 April, 3965 (1979). According to the theory of dynamic light scattering, when fine particles having different particle diameters are mixed, the attenuation of a time correlation function from scattered light has a distribution. The average ($<\Gamma>$) and variance ($\mu$) of an attenuation rate are determined by analyzing the time correlation function by the cumulant method. The attenuation rate ($\Gamma$) is represented by a function of the diffusion coefficients and scattering vectors of the particles, and hence their hydrodynamic average particle diameter can be determined by using Stokes-Einstein's equation. Therefore, the polydispersity index ($\mu/<\Gamma>^2$) obtained by dividing the variance ($\mu$) of the attenuation rate by the square of its average ($<\Gamma>^2$) represents the extent to which the particle diameters vary, and means that the distribution of the particle diameters narrows as a value for the index approaches 0. The average particle diameter and polydispersity index defined can be easily measured with, for example, a laser particle diameter analyzer PARIII (manufactured by Otsuka Electronics Co., Ltd.).

One kind of inorganic fine particles can be used alone, or two or more kinds thereof can be used as a mixture. The term "two or more kinds" comprehends inorganic fine particles different from each other in material itself, and inorganic fine particles different from each other in characteristics, such as an average particle diameter and a polydispersity index.

[1-1-2] Water-Soluble Resin:

The water-soluble resin is a resin that completely mixes with water, or has a solubility in water of 1 (g/100 g) or more, at 25° C. The water-soluble resin functions as a binder for binding the inorganic fine particles.

Examples of the water-soluble resin can include: starch, gelatin, casein, and modified products thereof; a cellulose derivative, such as methylcellulose, carboxymethylcellulose, or hydroxyethylcellulose; polyvinyl alcohol (e.g., completely saponified, partially saponified, or low saponified polyvinyl alcohol) or modified products thereof (e.g., a cationically modified product, an anionically modified product, and a silanol-modified product); and resins, such as a urea-based resin, a melamine-based resin, an epoxy-based resin, an epichlorohydrin-based resin, a polyurethane-based resin, a polyethylene imine-based resin, a polyamide-based resin, a polyvinylpyrrolidone-based resin, a polyvinyl butyral-based resin, poly(meth)acrylic acid or a copolymer resin thereof, an acrylamide-based resin, a maleic anhydride-based copolymer resin, and a polyester-based resin.

Of the water-soluble resins, polyvinyl alcohol, in particular, saponified polyvinyl alcohol obtained by hydrolyzing (saponifying) polyvinyl acetate is preferred. The SP value of the polyvinyl alcohol is close to the SP value of PVC or PET-G. Therefore, when the PVC or the PET-G is used as the image support, the polyvinyl alcohol can improve the adhesiveness (transfer performance) between the image support and the coloring material-receiving layer, and is hence particularly preferably used.

The coloring material-receiving layer is preferably formed of a composition containing polyvinyl alcohol having a saponification degree of 70 mol % or more and 100 mol % or less. The saponification degree means the percentage of the number of moles of the hydroxyl groups of the polyvinyl alcohol with respect to the total number of moles of the acetic acid groups and hydroxyl groups thereof.

Setting the saponification degree to 70 mol % or more, preferably 86 mol % or more prevents the coloring material-receiving layer from becoming excessively hard and can impart sufficient viscoelasticity to the coloring material-receiving layer. Therefore, the coloring material-receiving layer can be easily peeled from the base material sheet. In addition, the viscosity of a coating liquid containing the inorganic fine particles and the polyvinyl alcohol can be reduced. Therefore, the coating liquid can be easily applied to the base material sheet and hence the productivity of the transfer material can be improved. Meanwhile, setting the saponification degree to 100 mol % or less, preferably 90 mol % or less can impart moderate hydrophilicity to the coloring material-receiving layer and hence improves the absorbability of the ink. Therefore, a high-quality image can be recorded on the coloring material-receiving layer.

As the saponified polyvinyl alcohol that satisfies the range of the saponification degree, there can be given, for example, completely saponified polyvinyl alcohol (saponification degree: 98 mol % or more and 99 mol % or less), partially saponified polyvinyl alcohol (saponification degree: 87 mol % or more and 89 mol % or less), and low saponified polyvinyl alcohol (saponification degree: 78 mol % or more and 82 mol % or less). Of those, partially saponified polyvinyl alcohol is preferred.

The coloring material-receiving layer is preferably formed of a composition containing polyvinyl alcohol having a weight-average polymerization degree of 2,000 or more and 5,000 or less.

Setting the weight-average polymerization degree to 2,000 or more, more preferably 3,000 or more provides the polyvinyl alcohol with a moderate viscosity and can impart sufficient viscoelasticity to the coloring material-receiving layer. Therefore, the coloring material-receiving layer can be easily peeled from the base material sheet. Meanwhile, setting the weight-average polymerization degree to 5,000 or less, preferably 4,500 or less can reduce the viscosity of the coating liquid containing the inorganic fine particles and the polyvinyl alcohol. Therefore, the coating liquid can be easily applied to the base material sheet and hence the productivity of the transfer material can be improved. In addition, the pores of the coloring material-receiving layer are prevented from being filled, and hence the opening states of the pores can be satisfactorily maintained and the absorbability of the ink improves. Therefore, a high-quality image can be recorded on the coloring material-receiving layer.

A value for the weight-average polymerization degree is a value calculated in conformity with a method described in JIS-K-6726.

One kind of the water-soluble resin can be used alone, or two or more kinds thereof can be used as a mixture. The term "two or more kinds" comprehends resins different from each other in characteristics such as a saponification degree and a weight-average polymerization degree.

The amount of the water-soluble resin is preferably set to 3.3 parts by mass or more and 20 parts by mass or less with respect to 100 parts by mass of the inorganic fine particles. Setting the amount of the water-soluble resin to 3.3 parts by mass or more, preferably 5 parts by mass or more inhibits the occurrence of the cracking or powder dropping of the coloring material-receiving layer. Meanwhile, setting the amount of the water-soluble resin to 20 parts by mass or less, preferably 15 parts by mass or less can maintain a gap volume even with heat and pressure upon thermal pressure bonding onto the image support, and improves the absorbability of the ink.

[1-1-3] Cationic Resin:

The cationic resin, which is used in the embodiments of the present invention, is a resin having a cationic atomic group (such as a quaternary ammonium) in a molecule thereof. In addition, the weight-average molecular weight of the cationic resin is 15,000 or less. The cationic resin, which is used in the embodiments of the present invention, shows a SP value close to the SP value of a resin forming the image support. In addition, the cationic resin easily melts with heat upon thermal pressure bonding of the transfer material onto the image support, and accelerates electrostatic bonding between the image support and the transfer material. Accordingly, the resin additionally strengthens the adhesive property between the image support and the coloring material-receiving layer, and hence can improve the adhesiveness (transfer performance) between the image support and the coloring material-receiving layer. That is, since the cationic resin is electrostatically bond to the ink which is negatively charged in general, the ink can be fixed in the coloring material-receiving layer. In addition to this function, 1) the cationic resin having a weight-average molecular weight of 15,000 or less, which is used in the embodiments of the present invention, is selected so as to have the SP value close to the SP value of the image support. Therefore, the cationic resin has a high affinity with the image support, and the adhesive property between the image support and the coloring material-receiving layer is improved during transfer. Moreover, 2) the cationic resin, which is used in the embodiments of the present invention, has a low melting temperature and easily melts with heat during transfer. Therefore, the adhesive property between the image support and the coloring material-receiving layer is more strengthened. Further, 3) the cationic resin, which is used in the embodiments of the present invention, has a small molecular weight. Therefore, even if quantity of the cationic resin added to the coloring material-receiving layer is small, a large quantity of molecule can be added to the coloring material-receiving layer. Accordingly, a cationic group, which can electrostatically bond to the image support being negatively charged in general, can intermediate on the surface of the coloring material-receiving layer. As a result, the adhesive property between the image support and the coloring material-receiving layer is improved. Hence, the cationic resin, which is used in the embodiments of the present invention, serves to improve the transfer performance between the image support and the coloring material-receiving layer by the above three effects.

For example, at least one kind of polymer selected from a polyallylamine (such as an allylamine-based polymer or a diallylamine-based polymer) and a urethane-based polymer is preferably used as such cationic resin. Of those, in particular, a polyallylamine having an average molecular weight of 5,000 or less can be particularly preferably used because of, for example, the following reasons: (1) the polyallylamine has a melting point as low as around 80° C. and hence easily melts upon thermal pressure bonding of the transfer material onto the image support; and (2) the polyallylamine has a small molecular structure, and hence can cause many cationic groups to be present per unit area of the surface of the coloring material-receiving layer and can accelerate its electrostatic bonding to the image support.

The polyallylamine is preferably at least one kind of polyallylamine represented by the following general formula (5).

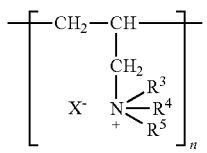

General Formula (5)

(In the formula (5): $R^3$, $R^4$, and $R^5$ each represent a hydrogen atom, an alkyl group, an alkenyl group, an alkanol group, an allylalkyl group, or an allylalkenyl group that may have a substituent, provided that $R^3$, $R^4$, and $R^5$ may be identical to or different from each other; $X^-$ represents an inorganic or organic anion; and n represents an integer, which indicates the average polymerization degree of the polyallylamine.)

The weight-average molecular weight of the cationic resin is 15,000 or less, preferably 1,000 or more and 15,000 or less, more preferably 1,000 or more and 10,000 or less, still more preferably 1,000 or more and 5,000 or less. Setting the average molecular weight within the range can improve the stability of the coating liquid. In addition, the number of the gaps of the coloring material-receiving layer hardly reduces and hence the absorbability of the coloring material can be maintained. Further, setting the molecular weight of the cationic resin to 5,000 or less can distribute a larger number of cationic groups (that is, adsorption sites for performing the electrostatic bonding) on the surface of the coloring material-receiving layer to be brought into contact with the image support. Accordingly, the adhesiveness (transfer performance) between the image support and the coloring material-receiving layer can be additionally improved. It should be noted that when the average molecular weight becomes larger than 15,000, the number of the cationic groups (that is, the adsorption sites for performing the electrostatic bonding) on the surface of the coloring material-receiving layer to be brought into contact with the image support reduces. Accordingly, the adhesiveness (transfer performance) of the image support with the coloring material-receiving layer reduces. On the other hand, a weight-average molecular weight of less than 1,000 is not preferred because the cationic resin moves toward the inside of the coloring material-receiving layer together with the solvent of the ink at the time of printing, and hence the amount of the cationic groups distributed in the surface of the coloring material-receiving layer reduces.

The usage amount of the cationic resin is set to preferably 0.01 mass % or more and 5 mass % or less, more preferably 0.01 mass % or more and 3 mass % or less with respect to the inorganic fine particles (such as a hydrated alumina). When the usage amount of the cationic resin deviates from the range, the viscosity of the dispersion liquid of the inorganic fine particles or of the coating liquid obtained by adding the binder to the dispersion liquid increases, and hence the storage stability and applicability of the dispersion liquid or the coating liquid reduce in some cases.

The melting point of the cationic resin is preferably 60° C. or more and 160° C. or less. Setting the melting point of the cationic resin within the range can melt the cationic resin upon thermal pressure bonding of the transfer material onto the image support, and hence can improve the adhesiveness (transfer performance) between the image support and the coloring material-receiving layer.

[1-1-4] Other Additives

A thermofusible resin is preferably incorporated into the coloring material-receiving layer for the purpose of adjusting the film strength of the coloring material-receiving layer or improving the adhesiveness (transfer performance) between the image support and the coloring material-receiving layer. The same resin as a resin to be incorporated into a primer layer can be used as the thermofusible resin. The incorporation of the thermofusible resin into the coloring material-receiving layer can improve the adhesiveness (transfer performance) between the image support and the coloring material-receiving layer without the arrangement of the primer layer. In addition, the incorporation can improve the peelability of the base material sheet from the coloring material-receiving layer. However, when the thermofusible resin is added in an excess amount, the excess resin fills the pores of the coloring material-receiving layer owing to heat and pressure upon transfer, and hence the absorbability of the coloring material, and by extension, image quality reduce in some cases.

[1-1-5] Thickness:

The thickness of the coloring material-receiving layer is not particularly limited. However, the thickness of the coloring material-receiving layer is preferably 10 µm or more and 40 µm or less. Setting the thickness of the coloring material-receiving layer to 10 µm or more, preferably 15 µm or more can secure the absorbability of the ink. In addition, the absorbability of the ink and the fixability of the ink improve. Meanwhile, setting the thickness of the coloring material-receiving layer to 40 µm or less, more preferably 20 µm or less can improve heat conduction upon thermal pressure bonding of the transfer material onto the image support. Accordingly, the adhesiveness (transfer performance) between the image support and the coloring material-receiving layer can be improved. In addition, when a plastic card is used as the image support, the thickness of the entirety of a recorded matter can be easily suppressed to a total thickness of 0.84 mm or less described in JIS 6301.

[1-1-6] Gap Volume:

It is preferred that the coloring material-receiving layer is a gap absorption-type ink-receiving layer (the coloring material-receiving layer is hereinafter sometimes referred to as "ink-receiving layer") and its gap volume is 30 ml/m² or more. In addition, the gap volume is preferably maintained at 30 ml/m² or more even after the transfer material has been thermally pressure-bonded onto the image support (after transfer). The water-soluble resin and the cationic resin in the coloring material-receiving layer are turned into a film by heat and pressure at the time of the transfer, and hence the gap volume reduces and the absorbability of the ink reduces in some cases. However, when the water-soluble resin and the cationic resin are used, and the temperature at which the transfer is performed is controlled to 120° C. or more and 180° C. or less, the gap volume after the transfer can be maintained within the range and hence the absorbability of the ink can be improved.

The gap volume can be measured by a method described in the J. TAPPI paper and pulp test method (Bristow method) with a dynamic permeability tester (e.g., a tester available under the trade name "B341000-702" from Toyo Seiki Seisaku-sho, Ltd.). A liquid obtained by mixing distilled water with 0.16% of a BK ink was used as a liquid to be used in the measurement, and a gap volume at an absorption time of 2 seconds (moving speed of paper: v=0.5 mm/s) was measured. The gap volume was calculated from the following formula (6). The measurement was performed under the conditions of an amount of the liquid to be added to a headbox of 40 µl and a slit length of 15.00 mm.

$$V = 40 * 1,000/(15 * A) \qquad (6)$$

[V=gap volume (ml/m$^2$), A=length of a transition trace (trace length) (mm)]

[1-2] Base Material Sheet:

As illustrated in FIG. 2, the first transfer material includes the base material sheet 50. The base material sheet (also referred to as "peeling liner" or "separator") is a sheet body serving as a support for a releasing layer or the coloring material-receiving layer.

A material for the base material sheet, the form of the sheet, and the like are not particularly limited as long as the material allows the difference SP1 between the SP value of the base material sheet and the SP value of the coloring material-receiving layer to satisfy the formula (2). A resin film can be given as an example of such base material sheet.

Resin films formed of, for example, the following resins are preferred: polyester (such as PET), nylon (aliphatic polyamide), polyimide, cellulose acetate, cellophane, polyethylene, polypropylene, polystyrene, polycarbonate, polyvinyl alcohol, polyvinyl chloride, polyvinylidene chloride, chlorinated rubber, a fluororesin, and an ionomer. Of those, a PET film excellent in heat resistance is preferred. The case where polyvinyl alcohol is used as the water-soluble resin forming the coloring material-receiving layer and the PET film is used as the base material sheet is preferred because a difference between the SP value of the PET film and the SP value of the polyvinyl alcohol or the cationic resin is relatively large, and hence a value for the SP1 can be enlarged. One kind of the resin films can be used alone, or two or more kinds thereof can be used as a composite or a laminate.

The thickness of the base material sheet only needs to be appropriately determined in consideration of, for example, its material strength, and is not particularly limited. However, the thickness of the base material sheet is preferably 5 μm or more and 200 μm or less. When the thickness of the base material sheet is set to 5 μm or more, preferably 10 μm or more, upon lamination of the coloring material-receiving layer, the resultant laminate can be prevented from curl. When the transfer material has a roll shape, the thickness of the transfer material is preferably 15 μm or more in order to improve the conveyability of the transfer material on a manufacturing apparatus. When the transfer material has a cut sheet shape, the thickness of the transfer material is preferably 30 μm or more from the viewpoint of preventing the curl of the cut sheet. Meanwhile, setting the thickness of the base material sheet to 200 μm or less, preferably 60 μm or less, more preferably 50 μm or less can improve thermal transferability in the case of the thermal pressure bonding of the transfer material onto the image support. In particular, when the transfer material is of a roll shape, its thickness is preferably 15 μm or more in order to improve its conveyability. On the other hand, when the transfer material is of a cut sheet shape, its thickness is preferably 30 μm or more from the viewpoint of preventing its curl at the time of the thermal pressure bonding.

Figure 3:
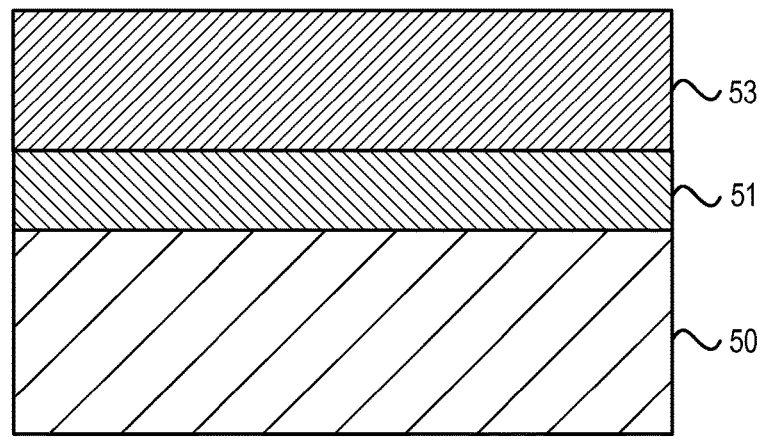
FIG. 3 is a sectional view for schematically illustrating another embodiment of the first transfer material of the present invention.

[1-3] Releasing Layer:

The first transfer material may include a releasing layer 51 as illustrated in FIG. 3. The releasing layer is a layer formed of a composition containing a release agent, and is arranged between the base material sheet 50 and the coloring material-receiving layer 53. When the transfer material includes the releasing layer 51, the base material sheet 50 can be easily peeled from the coloring material-receiving layer 53. It should be noted that when the releasing layer is formed, the base material sheet includes the releasing layer. That is, the difference SP1 between the SP value of the base material sheet and the SP value of the layer to be brought into abutment with the base material sheet is a difference between the SP value of the releasing layer and the SP value of the coloring material-receiving layer.

The kind of the release agent is not particularly limited, and a material that is excellent in releasability and is not easily melted by heat generated by a heat roller or a thermal inkjet recording head is preferred. For example, silicone-based materials, such as silicone waxes typified by waxes such as a silicone wax, and a silicone resin, and fluorine-based materials, such as a fluorine resin, are preferred because the materials are each excellent in releasability.

The thickness of the releasing layer only needs to be appropriately determined in consideration of peelability and the like, and is not particularly limited. However, the thickness of the releasing layer is preferably 0.1 μm or more and 10 μm or less in a dry state. Setting the thickness of the releasing layer to 0.1 μm or more, preferably 1 μm or more can suppress fusion between the base material sheet and the transparent sheet. Meanwhile, setting the thickness of the releasing layer to 10 μm or less, preferably 5 μm or less can suppress the thickness of the entirety of the recorded matter to a total thickness of 0.84 mm or less described in JIS 6301 when a plastic card is used as the image support.

[1-4] Laminated Structure:

As illustrated in FIG. 2, the first transfer material has a laminated structure in which the base material sheet 50 and the coloring material-receiving layer 53 are sequentially laminated. The phrase "the base material sheet and the coloring material-receiving layer are sequentially laminated" means that the base material sheet and the coloring material-receiving layer are laminated in the stated order irrespective of whether or not any other layer is interposed between the base material sheet and the coloring material-receiving layer. That is, a structure in which the releasing layer 51 is present between the base material sheet 50 and the coloring material-receiving layer 53 like the transfer material 1 illustrated in FIG. 3 is also included in the laminated structure in which "the base material sheet and the coloring material-receiving layer are sequentially laminated."

However, the first transfer material preferably has a laminated structure in which the base material sheet 50 and the coloring material-receiving layer 53 abut with each other as illustrated in FIG. 2. That is, a structure in which no other layer (including a sheet) is interposed between the base material sheet 50 and the coloring material-receiving layer 53 is preferred. This is because of the following reason. There are strict limitations on the thicknesses of a credit card and the like each serving as an object of the recorded matter. Accordingly, the recorded matter is desirably thinned by reducing the number of layers or sheets to be laminated. In particular, the adhesive property between the image support and the coloring material-receiving layer can be controlled by precisely adjusting the SP value of the coloring material-receiving layer with the polyvinyl alcohol and the cationic resin to be incorporated into the coloring material-receiving layer. Such construction has an advantage in that the transfer material, and by extension, the recorded matter can be thinned.

[1-5] Manufacturing Method:

The first transfer material can be manufactured by, for example, applying a coating liquid containing the inorganic fine particles, the water-soluble resin, and the cationic resin to the base material sheet. It should be noted in the following description, a matter that has already been described in, for example, the section of the transfer material is omitted, and only a matter intrinsic to the manufacturing method is described.

[1-5-1] Coating Liquid:

The coloring material-receiving layer is obtained by: mixing at least the inorganic fine particles, the water-soluble resin, and the cationic resin with a proper medium to prepare a coating liquid; applying the liquid to the surface of the base material sheet; and drying the liquid to form the coloring material-receiving layer.

An aqueous medium is preferably used as the medium of the coating liquid. Examples of the aqueous medium can include: water; and a mixed solvent of water and a water-soluble organic solvent. Examples of the water-soluble organic solvent can include: alcohols, such as methanol, ethanol, and propanol; lower alkyl ethers of a polyhydric alcohol, such as ethylene glycol monomethyl ether and ethylene glycol dimethyl ether; ketones, such as acetone and methyl ethyl ketone; and ethers, such as tetrahydrofuran.

A coating liquid further containing a thermofusible resin is preferably used as the coating liquid. A material to be listed in the section of the primer layer, in particular, a thermoplastic resin having a glass transition temperature of 60° C. or more and 160° C. or less is preferably used as the thermofusible resin. In addition, a polyolefin resin or the like is preferably incorporated into the coating liquid for improving the wettability of the coating liquid and improving its binding property. Of the polyolefin resins, polyethylene is preferably incorporated. Examples of the polyethylene can include low-density polyethylene (LDPE) and high-density polyethylene (HDPE). However, linear low-density polyethylene (LLDPE), polypropylene, or the like can also be used.

Various additives can be incorporated into the coating liquid as long as the effects of the present invention are not impaired. When a dye ink is used as the ink with which the reverse image is recorded, a dye-sticking agent is preferably incorporated. The dye-sticking agent bonds to an anionic group of a dye molecule to form a salt, thereby making the dye insoluble in water. Thus, the migration of the dye can be prevented.

Examples of the other additives can include a surfactant, a pigment dispersant, a thickener, an antifoaming agent, an ink-fixing agent, a dot adjustor, a colorant, a fluorescent brightening agent, an antioxidant, a UV absorber, an antiseptic, and a pH adjustor.

The concentration of the inorganic fine particles in the coating liquid only needs to be appropriately determined in consideration of, for example, the applicability of the coating liquid, and is not particularly limited. However, the concentration is preferably set to 10 mass % or more and 30 mass % or less with respect to the total mass of the coating liquid.

[1-5-2] Application:

The coloring material-receiving layer is formed by, for example, applying the coating liquid to the surface of the base material sheet. After the application, the coating liquid is dried as required. Thus, the transfer material 1 having such a laminated structure in which the base material sheet 50 and the coloring material-receiving layer 53 are sequentially laminated as illustrated in FIG. 2 can be obtained.

A conventionally known application method can be used as an application method. Examples thereof can include a blade coating method, an air knife coating method, a curtain coating method, a slot die coating method, a bar coating method, a gravure coating method, and a roll coating method.

The coating weight of the coating liquid is preferably set to 10 g/m$^2$ or more and 40 g/m$^2$ or less in terms of a solid content. Setting the coating weight to 10 g/m$^2$ or more, preferably 15 g/m$^2$ or more enables the formation of a coloring material-receiving layer excellent in absorbability of water in the ink. Therefore, an inconvenience such as the flow of the ink in a recorded image or the bleeding of the image can be suppressed. Meanwhile, when the coating weight is set to 40 g/m$^2$ or less, more preferably 20 g/m$^2$ or less, the curl of the transfer material hardly occurs upon drying of the applied layer. In addition, the thickness of the recorded matter to be finally formed can be reduced by reducing the thickness of the coloring material-receiving layer. When the image support is a plastic card, such as a credit card, it is effective to adopt the coating weight because the thickness of the card is strictly specified by Japanese Industrial Standards (JIS-X-6305).

Figure 4:
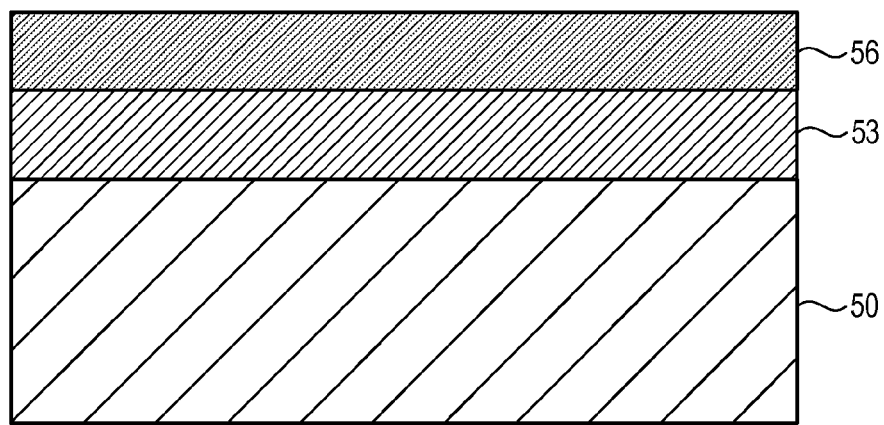
FIG. 4 is a sectional view for schematically illustrating an image support with a coloring material-receiving layer of the present invention.

[1-6] Primer Layer:

A primer layer 56 may be further arranged on the surface of the coloring material-receiving layer 53 of the first transfer material as illustrated in FIG. 4. When the transfer material includes the primer layer, the transfer material has a laminated structure in which the base material sheet, the ink-receiving layer, and the primer layer are sequentially laminated. The primer layer 56 is a layer having an adhesive property and is arranged on the surface of the coloring material-receiving layer. In this case, the layer to be brought into abutment with the image support is the primer layer. When the transfer material includes the primer layer, adhesiveness and an adhesive strength between the image support 55 and the transfer material can be improved, and hence the following inconvenience can be suppressed: the transfer material peels from the image support owing to an insufficient adhesive strength. Arranging the primer layer can control the difference SP2 between the SP value of the primer layer and the SP value of the image support to the range represented by the general formula (1), and hence can improve the adhesiveness and the adhesive strength. Accordingly, the following inconvenience can be suppressed: the coloring material-receiving layer peels from the image support. In particular, when a PET base material except a PVC base material or a PET-G base material is used as the image support, it is effective to arrange the primer layer.

A constituent material of the primer layer is not particularly limited. However, the layer is preferably formed of a material that expresses an adhesive property when heated, such as a thermoplastic synthetic resin, a natural resin, a rubber, or a wax. More specific examples thereof can include: cellulose derivatives, such as ethylcellulose and cellulose acetate propionate; styrene-based resins, such as polystyrene and poly(α-methylstyrene); acrylic resins, such as polymethyl methacrylate and polyethyl acrylate; vinyl-based resins, such as polyvinyl chloride, polyvinyl acetate, a vinyl chloride-vinyl acetate copolymer, polyvinyl butyral, and polyvinyl acetal; other synthetic resins, such as polyester, polyamide, an epoxy resin, polyurethane, an ionomer, an ethylene-acrylic acid copolymer, and an ethylene-acrylate copolymer; tackifiers, such as rosin, a rosin-modified maleic acid resin, and ester gum; and synthetic rubbers, such as a polyisobutylene rubber (butyl rubber), an styrene-butadiene rubber, a butadiene-acrylonitrile rubber, and chlorinated polyolefin.

When the primer layer is formed of a thermoplastic resin, the glass transition temperature of the thermoplastic resin is preferably 60° C. or more and 160° C. or less. When the glass transition temperature is set to 60° C. or more, preferably 70° C. or more, the primer layer seldom melts owing to an ambient temperature in the apparatus, and hence strict temperature management becomes unnecessary and the handling of the transfer material can be facilitated. Meanwhile, when the glass transition temperature is set to 160° C. or less, preferably 140° C. or less, more preferably 100° C. or less, the adhesive property between the coloring material-receiving layer and the image support improves even in the case where the transfer material is heated to the temperature at which the primer layer exhibits its adhesive property. In addition, the curl of the recorded matter can be suppressed.

Examples of the thermoplastic resin having a glass transition temperature of 60° C. or more and 160° C. or less can include polyamide, an acrylic resin, a vinyl chloride resin, a vinyl chloride-vinyl acetate copolymer, and polyester. Those resins are preferred because of their satisfactory thermal adhesion properties.

In the primer layer, one kind of the materials can be used alone, or two or more kinds thereof can be used as a mixture. In addition, the thickness of the primer layer only needs to be appropriately set in consideration of, for example, the kind of its constituent material, required adhesion performance, and the applicability of a liquid for forming the layer, and is not particularly limited. However, the thickness of the primer layer is preferably 0.5 µm or more and 10 µm or less. When the thickness of the primer layer is set to 0.5 µm or more, preferably 1.0 µm or more, a satisfactory adhesive property can be obtained even in the case where an image support having a rough surface like a paper-based support is used. Meanwhile, when the thickness of the primer layer is set to 10 µm or less, preferably 5 µm or less, the following effect can be obtained in the case where a plastic card is used as the image support: the thickness of the entirety of the recorded matter is suppressed to a total thickness of 0.84 mm or less described in JIS 6301.

A method of forming the primer layer is not particularly limited. However, the primer layer is preferably formed by: laminating a sheet formed of a material listed in the section of the primer layer, in particular, the thermoplastic resin having a glass transition temperature of 60° C. or more and 160° C. or less on the transfer material to produce a laminate; thermally pressure-bonding the laminate; and peeling a base material supporting the primer layer. Examples of a method for the thermal pressure bonding can include: a method involving entirely heating the laminate with a heat roller; and a method involving selectively heating a specific portion of the laminate with a thermal head.

[1-7] Shape and Thickness of Transfer Material:

The transfer material may have a roll shape or a sheet shape (cut sheet shape) in accordance with the structure of an image-recording apparatus or an apparatus for manufacturing the recorded matter. When the transfer material has a roll shape, the coloring material-receiving layer may be arranged on an outer side or an inner side, but the transfer material is preferably a roll-shaped transfer material rolled into a roll shape in which the coloring material-receiving layer is arranged on the outer side and the base material sheet is arranged on the inner side in order to optimize the transfer material for the conveying mechanism of the image-recording apparatus.

The thickness of the base material sheet is preferably 1.5 times or more and 5 times or less as large as the thickness of the coloring material-receiving layer. Setting the thickness of the base material sheet to a value 1.5 times or more as large as the thickness of the coloring material-receiving layer can prevent the transfer material of a sheet shape (cut sheet shape) from curl, and hence can improve the conveyability of the transfer material in the image-recording apparatus or the apparatus for manufacturing the recorded matter. Meanwhile, setting the thickness of the base material sheet to a value 5 times or less as large as the thickness of the coloring material-receiving layer can improve the thermal transferability upon thermal pressure bonding of the transfer material onto the image support.

The first transfer material may be of a hot peeling type or may be of a cold peeling type. The hot peeling-type transfer material has the following characteristic: after the image support and the transfer material have been thermally pressure-bonded, it is optimum to peel the base material sheet under a state in which the temperature of a laminate of both the members is high. On the other hand, the cold peeling-type transfer material has the following characteristic: after the image support and the transfer material have been thermally pressure-bonded, it is optimum to peel the base material sheet under a state in which the temperature of the laminate of both the members is reduced.

The hot peeling-type transfer material is excellent in terms of productivity because the base material sheet can be peeled immediately after the transfer material has been thermally pressure-bonded onto the image support. For example, the productivity can be improved by using the roll-shaped transfer material and peeling the base material sheet by a roll-to-roll process. On the other hand, in the cold peeling-type transfer material, the base material sheet can be peeled even after the temperature of the laminate of the image support and the transfer material obtained by thermally pressure-bonding both the members has reduced. Therefore, for example, when the transfer material of a sheet shape (cut sheet shape) is used, the transfer material is preferably the cold peeling-type transfer material because handling upon peeling of the base material sheet after the thermal pressure bonding of the image support and the transfer material becomes easy.

[1-8] Precut Process:

In the manufacture of the transfer material, after the formation of the coloring material-receiving layer, a precut process involving making a notch in the coloring material-receiving layer from a coloring material-receiving layer side may be performed. According to the precut process, even when the image support includes an IC chip or a magnetic stripe, the coloring material-receiving layer can be beautifully cut with the notch as a starting point after the transfer material and the image support have been bonded to each other.

[2] Method of Forming Image Support with Coloring Material-Receiving Layer:

The image support with a coloring material-receiving layer is an image recording medium including the image support 55 and the coloring material-receiving layer 53 as illustrated in FIG. 1 (the image support with a coloring material-receiving layer is hereinafter sometimes referred to as "image recording medium"). The image recording medium can be easily obtained by thermally pressure-bonding the first transfer material illustrated in FIG. 2 onto the image support 55 and peeling the base material sheet 50.

[2-1] Image Support:

The image support is an object on which the image of the transfer material is to be supported, and is negatively charged in general. The construction of the image support is not particularly limited. Examples thereof can include an image support using a resin as a constituent material (resin-based support) and an image support using paper as a constituent material (paper-based support). Examples of the resin-based support can include resin cards, such as a credit card and an IC card. Examples of the paper-based support can include: paper books, such as a passport; and paper cards.

[2-1-1] Resin-Based Support:

The resin forming the resin-based support only needs to be appropriately selected depending on the applications of the image support, and is not particularly limited. Examples thereof can include: polyester resins, such as polyethylene terephthalate, polybutylene terephthalate, and a polyethylene terephthalate/isophthalate copolymer; polyolefin resins, such as polyethylene, polypropylene, and polymethylpentene; polyethylene fluoride-based resins, such as polyvinyl fluoride, polyvinylidene fluoride, polytetrafluoroethylene, and an ethylene-tetrafluoroethylene copolymer; aliphatic polyamide resins, such as nylon 6 and nylon 6,6; vinyl polymer resins, such as polyvinyl chloride, a vinyl chloride/vinyl acetate copolymer, an ethylene/vinyl acetate copolymer, an ethylene/vinyl alcohol copolymer, polyvinyl alcohol, and vinylon; cellulose-based resins, such as cellulose triacetate and cellophane; acrylic resins, such as polymethyl methacrylate, polyethyl methacrylate, polyethyl acrylate, and polybutyl acrylate; and other synthetic resins, such as polystyrene, polycarbonate, polyarylate, and polyimide.

The resin forming the resin-based support can be, for example, a biodegradable resin, such as aliphatic polyester, polycarbonate, polylactic acid, polyvinyl alcohol, cellulose acetate, or polycaprolactone. In addition, the resin-based support only needs to use the resin as a main constituent material, and can contain a material other than the resin, such as metal foil.

[2-1-2] Paper-Based Support:

The kind of the paper forming the paper-based support is also not particularly limited. Examples thereof include condenser paper, glassine paper, parchment paper, paper having a high size, synthetic paper (polyolefin- or polystyrene-based paper), woodfree paper, art paper, coated paper, cast-coated paper, wall paper, lining paper, synthetic resin- or emulsion-impregnated paper, synthetic rubber latex-impregnated paper, synthetic resin-internally added paper, paperboard, and cellulose fiber paper.

[2-1-3] Others:

The resin-based support and the paper-based support can each include, for example, an embossment, a sign, an IC memory (IC chip), an optical memory, a magnetic recording layer, a recording layer for preventing forgery and alteration (such as a pearl pigment layer, a watermark recording layer, or a micro character), an embossed recording layer, or an IC chip-hiding layer as required.

In addition, each of the resin-based support and the paper-based support can be formed as a single-layer member formed of any such material as described above, or can be formed as a multilayer member obtained by bonding two or more sheets or films different from each other in material or thickness.

Further, the thickness of the entire image support is preferably 180 µm or more and 800 µm or less. The thickness of the image support is set to preferably 180 µm or more, more preferably 500 µm or more, still more preferably 650 µm or more. Meanwhile, the thickness of the image support is set to preferably 800 µm or less, more preferably 770 µm or less. Such setting can control the thickness of the entirety of the recorded matter to a total thickness of 0.68 mm or more and 0.84 mm or less described in JIS 6301 when a plastic card is used as the image support.

Figure 5:
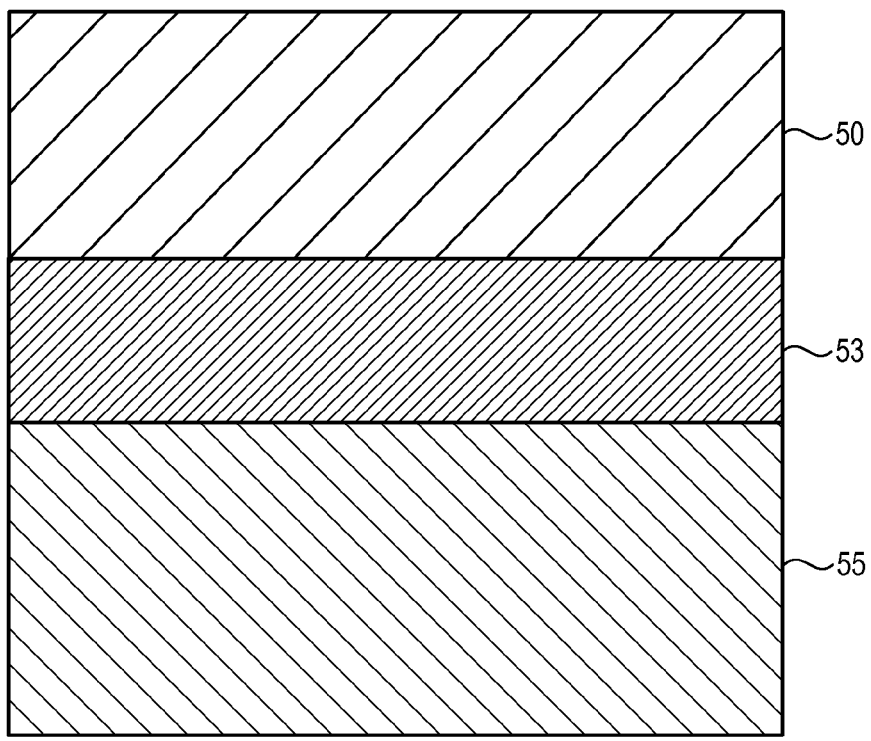
FIG. 5 is a sectional view for illustrating a state in which the first transfer material of the present invention is attached to an image support, and for schematically illustrating a section obtained by cutting a recording medium in its thickness direction.

[2-2] Method of Manufacturing Image Support with Coloring Material-Receiving Layer:

[2-2-1] Thermal Pressure Bonding:

First, as illustrated in FIG. 5, the image support 55 and the first transfer material are thermally pressure-bonded under a state of being brought into abutment with each other so that the image support 55, the coloring material-receiving layer 53, and the base material sheet 50 may be sequentially laminated. Thus, an image support with a coloring material-receiving layer having a laminated structure in which the image support, the coloring material-receiving layer, and the base material sheet are sequentially laminated is obtained. It should be noted that when the transfer material has a primer layer, the image support and the transfer material are thermally pressure-bonded under a state of being brought into abutment with each other so that the image support, the primer layer, the coloring material-receiving layer, and the base material sheet may be sequentially laminated.

The temperature at which the thermal pressure bonding is performed is preferably controlled to 60° C. or more and 160° C. or less. When the temperature at which the thermal pressure bonding is performed is set to 60° C. or more, the resin in the coloring material-receiving layer, such as the cationic resin or the water-soluble resin, or the thermoplastic resin in the primer layer (or an anchor layer) can be melted to an extent sufficient for bonding, and hence the image support and the transfer material can be pressure-bonded. Meanwhile, when the temperature at which the thermal pressure bonding is performed is set to 160° C. or less, upon thermal pressure bonding of the image support and the transfer material, the pores of the ink-receiving layer can be maintained without more collapse of the pores than is necessary, and hence the absorbability of an ink does not reduce.

A method for the thermal pressure bonding is not particularly limited. The following method can be given as an example thereof: a laminate is obtained by laminating the transfer material on the image support, the laminate is sandwiched between a pair of heat rollers, and the thermal pressure bonding is performed. At this time, the surface temperature of each heat roller is preferably set to 100° C. or more and 180° C. or less. Thus, even when the conveying speed of the laminate is so fast that a heating time cannot be sufficiently secured, the laminate can be heated to 60° C. or more and 160° C. or less.

Figure 12:
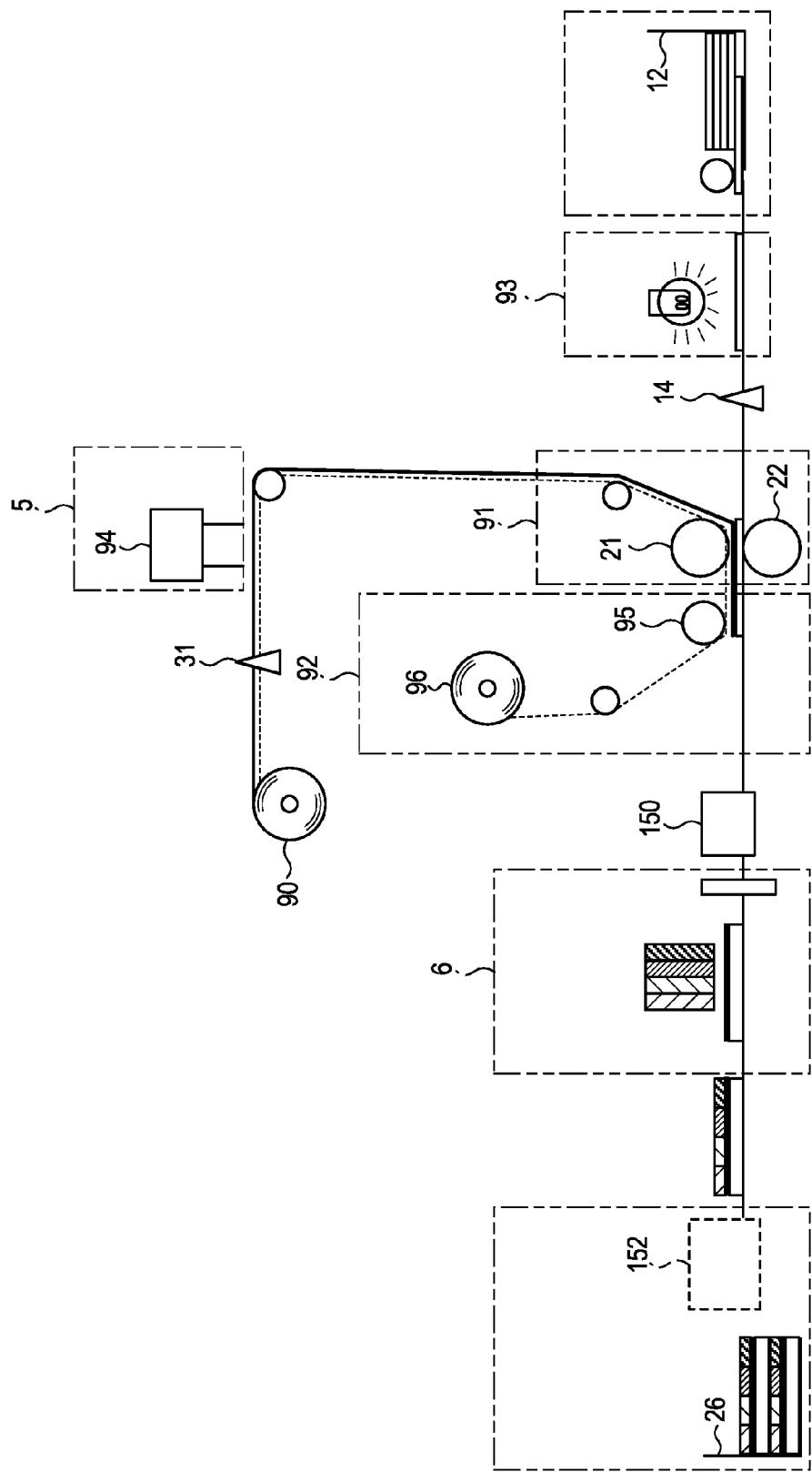
FIG. 12 is a side view for schematically illustrating an example of the construction of a first manufacturing apparatus for manufacturing a recorded matter of the present invention.

When such a manufacturing apparatus as illustrated in FIG. 12 is used, a silicone roller is preferably used as a heat roller 22 to be brought into contact with an image support side. The SP value of the silicone roller is around 8.7. Accordingly, the coloring material-receiving layer hardly adheres to the heat roller 22 even by the thermal pressure bonding with the heat roller 21 for heating the coloring material-receiving layer from a base material sheet side, and hence the transfer of the coloring material-receiving layer can be prevented.

Figure 6:
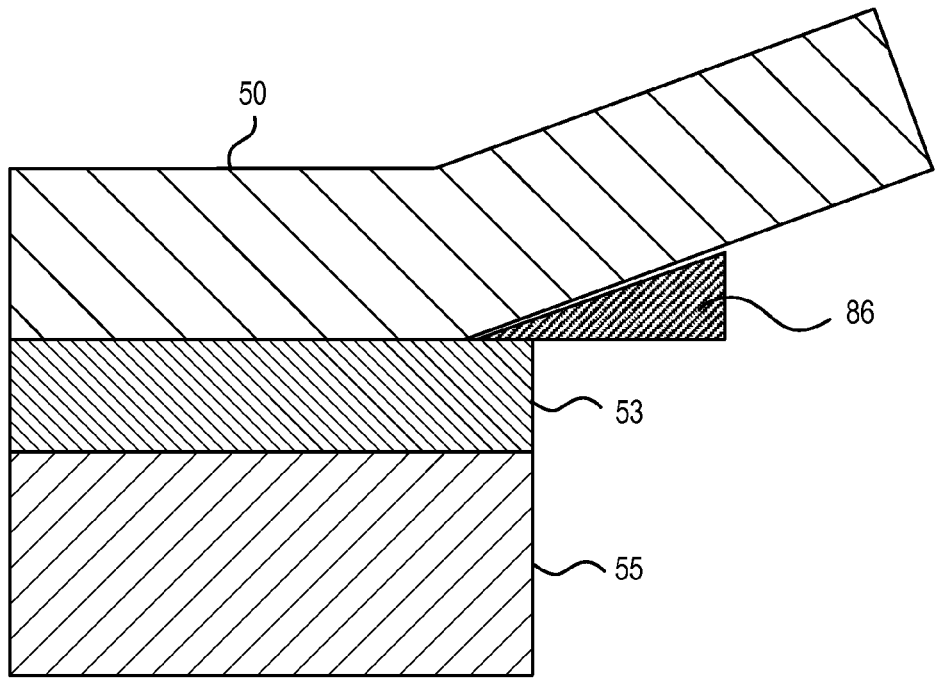
FIG. 6 is a sectional view for schematically illustrating the step of peeling a base material sheet from a laminate of the first transfer material of the present invention and the image support with a separation claw.
Figure 7:
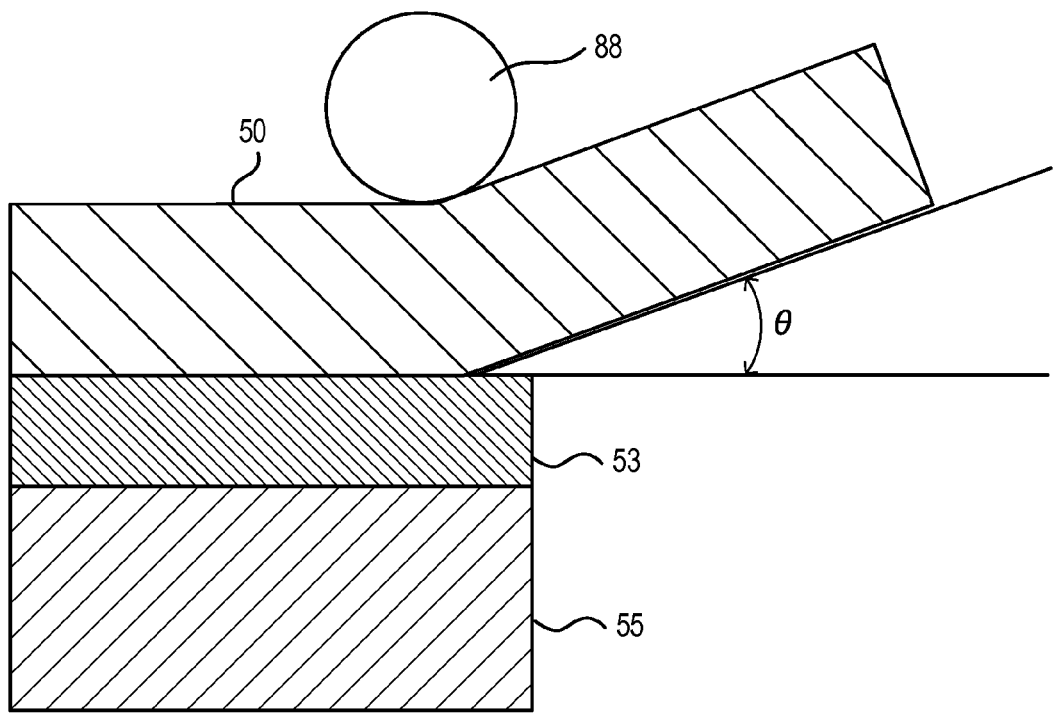
FIG. 7 is a sectional view for schematically illustrating the step of peeling the base material sheet from the laminate of the first transfer material of the present invention and the image support with a peeling roll.

[2-2-2] Peeling of Base Material Sheet:

Finally, the base material sheet 50 is peeled as illustrated in FIG. 6 and FIG. 7, whereby the image support with a coloring material-receiving layer having a structure in which the image support 55 and the coloring material-receiving layer 53 are sequentially laminated is obtained. In the image support with a coloring material-receiving layer, the coloring material-receiving layer 53 is positioned in the uppermost layer and an image can be recorded on the coloring material-receiving layer 53. It should be noted that when a primer layer is used, the image support 55 is sufficiently brought into close contact with, and fixed to, the coloring material-receiving layer 53 through the primer layer.

Upon peeling of the base material sheet, when the transfer material is of a hot peeling type, it is preferred that the peeling is immediately performed before the temperature reduces after the thermal pressure bonding. In the case of such hot peeling type, the peeling is preferably performed by a peeling mechanism based on a separation claw 86 illustrated in FIG. 6 or by the peeling roll 88 illustrated in FIG. 7. The hot peeling type is suitable in terms of productivity when the supply of the transfer material in a transferring step is performed by a "roll-to-roll" process.

On the other hand, when the transfer material is of a cold peeling type, the peeling can be performed even after the temperature has reduced. In such case, not only the peeling by the roll or the peeling mechanism but also manual peeling is available. Accordingly, the cold peeling type can be suitably used particularly when a transfer material processed into a cut sheet shape is used. It should be noted that a peeling angle θ upon performance of the peeling by the roll-to-roll process is from 0° to 165°, more preferably from 0° to 90°. Setting the peeling angle θ as described above can prevent a patch portion separated by the precut process of the transfer material 1 in a precut process portion 5 from peeling or being turned up casually during the running of a printer. In FIG. 7, the peeling angle θ is an angle illustrated in the figure but is not limited thereto.

In the thermal pressure bonding and peeling steps, known laminating machines of a two-roll type and a four-roll type may be used. A laminating machine of a four-roll type is preferably used because as compared to a laminating machine of a two-roll type, heat at the time of the thermal pressure bonding can be easily transferred, and hence the transferring and peeling steps can be easily performed.

Figure 8:
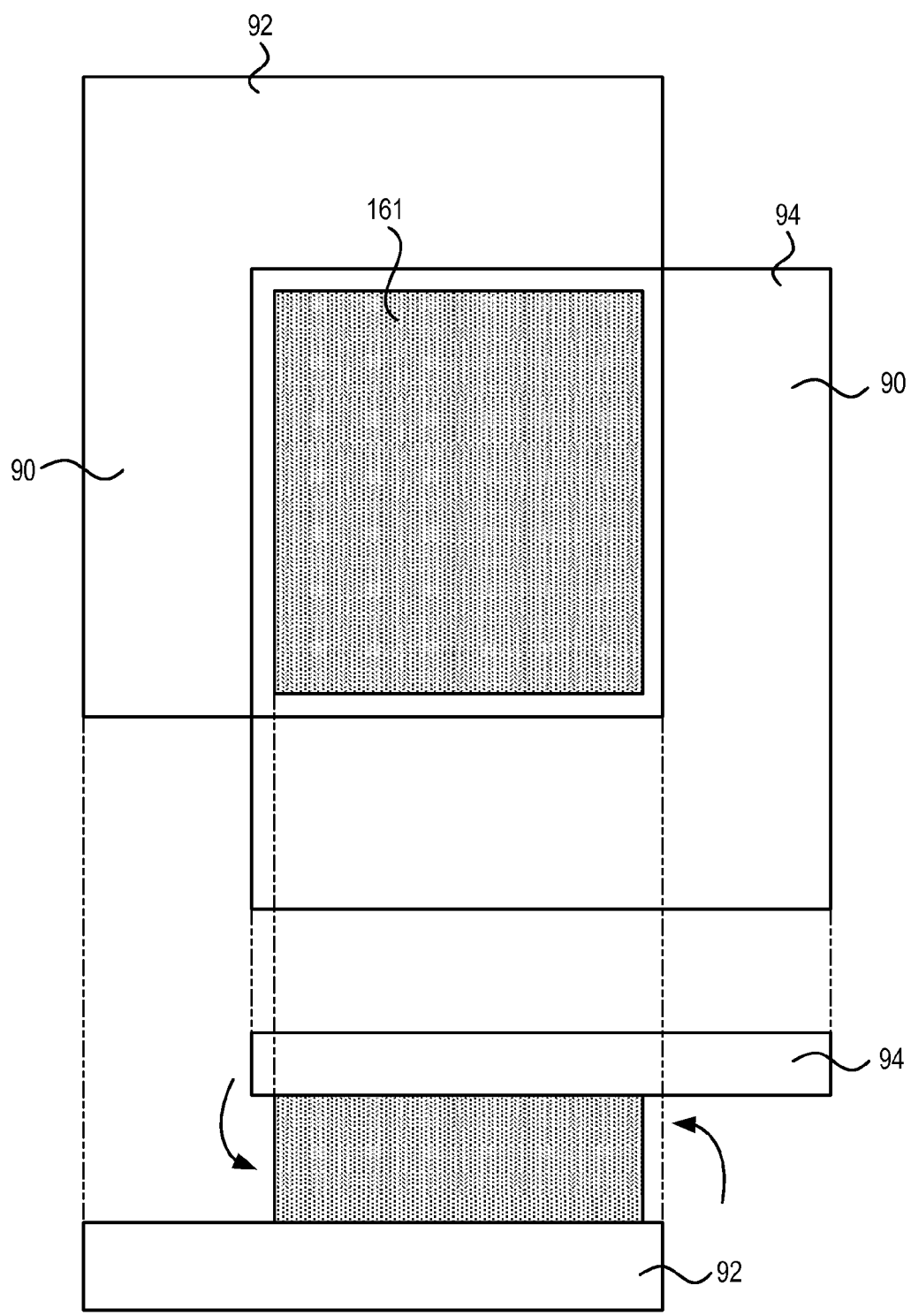
FIG. 8 is a top view and a side view for schematically illustrating a state in which transfer materials are attached to both surfaces of an image support.

[2-2-3] Double-Sided Simultaneous Peeling:

When the coloring material-receiving layers are simultaneously transferred onto both surfaces of the image support, the film positions of an upper-surface transfer material 92 and a lower-surface transfer material 94 on a film are preferably shifted from each other as illustrated in FIG. 8. Thus, bonding between coloring material-receiving layers having the same SP value in heat roller transfer can be prevented, and hence the printed products can be simultaneously transferred onto the front and back surfaces of the image support. In addition, the base material sheet can be easily peeled with a peeling portion 90.

[3] Manufacture of Recorded Matter:

A first recorded matter can be obtained by forming an image on the coloring material-receiving layer positioned in the uppermost layer of an image support with a coloring material-receiving layer.

Figure 9:
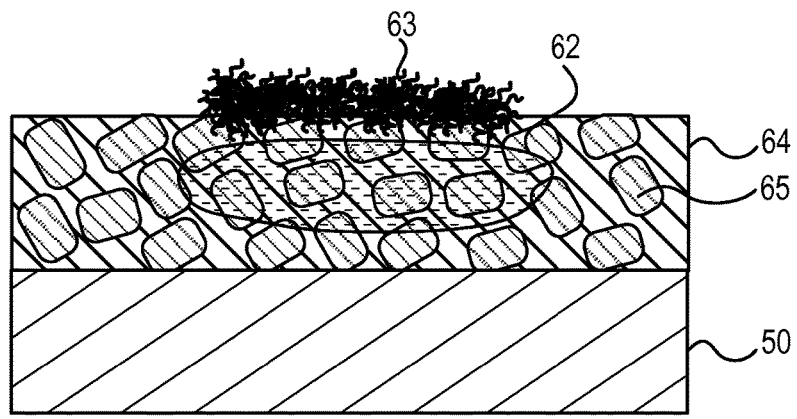
FIG. 9 is a sectional view for schematically illustrating a state in which a pigment ink is fixed to a gap absorption-type coloring material-receiving layer.
Figure 10:
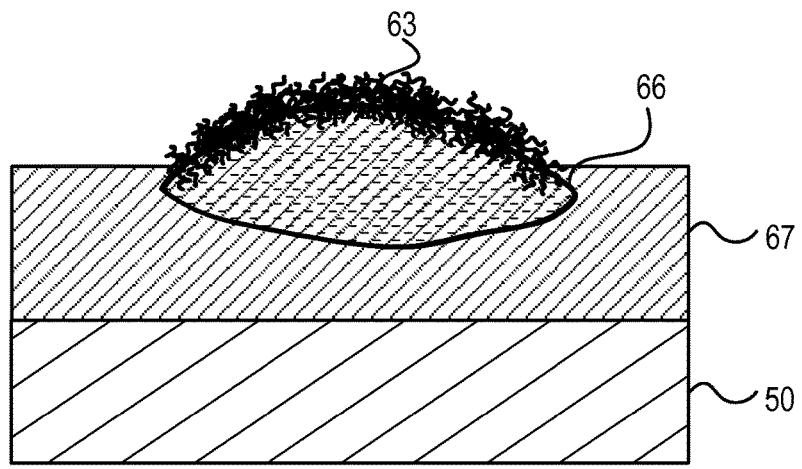
FIG. 10 is a sectional view for schematically illustrating the swollen state of a swelling absorption-type coloring material-receiving layer after the fixation of the ink to the coloring material-receiving layer.

[3-1] Coloring Material:

In the recorded matter, the image may be an image formed with a dye ink, or may be an image formed with a pigment ink. In the case of the dye ink, the recorded matter is excellent in rubfastness because the ink permeates even the inside of the coloring material-receiving layer. The foregoing contents are described in more detail. A pigment component 63 in the pigment ink has a large particle diameter. Accordingly, as illustrated in FIG. 9, in a gap absorption-type coloring material-receiving layer 64, the pigment component 63 does not permeate the insides of pores formed of inorganic fine particles 65 forming the coloring material-receiving layer 64, but is fixed to the recording surface of the coloring material-receiving layer 64. Further, unlike a swelling type coloring material-receiving layer, the gap absorption-type coloring material-receiving layer 64 does not swell and hence the coloring material-receiving layer 64 is kept smooth. On the other hand, in the case of a swelling absorption-type coloring material-receiving layer, as illustrated in FIG. 10, the coloring material-receiving layer 67 swells owing to water in the ink, and hence unevenness occurs on the surface 66 of the coloring material-receiving layer 67.

Figure 11:
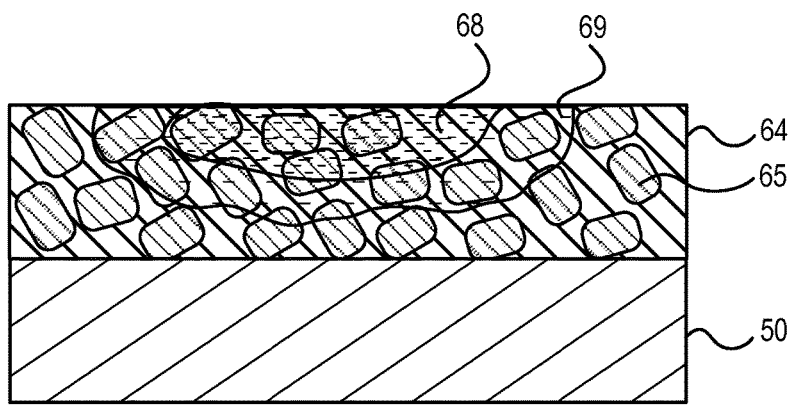
FIG. 11 is a sectional view for schematically illustrating a state in which a dye ink migrates after the fixation of the dye ink to the gap absorption-type coloring material-receiving layer.

In addition, in the gap absorption-type coloring material-receiving layer 64, the pigment component 63 in the pigment ink is fixed to the surface of the coloring material-receiving layer 64. Meanwhile, a water and solvent component 62 in the ink permeate the inside of the coloring material-receiving layer 64 to undergo separation (solid-liquid separation) from the pigment component 63 on the surface. Thus, the remaining water and solvent component 62 remain in the coloring material-receiving layer 64. Accordingly, the pigment component 63 is not brought into contact with the remaining water and solvent component 62 again, and hence the movement (migration) of the ink can be prevented. On the other hand, in the dye ink, as illustrated in FIG. 11, a dye component 68 moves (migrates) like a dye component 69 owing to an influence of the remaining water, and hence bleeding occurs.

In addition, a self-dispersible pigment having bonded thereto at least one kind of functional group out of a carbonyl group, a carboxyl group, a hydroxyl group, and a sulfone group, or a salt thereof, and a resin dispersion-type pigment obtained by covering the peripheries of pigment particles with a resin can each be used as the pigment component in the pigment ink. Of those, the resin dispersion-type pigment obtained by covering the peripheries of the pigment particles with the resin is preferred because the rubfastness after printing improves. In addition, the use of the resin dispersion-type pigment can increase a binding force between the pigment particles after the separation of an ink medium, and hence enables the formation of a pigment film on the surface of the coloring material-receiving layer. At this time, the amount of water on the surface of the pigment film becomes small. This is because the pigment film substantially blocks the water of a lower layer in the coloring material-receiving layer, and substantially blocks water supply from the lower layer. Accordingly, the resin dispersion-type pigment component is suitable for the high-speed fixation and high-speed recording of the ink, and is hence preferred.

The resin for covering the peripheries of the pigment particles is preferably a (meth)acrylate-based copolymer having an acid value of 100 mgKOH/g or more and 160 mgKOH/g or less. Setting the acid value to 100 mgKOH/g or more improves ejection stability in an inkjet recording system in which the ink is ejected by a thermal system. Meanwhile, setting the acid value to 160 mgKOH/g or less causes the resin to have hydrophobicity relative to the pigment particles, thereby improving the fixability and bleeding resistance of the ink. Therefore, the resin is suitable for the high-speed fixation and high-speed recording of the ink.

Herein, the acid value is the amount (mg) of KOH needed for neutralizing 1 g of a resin, and can be an indicator representing the hydrophilicity of the resin. It should be noted that the acid value in this case can be determined from a composition ratio between the respective monomers forming a resin dispersant by calculation. With regard to a specific method of measuring the acid value of a pigment dispersion, the acid value can be determined by potentiometric titration or can be measured with, for example, Titrino (manufactured by Metrohm).

The pigment ink is the so-called aqueous pigment ink. In the aqueous pigment ink, the pigment is dispersed in a water-soluble medium. In addition, the pigment ink is of a type called a pigment-resin dispersion type, and is a pigment ink obtained by causing a (meth)acrylate-based copolymer of a random structure to adsorb to the surface of each pigment particle and dispersing the pigment particles in an aqueous medium. With regard to its manufacturing method, the pigment ink can be obtained by an ordinary method, e.g., a method disclosed in Japanese Patent No. 4956917.

[3-1-1] Pigment:

Examples of the pigment include carbon black and an organic pigment. One kind of the various pigments can be used alone, or two or more kinds thereof can be used in combination. Specific examples of the carbon black include carbon black pigments, such as furnace black, lamp black, acetylene black, and channel black. For example, those carbon black pigments have brand names such as Raven (manufactured by Aditya Birla), Black Pearls L, Regal, Mogul L, Monarch, and Valcan (each of which is manufactured by Cabot Corporation), Color Black, Printex, and Special Black (each of which is manufactured by Evonik), and MITSUBISHI Carbon Black (manufactured by Mitsubishi Chemical Corporation) as trade names. The pigment is not limited thereto and conventionally known carbon black can also be used. Carbon black having the following physical properties is preferred: a primary particle diameter of 10 nm or more and 40 nm or less, a specific surface area by a BET method of 50 $m^2/g$ or more and 400 $m^2/g$ or less, a DBP oil absorption of 40 ml/100 g or more and 200 ml/100 g or less, a volatile content of from 0.5% to 10%, and a pH of from 2 to 9. It should be noted that the DBP oil absorption is measured by the JIS K 6221 A method.

Specific examples of the organic pigment can include: insoluble azo pigments, such as Toluidine Red, Toluidine Maroon, Hamza Yellow, Benzidine Yellow, and Pyrazolone Red; soluble azo pigments, such as Lithol Red, Helio Bordeaux, Pigment Scarlet, and Permanent Red 2B; derivatives of vat dyes, such as alizarin, indanthrone, and Thioindigo Maroon; phthalocyanine-based pigments, such as Phthalocyanine Blue and Phthalocyanine Green; quinacridone-based pigments, such as Quinacridone Red and Quinacridone Magenta; perylene-based pigments, such as Perylene Red and Perylene Scarlet; isoindolinone-based pigments, such as Isoindolinone Yellow and Isoindolinone Orange; imidazolone-based pigments, such as Benzimidazolone Yellow, Benzimidazolone Orange, and Benzimidazolone Red; pyranthrone-based pigments, such as Pyranthrone Red and Pyranthrone Orange; thioindigo-based pigments; and condensed azo-based pigments; and other pigments, such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red, and Dioxazine Violet.

In addition, the following organic pigments can be given as examples with color index (C.I.) numbers. Conventionally known organic pigments as well as the following organic pigments can be used.

C.I. Pigment Yellow 12, 13, 14, 17, 20, 24, 74, 83, 86, 93, 109, 110, 117, 120, 125, 128, 137, 138, 147, 148, 151, 153, 154, 166, or 168.
C.I. Pigment Orange 16, 36, 43, 51, 55, 59, or 61.
C.I. Pigment Red 9, 48, 49, 52, 53, 57, 97, 122, 123, 149, 168, 175, 176, 177, 180, 192, 215, 216, 217, 220, 223, 224, 226, 227, 228, 238, or 240.
C.I. Pigment Violet 19, 23, 29, 30, 37, 40, or 50.
C.I. Pigment Blue 15, 15:1, 15:3, 15:4, 15:6, 22, 60, or 64.
C.I. Pigment Green 7 or 36.
C.I. Pigment Brown 23, 25, or 26.

[3-1-2] Resin:

The resin to be used in the pigment dispersion preferably has a dispersing function of satisfactorily dispersing a hydrophobic pigment in an aqueous liquid medium, and a random copolymer is used. Resins except the random copolymer, such as a block copolymer, are not preferred because many of the resins raise the hydrophilicity of the pigment and are each poor in water resistance of a printed image.

For example, a (meth)acrylate-based copolymer is preferably used as the random copolymer. The (meth)acrylate-based copolymer can be obtained by copolymerizing (meth) acrylic acid, a (meth)acrylate, and a monoethylenically unsaturated monomer capable of copolymerizing with these compounds. (Meth)acrylic acid is, for example, acrylic acid or methacrylic acid. Of those, (meth)acrylic acid is preferably used in consideration of the fact that the coexistence range of its electrically neutral state and its anion state can be controlled to be wide.

Examples of the (meth)acrylate include: alkyl (meth) acrylates, such as methyl (meth)acrylate, n-butyl (meth) acrylate, 2-ethylhexyl (meth)acrylate, n-octyl (meth)acrylate, dodecyl (meth)acrylate, octadecyl (meth)acrylate, cyclohexyl (meth)acrylate, and isobornyl (meth)acrylate; hydroxyalkyl (meth)acrylates, such as 2-hydroxyethyl (meth)acrylate, 2-hydroxypropyl (meth)acrylate, and 3-hydroxypropyl (meth)acrylate; alkylene glycol mono(meth) acrylates, such as diethylene glycol mono(meth)acrylate, triethylene glycol mono(meth)acrylate, polyethylene glycol mono(meth)acrylate, propylene glycol mono(meth)acrylate, dipropylene glycol mono(meth)acrylate, tripropylene glycol mono(meth)acrylate, tetramethylene ether glucol mono (meth)acrylate, a mono(meth)acrylate of polyethylene oxide-polypropylene oxide random polymer glycol or polyethylene oxide-polypropylene oxide block polymer glycol, and a mono(meth)acrylate of polyethylene oxide-polytetramethylene ether random polymer glycol or polyethylene oxide-polytetramethylene ether block polymer glycol; glycidyl (meth)acrylate; and benzyl (meth)acrylate.

In addition to the (meth)acrylic acid, the (meth)acrylate, and the monoethylenically unsaturated monomer, a styrene-based monomer can also be incorporated into the (meth) acrylate-based copolymer. Examples of the styrene-based monomer in this case include styrene, α-methylstyrene, o-methylstyrene, m-methylstyrene, p-methylstyrene, p-t-butylstyrene, 4-methoxystyrene, and 4-chlorostyrene. That is, the (meth)acrylate-based copolymer is preferably a styrene-(meth)acrylic acid-based copolymer having the styrene-based monomer.

With regard to the weight-average molecular weight of the (meth)acrylate-based copolymer, the weight-average molecular weight (Mw) in terms of styrene preferably falls within the range of from 6,000 to 12,000, and more preferably falls within the range of from 7,000 to 9,000. When the weight-average molecular weight is set to fall within the range, the dispersion stability of the pigment dispersion is improved and its viscosity can be set to a low value. In addition, the kogation of the ink in a heater portion is suppressed and hence printing can be stably performed for a long time period. A weight-average molecular weight of less than 6,000 is not preferred because the dispersion stability of the aqueous pigment dispersion itself reduces. In addition, a weight-average molecular weight of more than 12,000 is not preferred because of the following reason. The viscosity of the aqueous pigment dispersion increases and its dispersibility shows a tendency of reducing. Further, the kogation on the heater portion becomes severe, which is responsible for the occurrence of the non-ejection of an ink droplet from a nozzle tip of an inkjet printer of a thermal system.

[3-1-3] Pigment Dispersion:

The pigment dispersion is prepared by covering the pigment with the (meth)acrylate-based copolymer.

With regard to the average particle diameter of the pigment dispersion, a value determined by a dynamic light scattering method in the liquid is preferably 70 nm or more and 150 nm or less, more preferably 80 nm or more and 120 nm or less. A particle diameter of more than 150 nm is not preferred because the sedimentation of the ink is accelerated and hence the long-term dispersion stability of the pigment dispersion is impaired. On the other hand, a particle diameter of less than 70 nm is not preferred because color developability sufficient for the formation of an image and sufficient weatherability of the resultant image cannot be obtained.

With regard to a specific method of measuring the average particle diameter, the average particle diameter can be measured by using, for example, FPAR-1000 (manufactured by Otsuka Electronics Co., Ltd., analysis by a cumulant method) or Nanotrac UPA 150EX (manufactured by Nikkiso Co., Ltd., a 50% integrated value is adopted) utilizing the scattering of laser light.

The amount of the pigment dispersion to be added to the ink is preferably 0.5 mass % or more and 10 mass % or less, more preferably 1.0 mass % or more and 8.0 mass % or less, still more preferably 1.5 mass % or more and 6.0 mass % or less with respect to the total amount of the ink. When the pigment concentration is less than 0.5 mass %, color developability sufficient for the formation of an image cannot be obtained. In addition, a pigment concentration of more than 10.0 mass % is not preferred because the viscosity of the aqueous pigment ink increases and hence it becomes difficult to eject the ink.

In the aqueous pigment dispersion, from the viewpoints of maintaining the dispersibility of the dispersion and keeping the viscosity of the pigment ink at a low value, a ratio between the pigment and the (meth)acrylate-based copolymer is preferably as follows: the amount of the (meth)acrylate-based copolymer falls within the range of from 0.2 part to 1.0 part with respect to 1 part of the pigment in terms of mass.

Upon covering of the pigment with the (meth)acrylate-based copolymer, an acid precipitation step is preferably incorporated. Acid precipitation is to precipitate the (meth)acrylate-based copolymer by the following procedure: an acidic substance is added to a liquid medium containing the pigment and the (meth)acrylate-based copolymer dissolved in an aqueous solution of a basic substance to acidify the medium, thereby returning an anionic group in the (meth)acrylate-based copolymer to a functional group before neutralization.

In such acid precipitation step, a base and a salt are formed by acidifying the aqueous dispersion, which has been obtained through a dispersing step and a distilling step to be performed as required, through the addition of an acid, such as hydrochloric acid, sulfuric acid, or acetic acid. Thus, the (meth)acrylate-based copolymer in a dissolved state is precipitated on the surface of each pigment particle. The performance of the step can additionally improve an interaction between the pigment and the (meth)acrylate-based copolymer. As a result, the pigment dispersion can be caused to take such a form that microcapsule-type composite particles are dispersed in an aqueous dispersion medium. In addition, the aqueous pigment dispersion can be caused to fully exhibit additionally excellent effects in terms of physical properties, such as a level attained by dispersion, a time required for the dispersion, and dispersion stability, and in terms of use suitability, such as solvent resistance.

A filtering step of separating the precipitate, which has been obtained by improving the interaction as described above, by filtration is performed. More preferably, after the completion of the filtering step, a free polymer present in the pigment dispersion without adsorbing thereto is removed by performing a washing step of washing the precipitate. Then, a redispersing step of dispersing the residue in the aqueous medium together with the basic substance again is performed, whereby an aqueous pigment dispersion additionally excellent in dispersion stability can be obtained.

[3-1-4] Water-Soluble Compound:

The pigment ink is obtained by dispersing the pigment dispersion in at least a water-soluble compound. The kind of the water-soluble compound is not particularly limited, but the water-soluble compound is preferably at least one kind selected from the group consisting of a water-soluble organic solvent and a water-soluble compound that is solid at 25° C.

The term "water-soluble compound" means a compound that freely mixes with water or has a solubility (25° C.) in water of 20 g/100 g or more. The compound is at least one kind selected from the group consisting of the water-soluble organic solvent and the water-soluble compound that is solid at 25° C. The incorporation of the water-soluble compound can prevent the vaporization of water and hence can prevent the sticking of the ink due to drying.

Various water-soluble organic solvents including such alcohols, polyhydric alcohols, glycol ethers, carboxylic acid amides, heterocycles, ketones, and alkanolamines as listed below can each be used as the water-soluble compound. In addition, the water-soluble compound that is solid at 25° C. such as urea, ethylene urea, or trimethylolpropane can be used.

(1) Alcohols:

Linear alcohols each having 1 to 5 carbon atoms, such as methanol, ethanol, n-propyl alcohol, isopropyl alcohol, n-butyl alcohol, sec-butyl alcohol, isobutyl alcohol, tert-butyl alcohol, and n-pentyl alcohol.

(2) Polyhydric Alcohols:

Alkanediols, such as ethylene glycol (ethanediol), propanediol (1,2- or 1,3-), butanediol (1,2-, 1,3-, or 1,4-), 1,5-pentanediol, and 1,2-hexanediol; condensates of alkanediols, such as diethylene glycol, triethylene glycol, tetraethylene glycol, dipropylene glycol, tripropylene glycol, polyethylene glycol, and polypropylene glycol; and polyhydric alcohols other than the alkanediols, such as glycerin, trimethylolpropane, 1,2,6-hexanetriol, and thiodiglycol.

(3) Glycol Ethers:

A monomethyl ether of ethylene glycol; a monomethyl ether and a monoethyl ether of diethylene glycol; a monomethyl ether, a monoethyl ether, a monobutyl ether, a dimethyl ether, and a diethyl ether of triethylene glycol; and a dimethyl ether and a diethyl ether of tetraethylene glycol.

(4) Carboxylic Acid Amides:

N,N-dimethylformamide and N,N-dimethylacetamide.

(5) Heterocycles:

Cyclic ethers, such as tetrahydrofuran and dioxane; nitrogen-containing heterocycles, such as 2-pyrrolidone, N-methyl-2-pyrrolidone, and N-methylmorpholine; and a sulfur-containing heterocycles, such as sulfolane.

(6) Ureas:

Ureas, such as urea, ethyleneurea, and 1,3-dimethyl-2-imidazolidinone (N,N'-dimethylethyleneurea).

(7) Ketones:

Ketones, such as acetone and methyl ethyl ketone; and keto alcohols, such as 4-hydroxy-4-methyl-2-pentanone (diacetone alcohol).

(8) Alkanolamines:

Monoethanolamine, diethanolamine, and triethanolamine.

(9) Others:

Sulfur-containing compounds, such as dimethyl sulfoxide and bishydroxyethyl sulfone.

Of the water-soluble organic solvents, the polyhydric alcohols are preferred and glycerin is more preferred. Glycerin is preferred because glycerin hardly volatilizes and has an excellent preventing effect on the sticking of the ink. In addition, one kind of the water-soluble organic solvents may be used alone, or two or more kinds thereof may be used as a mixture. For example, it is also preferred to use glycerin, and a polyhydric alcohol except glycerin or a nitrogen-containing heterocycle in combination. At this time, triethylene glycol or the like can be used as the polyhydric alcohol except glycerin, and 2-pyrrolidone or the like can be used as the nitrogen-containing heterocycle. Such mixed solvent is preferred because of its high preventing effect on the thickening of the ink.

The content of the water-soluble organic solvent is not particularly limited. However, the content is set to preferably 5 mass % or more, more preferably 10 mass % or more, still more preferably 15 mass % or more with respect to the total mass of the ink in order to obtain the following effect: the vaporization of the aqueous medium is prevented and hence the sticking of the ink due to drying is prevented. Meanwhile, from the viewpoints of allowing the ink to correspond to a high drive frequency and preventing the occurrence of a mold, the content is set to preferably 50 mass % or less, more preferably 40 mass % or less, still more preferably 30 mass % or less with respect to the total mass of the ink.

Urea, ethylene urea, or the like is preferably used as the water-soluble compound that is solid at 25° C., and ethylene urea is more preferably used. The content of the water-soluble compound that is solid at 25° C. is not particularly limited. However, the content is set to preferably 5 mass % or more, more preferably 9 mass % or more with respect to the total mass of the ink in order to obtain the following effect: the vaporization of the aqueous medium is prevented and hence the sticking of the ink due to drying is prevented. Meanwhile, in order to prevent an inconvenience due to excessive addition of the compound, the content is set to preferably 40 mass % or less, more preferably 30 mass % or less, particularly preferably 15 mass % or less with respect to the total mass of the ink.

[3-1-5] Surfactant:

A surfactant may be incorporated into the ink as required for the purpose of controlling the surface tension of the ink to arbitrarily control the bleeding degree and permeability of the ink in an image recording medium, to improve the wettability of the ink in a head, to prevent the kogation of the ink on a heater surface, or to improve the ejection of the ink. Examples of such surfactant can include, but not particularly limited to, the following surfactants. It should be noted that one of the surfactants may be used alone, or two or more thereof may be used in combination.

[Nonionic Surfactant]

A polyoxyethylene alkyl ether, a polyoxyethylene fatty acid ester, a polyoxyethylene alkylphenyl ether, a polyoxyethylene/polyoxypropylene block copolymer, and the like. A fatty acid diethanolamide, an acetylene glycol ethylene oxide adduct, an acetylene glycol-based surfactant, and the like.

[Anionic Surfactant]

A polyoxyethylene alkyl ether sulfuric acid ester salt, a polyoxyethylene alkyl ether sulfonate salt, a polyoxyethylene alkylphenyl ether sulfuric acid ester salt, a polyoxyethylene alkylphenyl ether sulfonate salt, and the like. An α-sulfofatty acid ester salt, an alkylbenzenesulfonate salt, an alkylphenolsulfonate salt, an alkylnaphthalenesulfonate salt, an alkyltetralinsulfonate salt, a dialkylsulfosuccinate salt, and the like.

[Cationic Surfactant]

An alkyltrimethylammonium salt, a dialkyldimethylammonium chloride, and the like.

[Amphoteric Surfactant]

An alkylcarboxybetaine, or the like.

Of those, an acetylene glycol-based surfactant, a polyoxyethylene alkyl ether, or the like is particularly preferably used because the ejection stability of the ink can be improved.

A compound represented by the following general formula (7) (ethylene oxide adduct of 2,4,7,9-tetramethyl-5-decyne-4,7-diol) is used as the acetylene glycol-based surfactant.

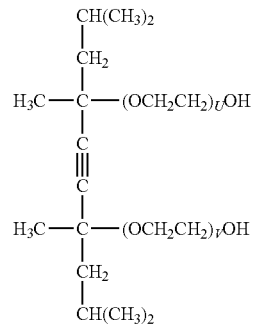

General Formula (7)

In the general formula (7), U and V each independently represent an integer of 1 or more and U+V is an integer of from 0 to 20.

[3-1-6] Water:

Deionized water (ion-exchanged water) is preferably used as water. The content of water is not particularly limited. However, the content is preferably 30 mass % or more and 90 mass % or less, more preferably 40 mass % or more and 85 mass % or less, still more preferably 50 mass % or more and 80 mass % or less with respect to the total mass of the ink. When the content is set to 10 mass % or more, the pigment and the water-soluble compound can be hydrated, and hence the agglomeration of the pigment and the water-soluble compound can be prevented. Meanwhile, when the content is set to 90 mass % or less, the amount of the water-soluble organic solvent relatively increases, and hence even when a volatile component (such as water) in the aqueous medium volatilizes, the dispersed state of the pigment can be maintained. Accordingly, the precipitation and solidification of the pigment can be prevented.

[3-1-7] Other Additives:

The ink may contain an additive except the surfactant depending on the purpose. Examples of such additive can include a pH adjustor, a rust inhibitor, an antiseptic, an antimold agent, an antioxidant, a reduction-preventing agent, and a salt.

[3-1-8] Viscosity:

A viscosity $\eta$ of the ink is preferably 1.5 mPa·s or more and 5.0 mPa·s or less, more preferably 1.6 mPa·s or more and 3.5 mPa·s or less, still more preferably 1.7 mPa·s or more and 3.0 mPa·s or less. Setting the viscosity to 1.5 mPa·s or more enables the formation of a satisfactory ink droplet. Meanwhile, setting the viscosity to 5.0 mPa·s or less improves the flowability of the ink and hence improves the property by which the ink is supplied to a nozzle, and by extension, the ejection stability of the ink.

The viscosity of the ink means a value measured in conformity with JIS Z 8803 under the condition of a temperature of 25° C. with an E-type viscometer (e.g., "RE-80L Viscometer" manufactured by Toki Sangyo Co., Ltd.). The viscosity of the ink can be adjusted by, for example, the kind or amount of the water-soluble organic solvent as well as the kind or amount of the surfactant.

[3-1-9] Surface Tension:

A surface tension $\gamma$ of the ink is preferably 25 mN/m or more and 45 mN/m or less. Setting the surface tension to 25 mN/m or more can maintain the meniscus of an ink ejection orifice and hence can prevent such an inconvenience that the ink flows out of the ink ejection orifice. In addition, setting the surface tension to 45 mN/m or less can optimize the rate at which the ink is absorbed in the image recording medium, and hence can prevent a fixation failure due to insufficient absorption of the ink.

The surface tension of the ink means a value measured at a temperature of 25° C. with an automatic surface tension meter (e.g., "Model CBVP-Z" manufactured by Kyowa Interface Science Co., Ltd.) by a plate method involving using a platinum plate. The surface tension of the ink can be adjusted by, for example, the addition amount of the surfactant, and the kind and content of the water-soluble organic solvent.

[3-1-10] pH:

The pH of the ink is set to preferably 7.5 or more and 10.0 or less, more preferably 8.5 or more and 9.5 or less. A pH of less than 7.5 is not preferred because the dispersion stability of the pigment particles deteriorates and hence the agglomeration of the pigment particles is liable to occur. On the other hand, a pH of more than 10.0 is not preferred because of the following reason. The pH of the ink is so high that some members of an apparatus to be used are brought into contact with the ink to cause chemical attack. Thus, organic matter or inorganic matter is eluted in the ink, with the result that an ejection failure occurs. The viscosity of the ink means a value measured under the condition of a temperature of 25° C. with a pH meter (e.g., D-51 manufactured by Horiba, Ltd.).

[3-2] Recording of Image:

Next, an image is recorded on the coloring material-receiving layer positioned in the uppermost layer of the image support with a coloring material-receiving layer. The image recording can be performed by an inkjet recording system.

[3-2-1] Inkjet Recording System:

The inkjet recording system is a system involving ejecting the ink (ink droplets) from a plurality of nozzles formed on a recording head onto a transfer material to record an image. The kind of the inkjet recording system is not particularly limited. However, a thermal inkjet recording system is preferred because a high-quality and high-resolution image can be recorded at a high speed. In the thermal inkjet recording system, a thermal energy in accordance with a driving pulse is applied to the ink in the nozzles to form air bubbles by film boiling, and the ink droplets are ejected from the nozzles by the air bubbles.

The inkjet recording system can be performed by an inkjet recording apparatus (inkjet printer). The inkjet printer is preferred because the recording head and the image support with a coloring material-receiving layer are not brought into contact with each other at the time of the image recording, and hence the printer can perform extremely stable image recording. The kind of the inkjet printer is not particularly limited. However, there is preferably used a full-line-type inkjet printer including a line head obtained by arraying many multi-nozzle heads, which are each obtained by integrating a plurality of nozzles each formed of, for example, an ink ejection orifice and an ink channel, so that the heads may be perpendicular to the conveying direction of the image support with a coloring material-receiving layer. The full-line-type inkjet printer simultaneously ejects the ink droplets from the ink ejection orifices of the plurality of nozzles in accordance with the conveyance of the image support with a coloring material-receiving layer to record an image. Accordingly, the printer can record a high-quality and high-resolution image at a high speed. That is why the printer is preferred.

A full-line head particularly preferably includes: a common liquid chamber with which a plurality of nozzle channels serving as a nozzle array communicate; an opening portion communicating to the common liquid chamber; a main liquid supply chamber communicating to the opening portion; a liquid supply path communicating to the main liquid supply chamber; a liquid supply chamber communicating to the liquid supply path; a supply filter arranged to separate the liquid supply chamber into a first liquid supply chamber and a second liquid supply chamber from an upstream side along a flow upon liquid supply; a gas-liquid separation portion arranged in part of the main liquid supply chamber; and an air chamber communicating to the gas-liquid separation portion. The nozzle channels, the common liquid chamber, the opening portion, the main liquid supply chamber, the liquid supply path, the liquid supply chamber, the supply filter, the gas-liquid separation portion, and the air chamber are arranged on a plane parallel to a plane including the direction in which the nozzle channels are arrayed and the direction in which a liquid is ejected. The main liquid supply chamber, the liquid supply path, the supply filter, the gas-liquid separation portion, and the air chamber are arranged without being laminated on each other. The full-line head is suitable for the resin dispersion-type pigment ink described above. That is, in the head having the gas-liquid separation portion, bubbles produced from the nozzles can be effectively removed. On the other hand, in high-speed printing, the physical properties of the ink need to be strictly adjusted because of, for example, the following problem: the ink is liable to thicken and hence its refill performance reduces. However, the resin dispersion-type pigment ink can facilitate the adjustment.

The ejection amount of the ink from the recording head is preferably 20 pl or less. The ejection amount of the ink is set to 20 pl or less, preferably 10 pl or less, more preferably 5 pl or less. Thus, when a protective layer is formed by a laminating step, abrupt vaporization of an ink component is suppressed, and hence inconveniences such as a reduction in adhesive strength between the image support and the transfer material, and the remaining of the air bubbles in the coloring material-receiving layer can be prevented. In addition, as the ejection amount is made smaller, the spread of the ink in the coloring material-receiving layer can be suppressed to a larger extent, and hence a dense image having a sufficient density can be recorded. Further, the thickness of an image layer (ink layer) can be suppressed to a larger extent.

In addition, a serial head-type inkjet printer configured to sequentially convey recording media while causing a recording head to move and scan relative to a recording surface may be used. The serial head printer has sufficient superiority over a printer of a thermal transfer system in recording speed and can reduce a liquid droplet in size, and hence can easily produce a high-quality image.

[7-1] First Manufacturing Apparatus:

FIG. 12 is a side view for schematically illustrating a first construction example of a manufacturing apparatus for manufacturing the recorded matter (hereinafter sometimes referred to as "first manufacturing apparatus").

[7-1-1] Main Construction:

The first manufacturing apparatus includes, for example, an image support-supply portion 12, a transfer material-supply portion, a precutting portion 94, a receiving layer-transferring portion 91, a peeling portion 92, a decurling portion 150, a recording portion 6, a reversing apparatus 152, and a discharge portion 26.

The image support-supply portion 12 is configured to feed the image support 55 to a conveying path. The transfer material-supply portion is configured to feed, to the conveying path, a first transfer material 90 that has a roll shape and rolled so that a coloring material-receiving layer may be arranged on an outer side. The precutting portion 94 is configured to subject the ink-receiving layer to a precut process. The receiving layer-transferring portion 91 is configured to transfer the transfer material onto the surface of the image support 55. The peeling portion 92 is configured to peel the base material sheet of the transfer material to provide an image support with a coloring material-receiving layer. The decurling portion 150 is configured to correct the curl of the image support. The recording portion 6 is configured to directly eject an aqueous ink containing, for example, a coloring material, water, and a nonvolatile organic solvent onto the image support with a coloring material-receiving layer to record an image. The reversing apparatus 152 is configured to reverse the image support with a coloring material-receiving layer upon performance of duplex printing. The discharge portion 26 is configured to accumulate the discharged recorded matter having recorded thereon the image.

[7-1-2] Operation:

The supply portion rotates and feeds the first transfer material that has a roll shape and is rolled so that the ink-receiving layer may be arranged on its outer surface. When the conveyance of the transfer material is started, the position of the transfer material is detected by a sensor 31 and the precut process of the coloring material-receiving layer is performed in the precut process portion 5.

The image support-supply portion 12 supplies the image support 55 to a preheating portion 93 one by one. In the preheating portion, the image support is heated in order to improve its adhesiveness to the transfer material. Further, a registration guide 14 performs registration between the image support and the transfer material. After that, the image support is laminated on the transfer material with a coloring material-receiving layer.

The image support is supplied to an adhesion portion. The adhesion portion includes the pair of heat rollers 21 and 22. The transfer material subjected to the precut process is laminated on the image support upon its passage through the pair of heat rollers 21 and 22, whereby the image support and the transfer material are thermally pressure-bonded. Simultaneously with the foregoing, in the peeling portion 92, the base material sheet forming the transfer material is peeled by a peeling roll 95 and the base material sheet is rolled around a take-up roll 96. At this time, the transfer material is supported by a guide roll. Through such operations, the image support with a coloring material-receiving layer can be obtained. The curl of the image recording medium with a coloring material-receiving layer is corrected in the decurling portion 150, the image is recorded on the coloring material-receiving layer in the recording portion 6, and the recorded matter is discharged to the discharge portion 26.

Upon performance of the duplex printing, the image support is reversed by the reversing apparatus 152 and the image support is fed back to the registration guide 14. After that, back surface printing is performed through the same steps as those of front surface printing. Through such operations, the recorded matter can be obtained.

Figure 13:
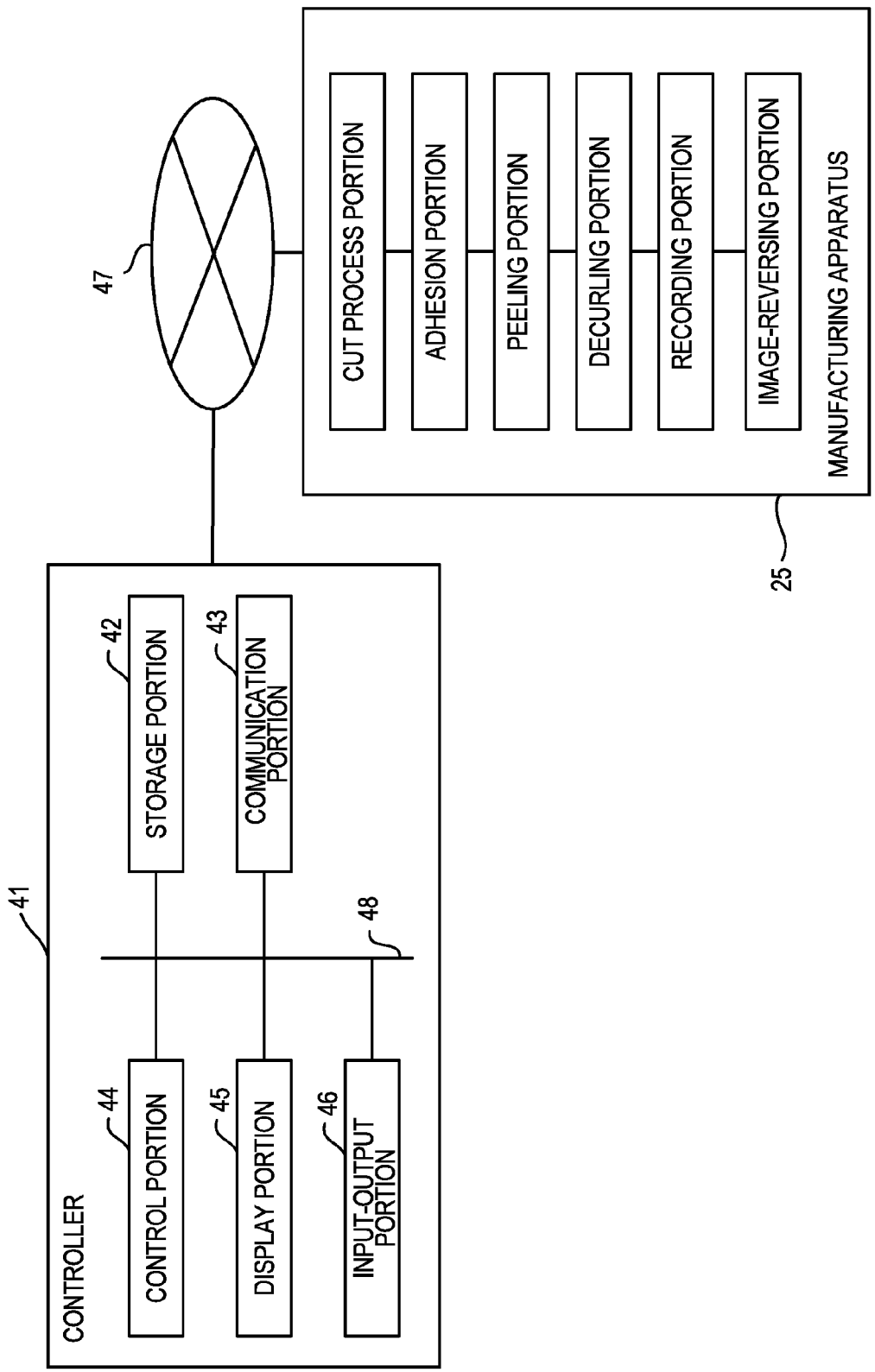
FIG. 13 is a block diagram for illustrating the state of connection between the first manufacturing apparatus and a controller.

[7-1-3] Connection Between First Manufacturing Apparatus and Controller:

As illustrated in FIG. 13, a manufacturing apparatus 25 (image-forming/recording apparatus) is connected to a controller 41 through a network 47. However, the manufacturing apparatus 25 can be connected to the controller 41 through, for example, a serial port, a parallel port, or a USB port without through the network 47. The manufacturing apparatus 25 includes a cut process portion, the adhesion portion, the peeling portion, the decurling portion, the recording portion, an image-reversing portion, and the like. A CPU is included in the recording portion 6, the cut process portion, the adhesion portion, the peeling portion, the decurling portion, the recording portion, the image-reversing portion, and the like are connected to the recording portion 6, and the CPU controls their operations.

The network 47 is a network such as the Internet or a local area network (LAN), and can be a wired network or can be a wireless network. The controller 41 is a computer for controlling the manufacturing apparatus 25. In the controller 41, a control portion 44, a display portion 45, an input-output portion 46, a storage portion 42, and a communication portion 43 are connected to one another through a system bus 48. In addition, for example, a digital camera, and a drive apparatus for reading image data or the like can be connected to the controller 41. Further, a plate-making apparatus or the like can be connected to the controller 41.

The control portion 44 includes, for example, a central processing unit (CPU), a random access memory (RAM), and a read only memory (ROM). The CPU calls a program stored in the recording portion, ROM, or the like in a work memory region on the RAM, and executes the program to perform arithmetic processing and operation control, thereby controlling an entire system. The ROM is a nonvolatile memory and permanently holds a program, data, and the like. In addition, the RAM is a volatile memory and temporarily holds a program, data, and the like.

The display portion 45 is, for example, a display apparatus, such as: a display apparatus such as a CRT monitor or a liquid crystal panel; or a logic circuit (such as a video adaptor) for realizing the video function of a computer in concert with the display apparatus.

The input-output portion 46 performs the input and output of data. The input-output portion is, for example, a keyboard, a pointing device, such as a mouse, or a ten key. An operating instruction, an operation instruction, data input, maintenance, and the like can be performed on the controller 41 through such input-output portion. In addition, the input-output portion is connected to, for example, a scanner and drive apparatus (not shown), and transmits data input from such external apparatus to the control portion 44 or outputs data to the external apparatus.

The storage portion 42 is an apparatus for storing data, and examples thereof include a magnetic disk, a memory, and an optical disc apparatus. Stored in the storage portion 42 are, for example, the program to be executed by the control portion 44, data needed for executing the program, and an operating system (OS). A pattern to be recorded in the recording portion 6 of the manufacturing apparatus 25 can also be stored in the storage portion 42. The communication portion 43 is a communication interface that mediates communication between the controller 41 and the network 47, and includes, for example, a communication control apparatus and a communication port. It should be noted that a personal computer or the like can be used instead of the controller 41.

Figure 14:
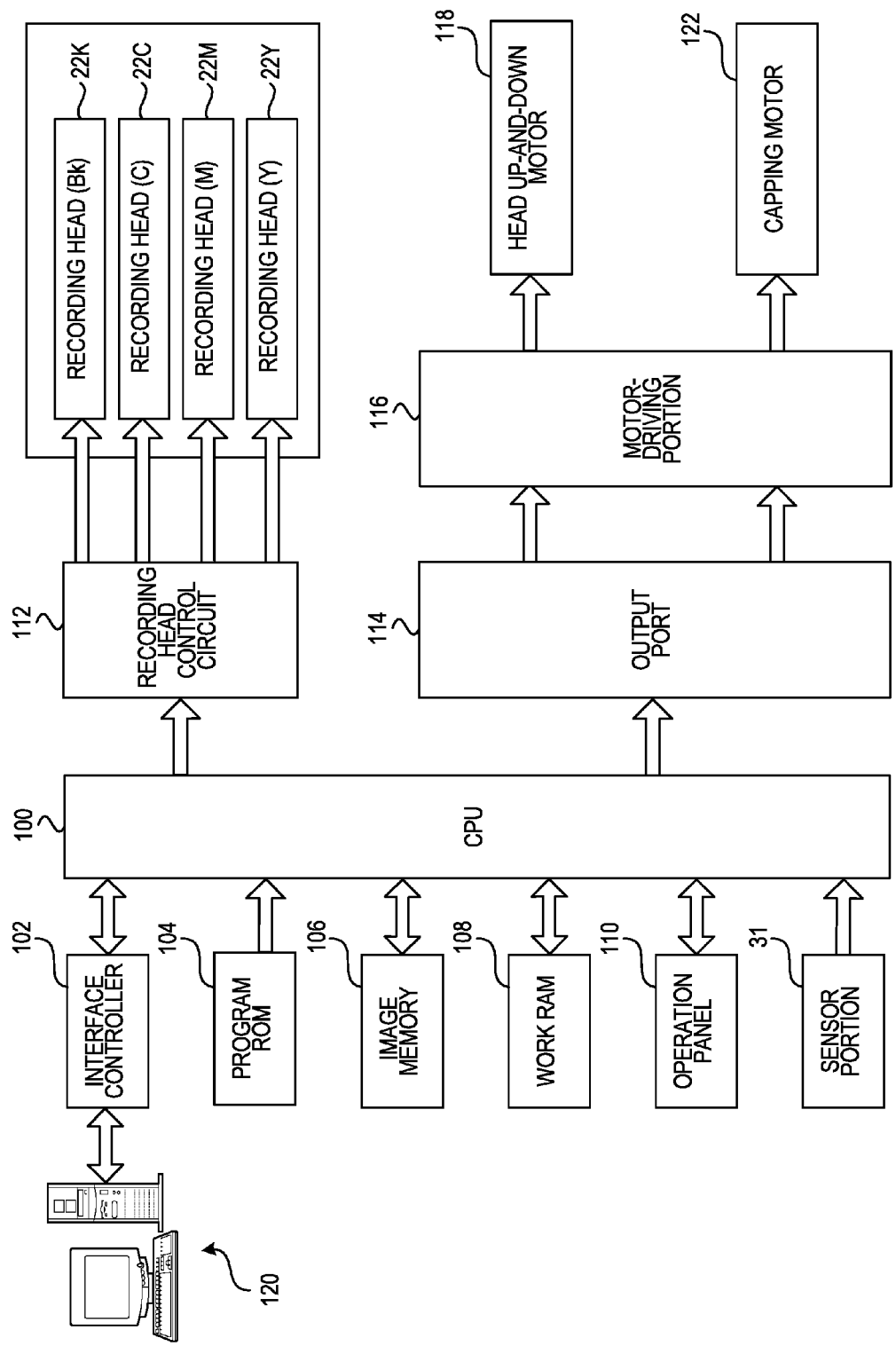
FIG. 14 is a block diagram for illustrating the construction of the control system of a recording portion illustrated in FIG. 13.

[7-1-4] Control System:

FIG. 14 is a block diagram for illustrating the construction of a control system provided in the recording portion 6 illustrated in FIG. 13. The recording data and command transmitted from a host PC 120 are received by a CPU 100 through an interface controller 102. The CPU 100 is an arithmetic processing unit that governs general control, such as the receiving and recording operations on the recording data of the recording portion, and the handling of rolled paper P. After having analyzed a received command, the CPU 100 performs the bit map development of image data on each color component of the recording data in an image memory 106. As an operation process before the recording, the CPU drives a capping motor 122 and a head up-and-down motor 118 through an output port 114 and a motor driving portion 116 to move each recording head 22K, 22C, 22M, 22Y from a capping position (waiting position) to a recording position (image-forming position).

Subsequently, a sensor portion 31 (tip-detecting sensor) for determining the timing (recording timing) at which the ejection of the ink onto the transfer material conveyed at a constant speed is started detects the position of the transfer material. After that, the CPU 100 sequentially reads out recording data on the corresponding color from the image memory 106 in synchronization with the conveyance of the transfer material, and transmits the readout data to the respective recording heads 22K, 22C, 22M, 22Y through a recording head control circuit 112. Thus, ejection energy-generating elements provided in the respective nozzles of the recording heads are driven according to the recording data, and ink droplets are ejected from the nozzles by the driven ejection energy-generating elements. The ejected ink droplets impinge on the coloring material-receiving layer (ink-receiving portion) of the transfer material positioned so as to face the recording heads to form dots. A desired image is formed by a set of the dots.

The operation of the CPU 100 is performed based on a processing program stored in a program ROM 104. The program ROM 104 stores, for example, a processing program and table corresponding to a control flow. In addition, a work RAM 108 is used as a working memory.

Figure 15:
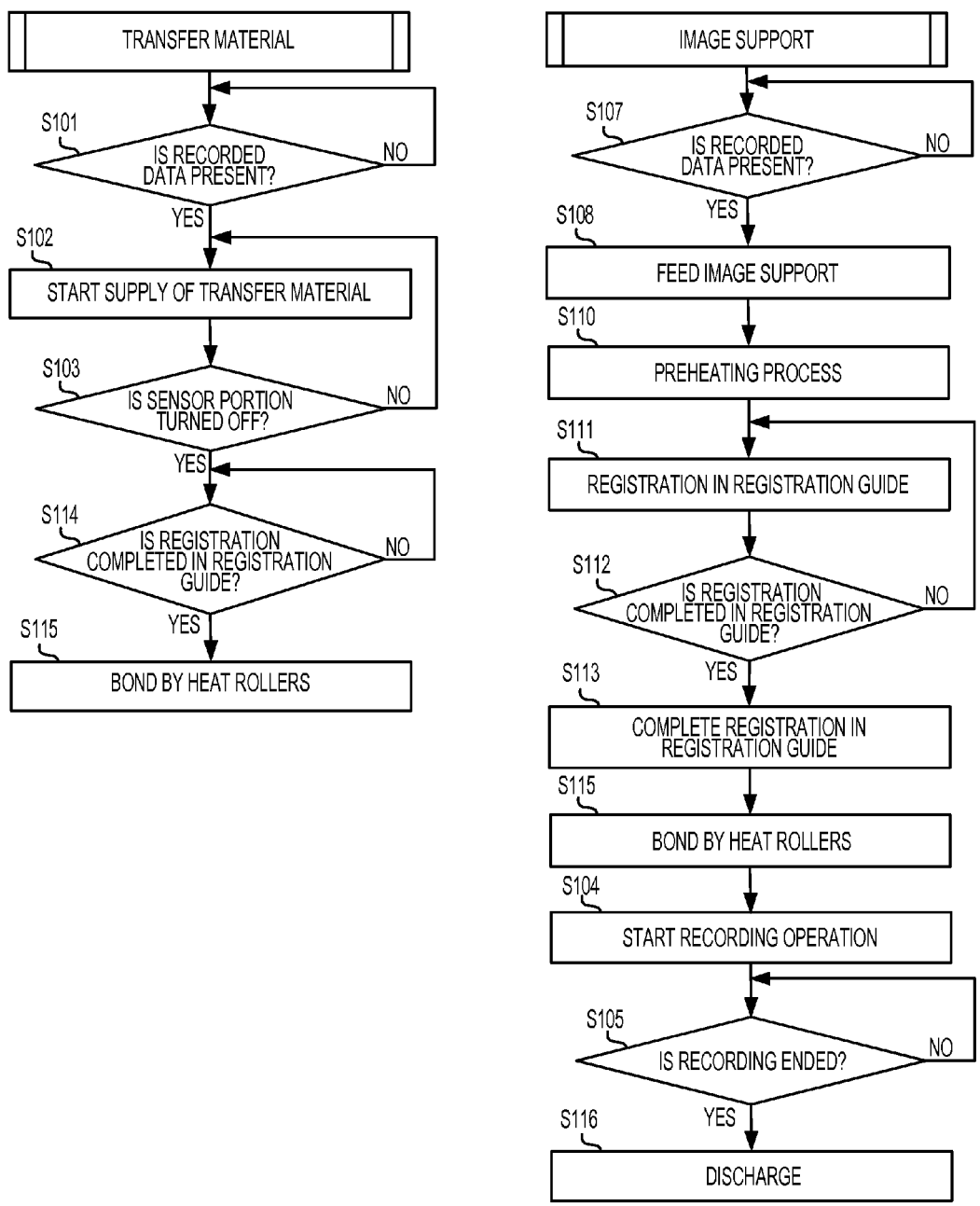
FIG. 15 is a flow chart for illustrating the operation flow of the first manufacturing apparatus.

[7-1-5] Operation Flow of First Manufacturing Apparatus:

Next, the operation flow of the first manufacturing apparatus 25 illustrated in FIG. 12 is described according to the flow chart of FIG. 15. The flow chart is performed by the CPU 100 illustrated in FIG. 14.

The CPU of the recording portion judges whether or not the recorded data is transmitted by the controller through the network or the various ports (Step S101). When it is judged that the recorded data is transmitted (YES of Step S101), the CPU starts the supply of an unrecorded transfer material from the supply portion (Step S102) and the transfer material is detected by the sensor portion. When the sensor portion does not detect the transfer material (is turned off (YES of Step S103)), the transfer material is conveyed to the recording portion, its registration with the image support is performed, and their thermal pressure bonding by the heat rollers is started (Step S115). The foregoing operations each use the time point when the sensor portion detects the transfer material as a reference, and are performed while being synchronized with each other.

Meanwhile, when the recorded data is transmitted to the CPU (YES of Step S107), the image support is supplied from the image support-supply portion to the transferring portion (primer-transferring portion) (Step S108). After that, in order to improve transfer performance in the transferring portion, a preheating process by the preheating portion is performed (Step S110). The CPU starts the registration between the image support and the transfer material in the registration guide (Step S111), and proceeds to a subsequent step at the time point when the registration with the transfer material is completed (Step S113). At this time, determination in Step S113 becomes YES, the transfer material is mounted on the image support, and the transfer material and the image support are bonded to each other through a primer in the adhesion portion (Step S115). After that, in association with the conveyance of the resultant toward a downstream side, the base material sheet of the transfer material is peeled with a portion precut in the precut process portion as a starting point, whereby the image support with a coloring material-receiving layer is formed. After that, in the recording portion, a recording operation on the image support with a coloring material-receiving layer (Step S104) is started (Step S104). After that, when the recording operation ends (YES of Step S105), the recorded matter (final recorded matter) is mounted on the discharge portion (Step S116).

Figure 16:
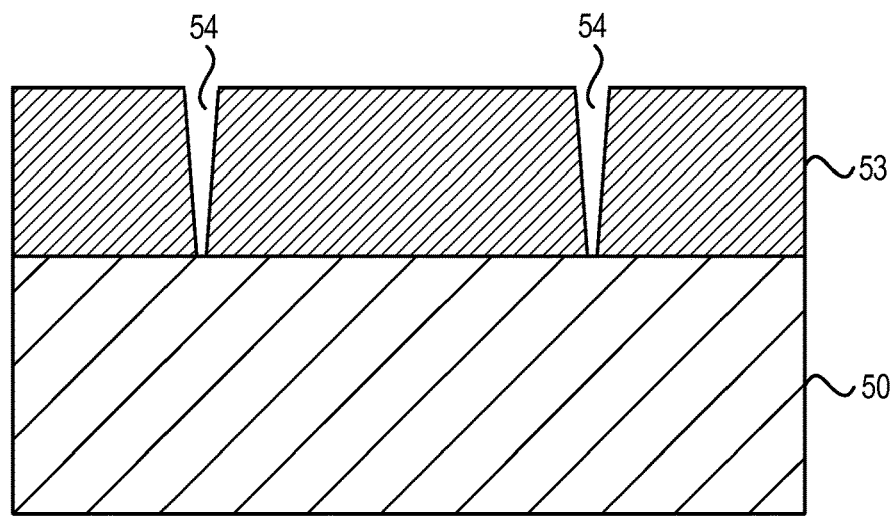
FIG. 16 is a sectional view for schematically illustrating a state in which the first transfer material illustrated in FIG. 2 is subjected to a precut process.
Figure 17:
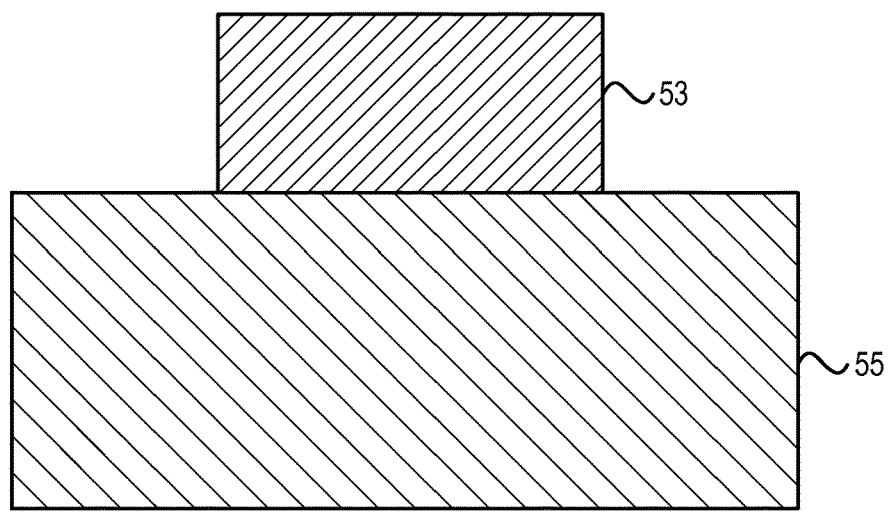
FIG. 17 is a sectional view for schematically illustrating the construction of a recorded matter obtained through the precut process.

[7-1-6] Process Performed by First Manufacturing Apparatus:

[7-1-6-1] Precut Process of Transfer Material:

The first transfer material is subjected to a cut process involving forming notches 54 in the coloring material-receiving layer 53 as illustrated in FIG. 16 (hereinafter referred to as "precut process") as required. Accordingly, when the coloring material-receiving layer is allowed to adhere to the primer layer or the image support, the coloring material-receiving layer is beautifully cut with each notch formed by the precut process as a boundary. Accordingly, as illustrated in FIG. 17, only the coloring material-receiving layer 53 of a portion where an image is to be recorded (image recording region) is transferred onto the image support 55.

In addition, a sharp and accurate edge shape can be obtained by performing the precut process to form the notches. Thus, the position of a portion such as a sign panel, IC chip, or magnetic stripe of the image support, or of a design portion such as a logo or hologram recorded on the image support in advance, and the position of the partially void portion can be registered with each other, and the resultant patch can be allowed to adhere to the image support. Thus, in the portion such as a sign panel, an IC chip, or a magnetic stripe, a reduction in performance in a post-process for the portion can be prevented. In addition, when an image is formed in the design portion such as a logo or a hologram, the transparency of the image is impaired (its opacity rises) and its quality reduces, and hence the portion needs to be removed from an image-forming portion. In this case, the removal can be accurately performed. It should be noted that, in the sign panel portion, handwriting is performed with a writing instrument, such as a ball-point pen, numbering is performed with a stamp ink, or sealing is performed with a vermillion ink pad or a stamp ink.

In the first manufacturing apparatus, recording is performed by an inkjet system. Accordingly, the coloring material-receiving layer needs to absorb an ink and the thickness of the coloring material-receiving layer needs to be increased in order to secure its absorbability. In particular, when the coloring material-receiving layer is formed of a gap absorption-type layer, and a resin or the like having an adhesive property is not incorporated into the coloring material-receiving layer or the coating weight thereof is 25 g/m$^2$ or more, an image-forming region can accidentally peel from the image support owing to the thickness of the coloring material-receiving layer. Accordingly, the precut process is preferably performed in order to prevent the peeling of the image-forming region.

Figure 18:
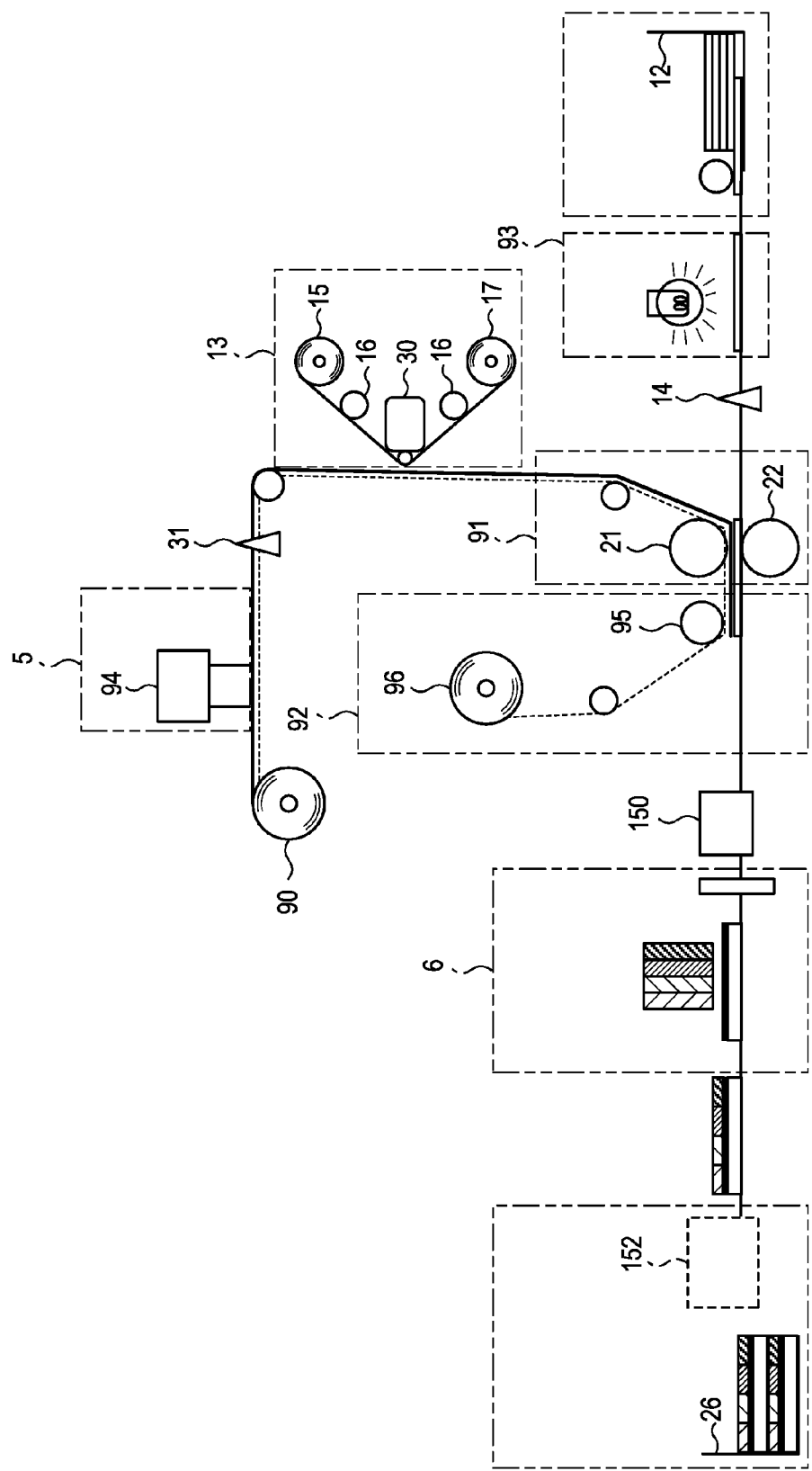
FIG. 18 is a side view for schematically illustrating an example of the construction of a second manufacturing apparatus for manufacturing a recorded matter.

In the transfer of the primer, as illustrated in FIG. 18, the image support 55 is supplied into a transferring portion 13 one by one. The primer, which has been supplied from a supplying roll 15 (primer-supplying roll), passes a gap between a thermal head 30 and the image support 55, and is rolled on the take-up roll 17 (primer take-up roll) side via a guide roll 16 to be conveyed. An energy is applied to the thermal head 30 in accordance with its heat capacity that varies depending on, for example, the thickness of, or a material for, the primer. Thus, the head generates heat and shifts the primer to the image support 55, thereby forming an adhesion layer. Selective heating of the thermal head 30 enables selective primer transfer in which the primer is not transferred onto a special portion where one does not wish to perform surface coating, such as an IC portion. In an apparatus premising that the primer layer is applied to the entire surface, the primer transfer can be performed with an inexpensive heating unit, such as a heat roller.

[7-1-6-2] Transferring Step (Transfer of Coloring Material-Receiving Layer):

The image support 55 moves to the adhesion portion including the two heat rollers 21 and 22. In the adhesion portion, the base material sheet is supplied to a gap between the heat roller 21 and the image support, and is thermally pressure-bonded, whereby the coloring material-receiving layer of the base material sheet and the image support 55 bond to each other.

In addition, a temperature at the time of the transfer falls within the following range: the temperature at the time of the transfer is equal to or more than the Tg of the primer at which the bonding of the primer is expressed, or is equal to or more than the Tg of the binder component of the coloring material-receiving layer. The heating of the coloring material-receiving layer at the time of the transfer is performed by thermal transfer not from a side closer to a thick image support, such as a plastic card, but mainly from the transfer material on the base material sheet side. The maximum reaching temperature of the coloring material-receiving layer at the time of an adhering step only needs to be controlled so as not to exceed the temperature at which the image support does not melt (does not deform). In addition, when, for example, the conveying speed is so fast that a time for heating with a heat source cannot be sufficiently secured, a temperature difference may occur between the heat source and the receiving portion. Accordingly, the surface temperature of each heat roller may be controlled so as to be higher than that at a normal time, e.g., to from 100° C. to 180° C., or may be controlled to even higher temperature in consideration of the adhesiveness and foil-cutting property.

[7-1-6-3] Preheating:

When the image support is allowed to adhere to the first transfer material having recorded thereon the image while being registered therewith as illustrated in FIG. 12, the surface of a card or the like including the image support is moderately heated in a preheating portion 19 before the adhesion of the transfer material. Thus, an excessive increase in temperature of the ink-receiving layer on the transfer material due to heating can be controlled.

[7-1-6-4] Peeling Process:

As illustrated in the figure, in a peeling portion 151, the base material sheet portion of the transfer material allowed to adhere to the image support is peeled, and the peeled base material sheet is rolled around the take-up roll 96. Thus, such an image support with a coloring material-receiving layer under a state in which the coloring material-receiving layer 53 adheres onto the image support 55 as illustrated in FIG. 17 is formed. In other words, the coloring material-receiving layer 53 is positioned in the uppermost layer of the image support with a coloring material-receiving layer, and an image can be recorded on the layer. It should be noted that when the precut process is performed, part of the coloring material-receiving layer is peeled and rolled around the take-up roll 24 side, and the image support with a coloring material-receiving layer is conveyed to the recording portion 6.

[7-1-6-5] Decurling:

As illustrated in FIG. 12, the curl of the image support is corrected in the decurling portion 150, and the curl of the image support is corrected to be flat. The correction can be performed by sandwiching the image support between a heating plate and a supporting plate while the image support is hot.

[7-1-6-6] Recording Process:

An inkjet system image-forming apparatus (inkjet printer) that ejects an ink (ink droplets) from a plurality of nozzles formed in a recording head onto an image support with a coloring material-receiving layer to form an image has been widely used. The following technology has been known as a technology for ejecting the ink droplets from the nozzles: a thermal energy according to a driving pulse is supplied to the ink in the nozzles to form air bubbles through film boiling, and the ink droplets are ejected from the nozzles with the air bubbles. A large number of ink droplets according to an image to be formed are ejected from the nozzles onto the image support with a coloring material-receiving layer, whereby the image is formed on the coloring material-receiving layer of the image support with a coloring material-receiving layer.

There is a full-line-type inkjet printer using a line head obtained by arraying many multi-nozzle heads, which are each obtained by integrating a plurality of nozzles each formed of, for example, an ink ejection orifice and an ink channel, so that the heads may be perpendicular to the conveying direction of the image support with a coloring material-receiving layer for increasing an image recording speed. The full-line-type inkjet printer simultaneously ejects the ink droplets from the ink ejection orifices of the plurality of nozzles in accordance with the conveyance of the image support with a coloring material-receiving layer to record an image. Accordingly, the full-line-type inkjet printer can satisfy the following requirement which a current printer needs to satisfy: a high-quality and high-resolution image should be formed at a high speed. In addition, the inkjet printer has an advantage in that extremely stable image recording can be performed because each recording head and the image support with a coloring material-receiving layer are out of contact with each other at the time of the image recording.

The recording portion 6 uses four recording heads of K, C, M, and Y inks as main constituent elements. The four recording heads eject the inks in accordance with image data, and eject the ink droplets toward the coloring material-receiving layer arranged on the image support with a coloring material-receiving layer to form an image.

[7-1-6-7] Image-Reversing Apparatus:

Upon performance of the duplex printing, the manufacturing apparatus 25 preferably includes the image-reversing portion 152 as illustrated in FIG. 12. The recorded matter after the peeling is reversed by the reversing apparatus, and the reversed recorded matter is fed back to the registration guide 14 in order to perform back surface printing. After that, the same processes as those of front surface printing are performed, whereby an image is formed on the back surface of the recorded matter.

[7-2] Second Manufacturing Apparatus:

A second manufacturing apparatus includes a mechanism for supplying the transfer material 90 that has a roll shape and is rolled so that the coloring material-receiving layer may be arranged on its outer surface from the supply portion, and transferring a primer layer onto the first transfer material. Thus, an adhesive property between the image support and the transfer material can be improved, and hence the transfer material can be efficiently transferred.

The second manufacturing apparatus differs from the first manufacturing apparatus mainly in that the apparatus includes the transferring portion 13 configured to transfer the primer layer on the conveying path of the transfer material 1 as illustrated in FIG. 18. The description of a portion of the apparatus common to the first manufacturing apparatus is omitted because the portion has the same apparatus and same control system construction as those of the first manufacturing apparatus.

In the transfer of the primer, as illustrated in FIG. 18, the transfer material is supplied into the primer-transferring portion 13 one by one. At this time, a primer sheet, which has been supplied from the supplying roll 15 (primer-supplying roll), passes a gap between the thermal head 30 and the transfer material, and is conveyed so as to be rolled on the take-up roll 17 (primer take-up roll) side via the guide roll 16. An energy is applied to the thermal head 30 in accordance with its heat capacity that varies depending on, for example, the thickness of, or a material for, the primer. Thus, the head generates heat and shifts the primer to an image support 11, thereby forming an adhesion layer. Selective heating of the thermal head 30 enables selective primer transfer in which the primer is not transferred onto a special portion where one does not wish to perform surface coating, such as an IC portion. In an apparatus premising that the primer layer is applied to the entire surface, the primer transfer can be performed with an inexpensive heating unit, such as a heat roller.

Figure 19:
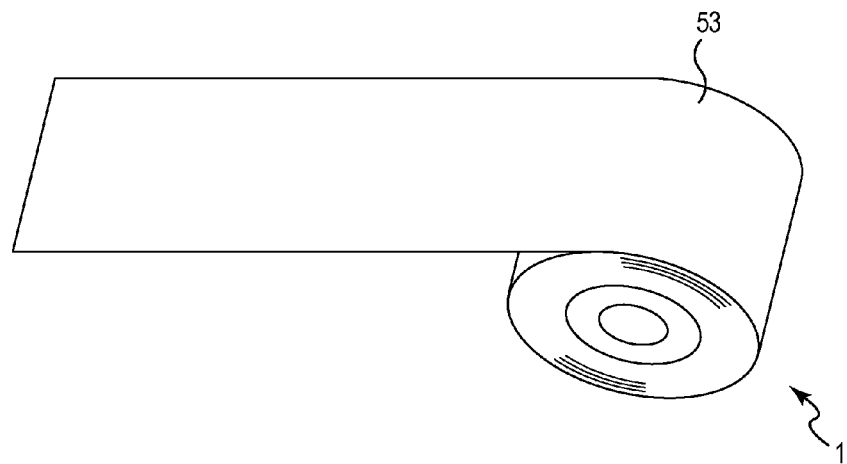
FIG. 19 is a perspective view for schematically illustrating one embodiment of a roll-shaped transfer material.

[7-3] Third Manufacturing Apparatus:

In a third manufacturing apparatus, a transferring portion and a printer portion are separated from and independent of each other. In the third manufacturing apparatus, a transfer material that has a roll shape and is rolled so that the coloring material-receiving layer 53 may be arranged on an outer side as illustrated in FIG. 19 is mounted on a known laminator based on a "roll-to-roll" process. The third manufacturing apparatus is configured to transfer the transfer material onto the image support and peel the base material sheet from the transfer material to provide an image support with a coloring material-receiving layer. After that, the apparatus is configured to mount the image support on the printer portion mounted with a line head and performs printing on the image support to obtain a recorded matter.

Figure 20:
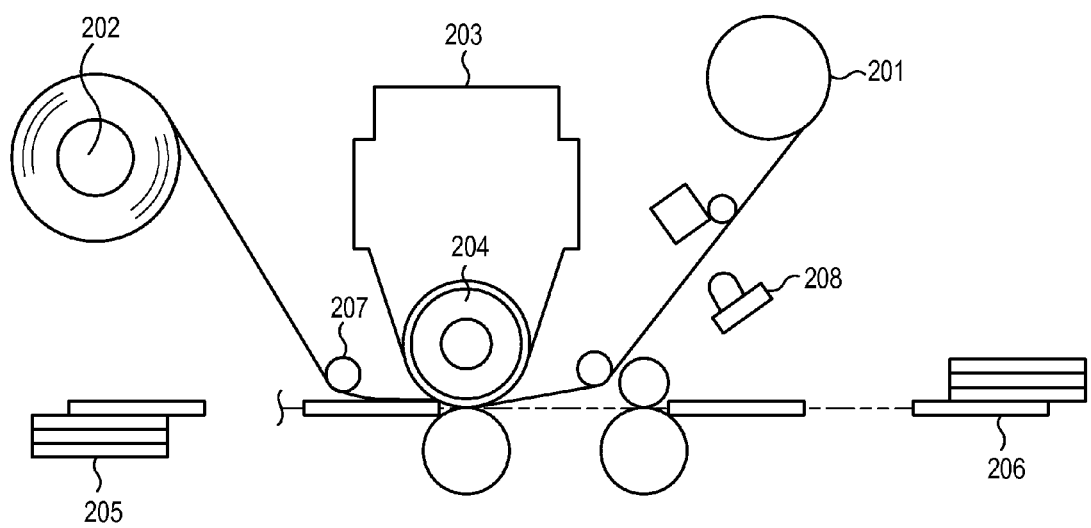
FIG. 20 is a side view for schematically illustrating one embodiment of a manufacturing apparatus configured to perform the thermal pressure bonding of a transfer material and an image support.

Further, the roll-shaped transfer material is set in a feed roll 201 of a laminating machine illustrated in FIG. 20 with the known laminator as required. When the image support is conveyed from a supply portion 206, the transfer material processed into the roll shape is conveyed from the feed roll 201 to a transferring portion 203. At this time, a sensor 208 detects a marking and performs the registration of the transfer material with the image support. The transfer material is conveyed to a gap between a transfer roll 204 and the image support, and is thermally pressure-bonded by the transfer roll 204. After that, the base material of the laminate material is peeled by a peeling roll 207, whereby an image recording medium is formed.

Figure 23:
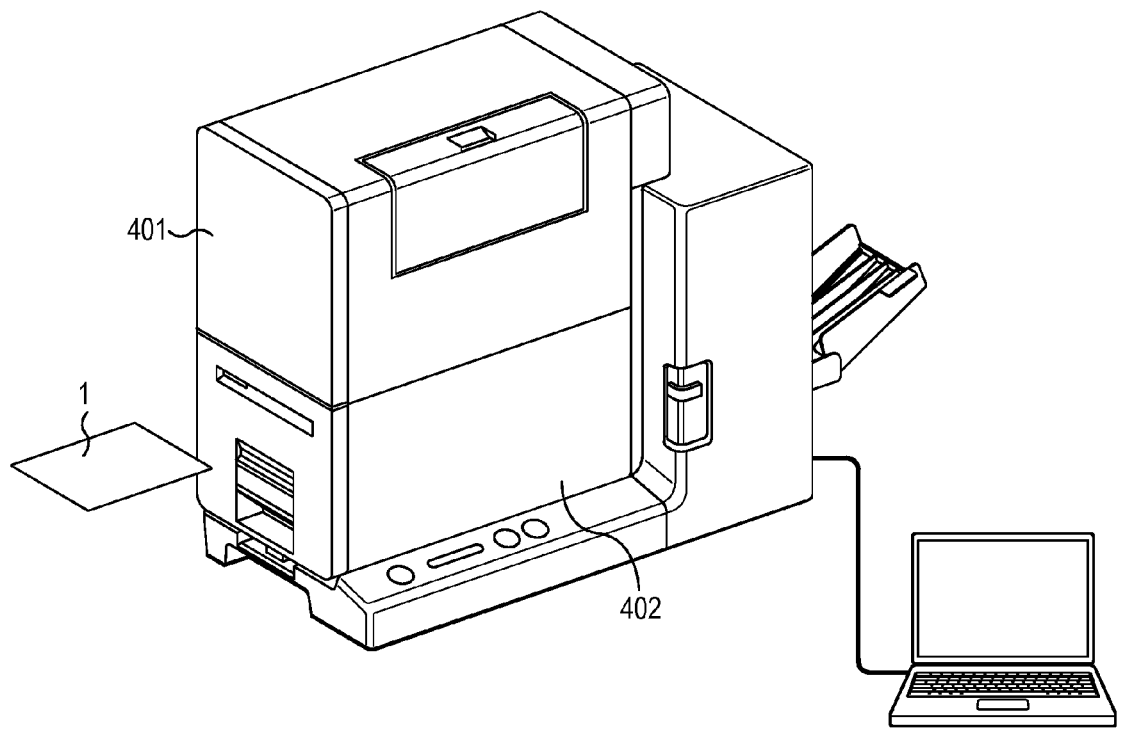
FIG. 23 is a perspective view for illustrating another example of a printer configured to perform printing on an image support with a coloring material-receiving layer.
Figure 24:
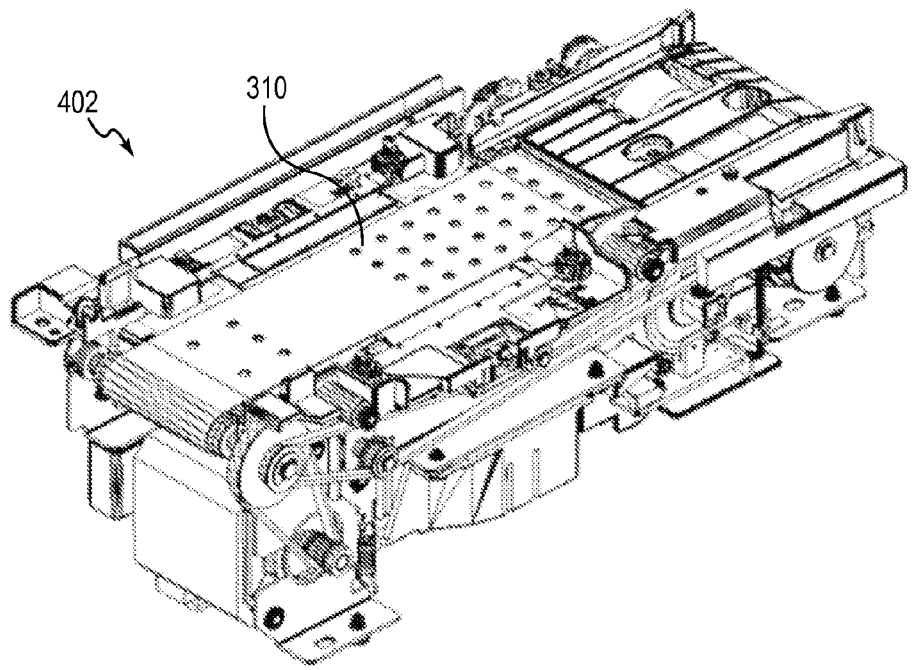
FIG. 24 is a perspective view for illustrating the conveying mechanism of the printer configured to perform printing on the image support with a coloring material-receiving layer.
Figure 25:
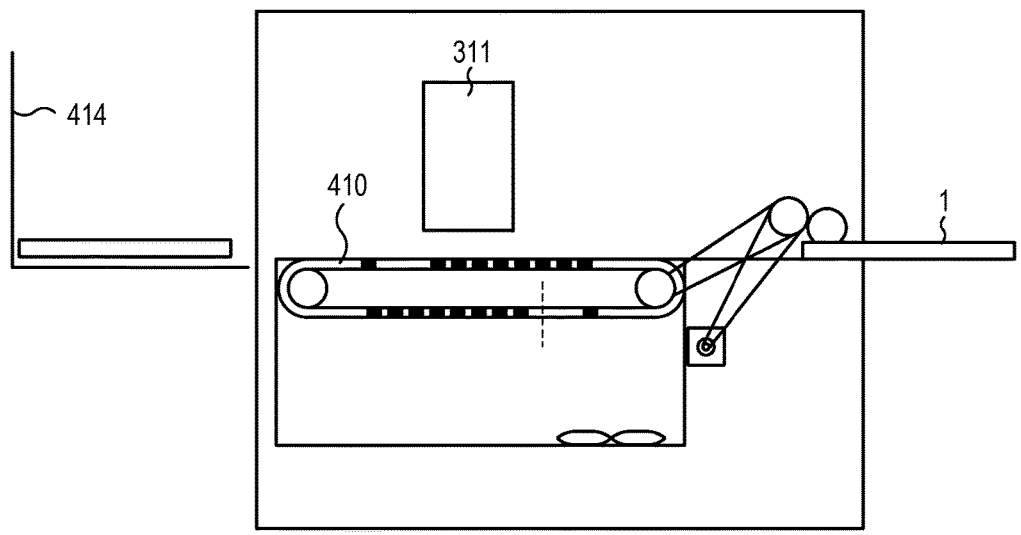
FIG. 25 is a side view for schematically illustrating still another example of the conveying mechanism of a line head printer.

FIG. 23 is an illustration of a line head-type printer 401. A conveying mechanism 402 of the printer 401 illustrated in FIG. 23 is more specifically illustrated in each of FIG. 24 and FIG. 25. As illustrated in FIG. 25, the image support with a coloring material-receiving layer set in a supply portion is conveyed to a printing head 311 by a conveying belt 410, an image is recorded on the image support, and the image support is discharged as a recorded matter from a discharge portion 414.

Figure 21:
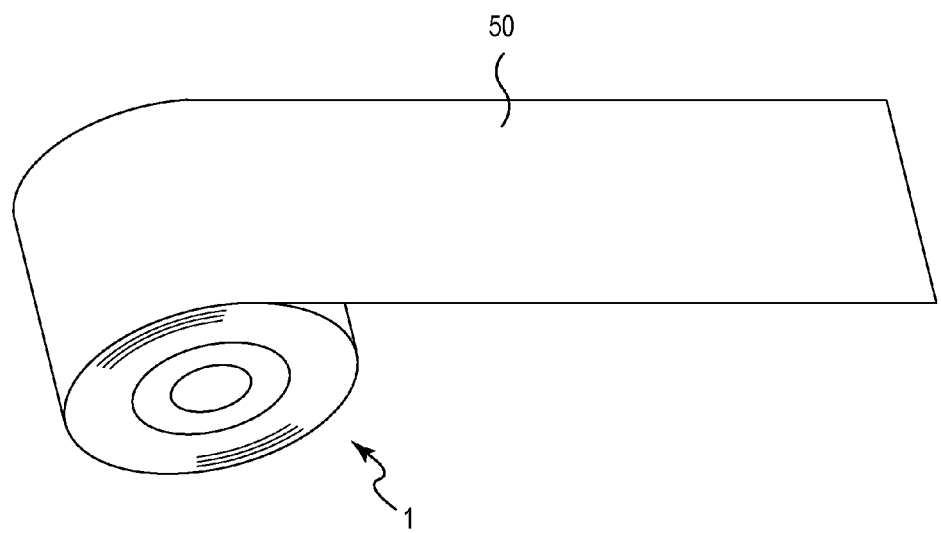
FIG. 21 is a perspective view for schematically illustrating another embodiment of the roll-shaped transfer material.
Figure 22:
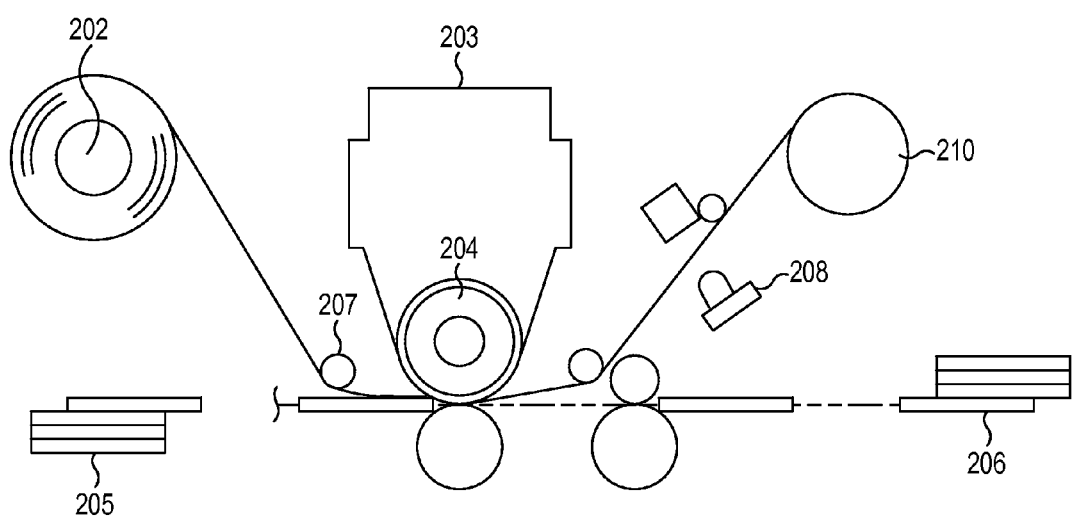
FIG. 22 is a side view for schematically illustrating an example in which the roll-shaped transfer material illustrated in FIG. 21 is used in the manufacturing apparatus illustrated in FIG. 20.

When the transfer material 1 has a roll shape inwardly rolled so that the base material sheet 50 may be arranged on an outer side and the coloring material-receiving layer may be arranged on an inner side, as illustrated in FIG. 21, the transfer material is fed from a feed roll 210 along such a conveying path as illustrated in FIG. 22, whereby the image support with a coloring material-receiving layer is obtained. The inwardly rolled roll has a preventing effect on the adhesion of dirt to the surface of the ink-receiving layer.

Figure 26:
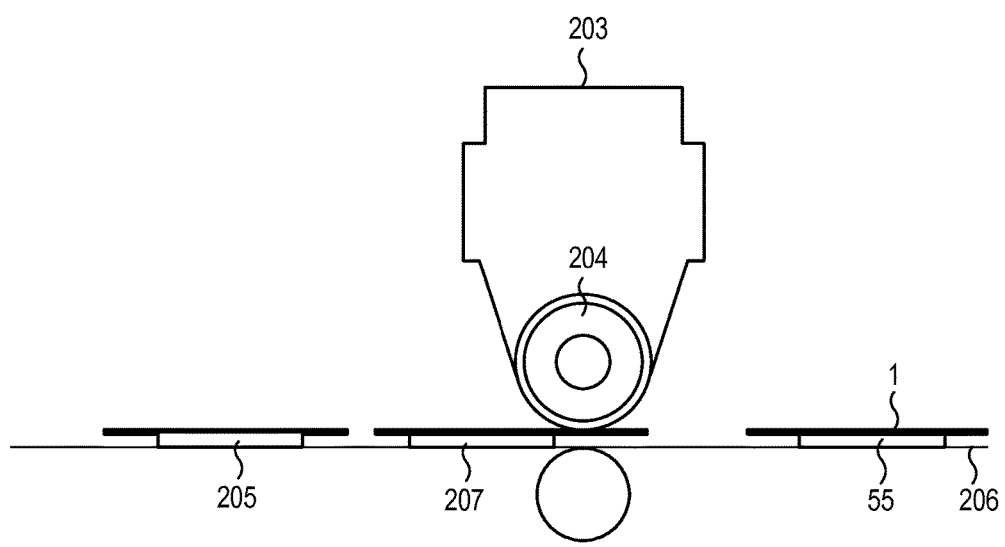
FIG. 26 is a side view for schematically illustrating another embodiment of the manufacturing apparatus configured to perform the thermal pressure bonding of the transfer material and the image support.

[7-4] Fourth Manufacturing Apparatus:

In a fourth manufacturing apparatus, a transferring portion and a printer portion are separated from and independent of each other. The fourth manufacturing apparatus is configured to process the transfer material into a cut sheet shape, mount the transfer material on a known laminator, transfer the transfer material having a cut sheet shape onto the image support, and peel the base material sheet to provide an image support with a coloring material-receiving layer. After that, the apparatus is configured to set the image support with a coloring material-receiving layer in a line head printer and perform image recording to provide a recorded matter. Specifically, as illustrated in FIG. 26, the sheet-shaped transfer material is manually registered with the image support and is conveyed to the transfer roll 204, and the image support and the transfer material are thermally pressure-bonded. After that, the image support and the transfer material are discharged to a discharge portion 205, and the base material sheet is manually peeled, whereby the image support with a coloring material-receiving layer is obtained. After that, the image recording is performed on the coloring material-receiving layer with the printer 401 illustrated in FIG. 23, whereby the recorded matter is obtained.

[7-5] Fifth Manufacturing Apparatus:

In a fifth manufacturing apparatus, a transferring portion and a printer portion are separated from and independent of each other. The fifth manufacturing apparatus is configured to process the transfer material into a cut sheet shape, mount the transfer material having a cut sheet shape on a known laminator, transfer the transfer material onto the image support, and peel the base material sheet to provide an image support with a coloring material-receiving layer. After that, the apparatus is configured to mount the image support with a coloring material-receiving layer on a serial printer and perform image recording to provide a recorded matter. When the serial-type inkjet printer is incorporated into an integrated manufacturing apparatus like the manufacturing apparatus illustrated in FIG. 12, a head may cause a speed difference between an adhesion portion 29 and the recording portion 6, and hence a sagging portion configured to absorb and regulate the speed difference needs to be arranged. Therefore, when the serial-type inkjet printer is used, the printer is preferably of a separation type in which the printer portion and the transferring portion are independent of each other.

Figure 27:
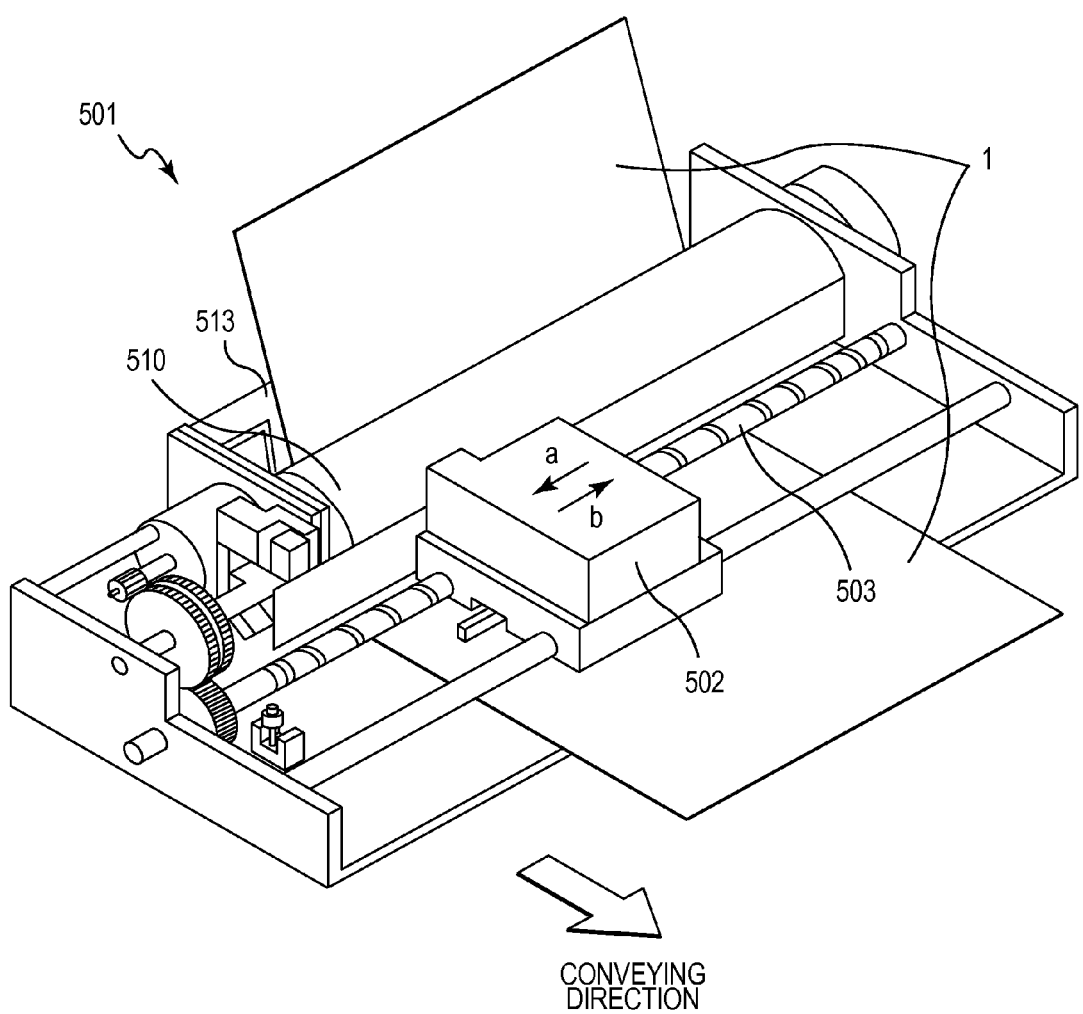
FIG. 27 is a perspective view for illustrating still another example of the printer configured to perform printing on the image support with a coloring material-receiving layer.
Figure 28:
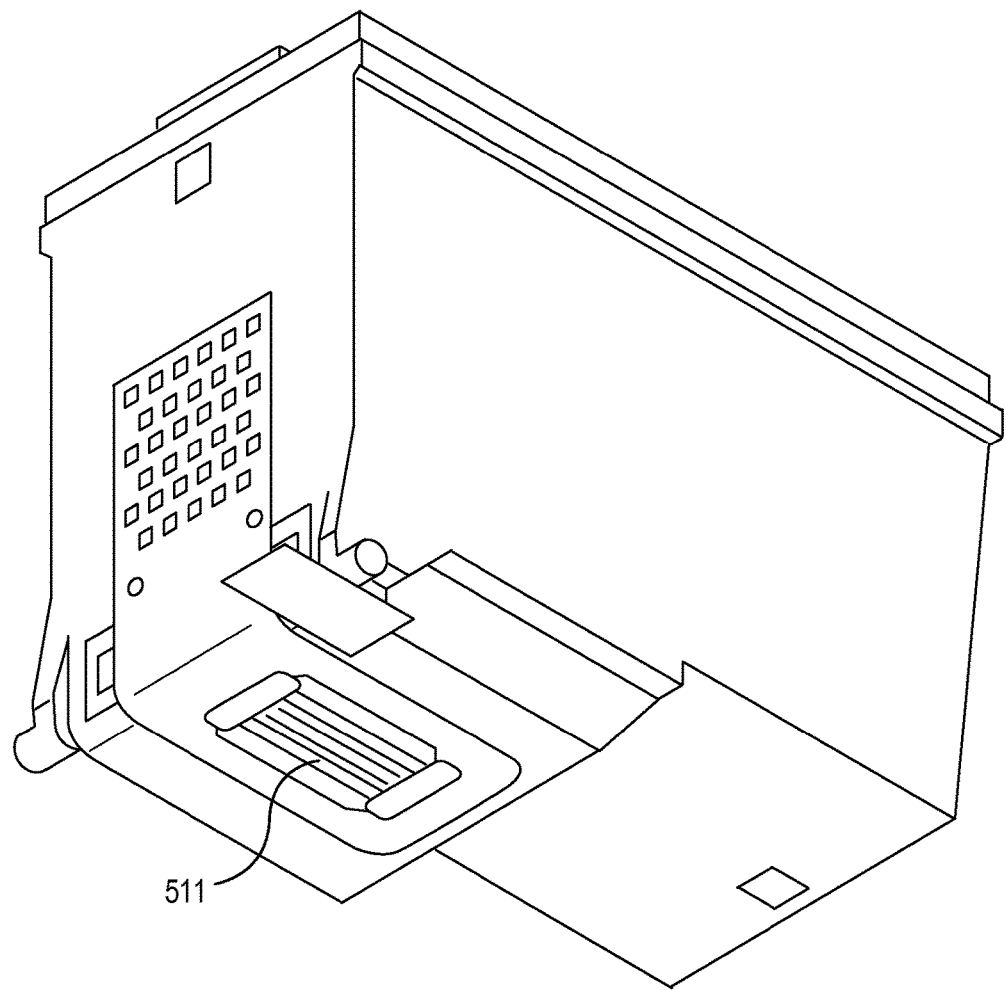
FIG. 28 is a perspective view for illustrating an example of the recording head of the printer illustrated in FIG. 27.

Specifically, as illustrated in FIG. 26, the sheet-shaped transfer material 1 is manually registered with the image support 55, and is then conveyed to the transfer roll 204. Then, the transfer material 1 and the image support 55 are thermally pressure-bonded, and then the resultant is discharged to the discharge portion 205. After that, the base material sheet is manually peeled, whereby the image support with a coloring material-receiving layer is obtained. FIG. 27 is an illustration of a serial printer 501 configured to perform image recording on the image support with a coloring material-receiving layer. In the serial printer 501, when the image support with a coloring material-receiving layer is set in a supply portion 513, the image support is conveyed to a printing head 502 by a conveying roll 510, whereby the recorded matter is discharged. The printing head 502 has such a structure as illustrated in FIG. 28, and is configured to eject an ink from a nozzle 511 to perform the image recording. At this time, the image supports with coloring material-receiving layers are sequentially conveyed while the printing head 502 is caused to move and scan relative to a recording surface. The printing head 502 is fixed to a shaft 503, and configured to scan the image support with a coloring material-receiving layer to be conveyed in a direction perpendicular thereto (direction indicated by the arrow a or b in the figure), and eject the ink from the nozzle to perform the image recording.

As described above, according to the manufacturing apparatus, the adhesiveness between the coloring material-receiving layer and the image support improves, and hence the coloring material-receiving layer can be easily arranged on the image support. Thus, a method of manufacturing a recorded matter that is excellent in accuracy of an image and can drastically improve its productivity can be provided.

[8] Second Transfer Material:

As illustrated in FIG. 31, the second transfer material includes the coloring material-receiving layer 53 for receiving a coloring material, the transparent sheet 52, and the base material sheet 50 for supporting the coloring material-receiving layer 53 and the transparent sheet 52.

[8-1] Coloring Material-Receiving Layer:

The same coloring material-receiving layer as that described in the section [1-1] of the description of the first transfer material can be used. A gap absorption-type coloring material-receiving layer can quickly absorb the coloring material with gaps formed by inorganic fine particles. Therefore, in the case of the second transfer material in which the transparent sheet is arranged between the base material and the coloring material-receiving layer, the frequency at which the coloring material abruptly bumps upon thermal pressure bonding of the transfer material onto an image support is reduced, and hence such an inconvenience that the transfer material and the image support are not completely in close contact with each other (adhesiveness failure), and such an inconvenience that air bubbles remain between the transfer material and the image support (remaining of the air bubbles) can be suppressed.

Upon formation of the coloring material-receiving layer, it is preferred to precisely control the average particle diameter of the inorganic fine particles, or the weight-average polymerization degree and saponification degree of a water-soluble resin. Thus, the transparency (permeability) of the coloring material-receiving layer, and an adhesive strength between the coloring material-receiving layer and the transparent sheet can be improved. Thus, the visibility of an image from the transparent sheet side can be improved. Therefore, even when a pigment ink that hardly permeates the coloring material-receiving layer is used as the coloring material, there is no need to increase the thickness of the coloring material-receiving layer for increasing an ink density or causing the layer to receive a large amount of the ink. Accordingly, the thickness of the transfer material, and by extension, the entire thickness of a recorded matter can be reduced.

[8-1-1] Inorganic Fine Particles:

The same inorganic fine particles as those described in the section [1-1-1] of the description of the first transfer material can be used.

In the case of the second transfer material in which the transparent sheet is arranged between the base material sheet and the coloring material-receiving layer, the average particle diameter of the inorganic fine particles to be used is preferably 120 nm or more and 200 nm or less. Setting the average particle diameter to 120 nm or more, preferably 140 nm or more can improve the ink absorbability of the coloring material-receiving layer, and hence can suppress the bleeding and beading of the ink in the image after its recording. Meanwhile, setting the average particle diameter to 200 nm or less, preferably 170 nm or less can suppress light scattering by the inorganic fine particles, and hence can improve the glossiness and transparency of the coloring material-receiving layer. In addition, the setting can increase the number of the inorganic fine particles per unit area of the coloring material-receiving layer, and hence can improve the ink absorbability. Therefore, the recording density of the image can be increased and the lack of the luster of the image after the recording can be suppressed.

[8-1-2] Water-Soluble Resin:

The same water-soluble resin as that described in the section [1-1-2] can be used.

[8-1-3] Cationic Resin:

The same cationic resin as that described in the section [1-1-3] can be used. It should be noted that in the case of the second transfer material in which the transparent sheet is arranged between the base material and the coloring material-receiving layer, the adhesive property of the coloring material-receiving layer to resin dispersion type pigment can be improved in addition to the functions described in the section [1-1-3]. That is, dispersed resin of the resin dispersion type pigment has a SP value close to the SP value of the cationic resin which is used in the embodiments of the present invention. Therefore, when the cationic resin and the dispersed resin melt with heat during transfer, compatibility thereof rises and the resin dispersion type pigment is strongly adhered to the coloring material-receiving layer. Thereby, the transfer performance of the coloring material-receiving layer onto the image support is improved.

[8-1-4] Other Additives:

The same other additives as those described in the section [1-1-4] can be used.

[8-1-5] Thickness:

The same thickness as that described in the section [1-1-5] can be used. It should be noted that when the transparent sheet is arranged between the base material and the coloring material-receiving layer, the ink absorbability and the adhesiveness (transfer performance) can be improved. In addition, the transparency of the coloring material-receiving layer can be improved.

[8-1-6] Others:

An auxiliary image different from an image to be described later may be formed in advance (preprinted) on the coloring material-receiving layer.

[8-2] Transparent Sheet:

As illustrated in FIG. 31, the second transfer material includes the transparent sheet 52. The transparent sheet means a sheet having a total luminous transmittance measured in conformity with JIS K 7375 of 50% or more, preferably 90% or more. Therefore, in addition to a colorless and transparent sheet, for example, a semitransparent sheet and a colored transparent sheet are included in the transparent sheet.

The kind of the transparent sheet 52 is not particularly limited. However, a sheet or film formed of a material that is excellent in durability, such as weatherability, abrasion resistance, and chemical resistance, and has high compatibility with the coloring material-receiving layer is preferred. Further, when the transparent sheet is brought into abutment with the base material sheet, such a material that the difference SP1 between the SP value of the base material sheet and the SP value of the transparent sheet is 1.1 or more is preferably selected. A resin film can be given as a specific example of such material.

In addition, when the second transfer material is thermally pressure-bonded onto the image support and the base material sheet is peeled, an image recorded on the coloring material-receiving layer can be viewed as an original image through the transparent sheet. In addition, when the transfer material is thermally pressure-bonded onto the image support, the transparent sheet functions as a protective layer for the image recorded on the coloring material-receiving layer.

When a dye ink is used as an ink for recording the image on the coloring material-receiving layer, the transparent sheet preferably contains a UV-cutting agent for preventing the decomposition (optical degradation) of a dye due to UV light. Examples of the UV-cutting agent can include: UV absorbers, such as a benzotriazole-based compound and a benzophenone-based compound; and UV-scattering agents, such as titanium oxide and zinc oxide.

[8-3] Base Material Sheet:

As illustrated in FIG. 31, the second transfer material includes the base material sheet 50. The base material sheet (also referred to as "release liner" or "separator") is a sheet body serving as a support for the releasing layer or the coloring material-receiving layer. It should be noted that the same base material sheet as that described in the section [1-2] can be used.

Figure 32:
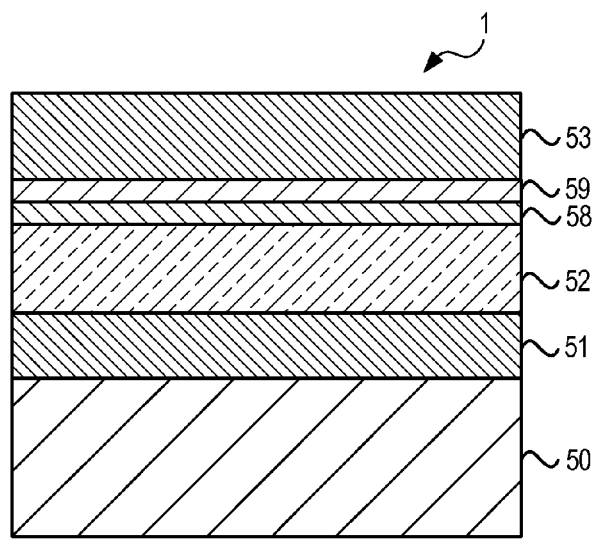
FIG. 32 is a sectional view for schematically illustrating another embodiment of the second transfer material of the present invention.

[8-4] Releasing Layer:

As illustrated in FIG. 32, the second transfer material may include the releasing layer 51. The releasing layer is a layer formed of a composition containing a release agent, and is arranged between the base material sheet 50 and the transparent sheet 52. When the transfer material includes the releasing layer 51, the base material sheet 50 can be easily peeled from the transparent sheet 52. It should be noted that when the releasing layer is formed, the base material sheet includes the releasing layer. That is, the difference SP1 between the SP value of the base material sheet and the SP value of the layer to be brought into abutment with the base material sheet is a difference between the SP value of the releasing layer and the SP value of the coloring material-receiving layer. The same releasing layer as that described in the section [1-3] can be used as the releasing layer.

When one wishes to subject the surface of the transparent sheet to matte processing, it is preferred that various particles be incorporated into the releasing layer or the surface of the releasing layer on a side to be brought into abutment with the transparent sheet be subjected to a matte process. The matte processing is a useful method because the glossy feeling of the transparent sheet can be moderately controlled.

[8-5] Anchor Layer:

As illustrated in FIG. 32, the second transfer material may further include an anchor layer 59.

The anchor layer 59 is arranged between the transparent sheet 52 and the coloring material-receiving layer 53. When the transfer material includes the anchor layer, adhesiveness and an adhesive strength between the transparent sheet and the coloring material-receiving layer can be improved, and hence the following inconvenience can be suppressed: the coloring material-receiving layer peels from the transparent sheet owing to an insufficient adhesive strength.

In addition, as a surface modification process, the surface of the transparent sheet 52 to which the coloring material-receiving layer is applied is roughened by subjecting the surface of the transparent sheet 52 to a corona discharge process or a plasma discharge process in advance, or applying an organic solvent, such as IPA or acetone, thereto. Thus, the wettability can be improved, and hence the adhesiveness can be improved. When the formation of the anchor layer or the surface process is performed, a binding property between the coloring material-receiving layer 53 and the transparent sheet 52 can be improved, film strength can be improved, and hence the peeling of the transparent sheet 52 can be prevented.

A layer that improves the binding property, the layer being equivalent to the primer layer, can be used as such anchor layer 59. The layer can be formed by using any one of, for example, a thermoplastic synthetic resin, a natural resin, a rubber, and a wax. As more specific examples of a material for forming the layer, there are given: cellulose derivatives, such as ethylcellulose and cellulose acetate propionate; styrene-based resins, such as polystyrene and poly-α-methylstyrene; acrylic resins, such as polymethyl methacrylate and polyethyl acrylate; vinyl-based resins, such as polyvinyl chloride, polyvinyl acetate, a vinyl chloride-vinyl acetate copolymer, polyvinyl butyral, and polyvinyl acetal; synthetic resins, such as a polyester resin, a polyamide resin, an epoxy resin, a polyurethane resin, an ionomer, an ethylene acrylic acid copolymer, an ethylene-acrylate copolymer; and derivatives of natural resins and synthetic rubbers, such as rosin, a rosin-modified maleic acid resin, ester gum, a polyisobutylene rubber, a butyl rubber, a styrene-butadiene rubber, a butadiene-acrylonitrile rubber, a polyamide resin, and chlorinated polyolefin as tackifiers.

In addition, a polyolefin resin or the like is also preferably used as a resin that improves the wettability of the coating liquid or improves the binding property. Of such resins, a polyethylene is particularly preferably used. The polyethylene is mainly a low-density polyethylene (LDPE) or a high-density polyethylene (HDPE), but some of, for example, other LLDPE's and polypropylenes can also be used.

The anchor layer 59 is preferably melted by a heat process with a heat roller in the step of adhering the transfer material.

The melting of the anchor layer 59 can additionally strengthen the binding property between the coloring material-receiving layer 53 and the transparent sheet 52 without being influenced by the unevenness of the surfaces of the coloring material-receiving layer 53 and the transparent sheet 52. The heat process is preferably performed in such a temperature range that the vaporization of an ink does not occur while an adhesive property is expressed by the melting of the anchor layer by heat. Therefore, the anchor layer is preferably formed of a thermoplastic resin having a glass transition temperature (Tg) of from 60° C. to 160° C., more preferably from 70° C. to 140° C., particularly preferably from 70° C. to 100° C. The temperature range is preferably adopted because the internal pressure of the ink in the coloring material-receiving layer is increased even by heat applied from the transfer material 1 in the adhesion portion 29, and hence the boiling of the ink does not occur. On the other hand, a temperature of 160° C. or more is not preferred because the ink boils owing to abrupt heat, and hence satisfactory bonding is not performed.

[8-6] Hologram Layer:

The second transfer material may further include a hologram layer 58 like the transfer material 1 illustrated in FIG. 32. The hologram layer 58 is a layer having recorded thereon a three-dimensional image, and is arranged between the transparent sheet 52 and the coloring material-receiving layer 53. When the transfer material includes the hologram layer, a preventing effect on the forgery of a recorded matter (such as a credit card) is imparted to the transfer material. The construction of the hologram layer is not particularly limited and a conventionally known construction can be adopted. A relief hologram can be given as an example thereof.

When the anchor layer 59 is arranged, the hologram layer 58 can be arranged between the anchor layer 59 and the transparent sheet 52 as illustrated in FIG. 32. The hologram layer 58 is generally formed of a resin layer, but the layer itself may have a single structure or may have a multilayer structure. In addition, a hologram-formed layer may include a plane hologram or a volume hologram, and the plane hologram, in particular, a relief hologram is preferred in terms of mass productivity and a cost.

In addition, the following holograms can be used: laser reproduction holograms, such as a Fresnel hologram, a Fraunhofer hologram, a lensless Fourier transform hologram, and an image hologram; white light reproduction holograms, such as a rainbow hologram; and a color hologram, a computer hologram, a hologram display, a multiplex hologram, a holographic stereogram, and a hologram diffraction grating, which utilize principles thereof.

For example, a silver salt, gelatin dichromate, a thermoplastic, a diazo-based photosensitive material photoresist, a ferroelectric, a photochromic material, or chalcogen glass can be used as a photosensitive material for forming a hologram for recording interference fringes. In addition, the following materials can be used as a material for the hologram-formed layer: thermoplastic resins, such as polyvinyl chloride, an acrylic resin (e.g., polymethyl methacrylate), polystyrene, and polycarbonate; products obtained by curing thermosetting resins, such as unsaturated polyester, melamine, epoxy, polyester (meth)acrylate, urethane (meth)acrylate, epoxy (meth)acrylate, polyether (meth)acrylate, polyol (meth)acrylate, melamine (meth)acrylate, and triazine-based acrylate; and a mixture of the thermoplastic resin and the thermosetting resin.

Further, a thermoformable substance having a radically polymerizable unsaturated group can be used as a material for the hologram layer 58. The hologram layer 58 can be formed by a conventionally known method. For example, when a transparent hologram is a relief hologram, a hologram original plate having recorded thereon interference fringes in the form of unevenness is used as a press die. Then, a resin sheet for forming a hologram is placed on the hologram original plate, and both the sheet and the plate are thermally pressure-bonded by a unit such as a heat roll. Then, a hologram-formed layer having a relief-formed surface can be obtained by a method of duplicating the uneven pattern of the hologram original plate on the surface of the resin sheet for forming a hologram.

[8-7] Laminated Structure:

As illustrated in FIG. 31, the second transfer material has a laminated structure in which the base material sheet 50, the transparent sheet 52, and the coloring material-receiving layer 53 are sequentially laminated. The phrase "the base material sheet, the transparent sheet, and the coloring material-receiving layer are sequentially laminated" means that the base material sheet, the transparent sheet, and the coloring material-receiving layer are laminated in the stated order irrespective of whether or not any other layer is interposed between any adjacent two of the base material sheet, the transparent sheet, and the coloring material-receiving layer. That is, a structure in which the anchor layer 59 or the hologram layer 58 is present between the transparent sheet 52 and the coloring material-receiving layer 53 like the transfer material 1 illustrated in FIG. 32 is also included in the laminated structure in which "the base material sheet, the transparent sheet, and the coloring material-receiving layer are sequentially laminated."

However, the second transfer material preferably has a laminated structure in which the base material sheet 50, the transparent sheet 52, and the coloring material-receiving layer 53, which are brought into abutment with one another, as illustrated in FIG. 31. That is, a structure in which no other layers (including sheets) are interposed between the base material sheet 50 and the transparent sheet 52, and between the transparent sheet 52 and the coloring material-receiving layer 53 is preferred. This is because of the following reason. There are strict limitations on the thicknesses of a credit card and the like each serving as an object of the recorded matter. Accordingly, the recorded matter is desirably thinned by reducing the number of layers or sheets to be laminated. In particular, the adhesive strength between the transparent sheet and the coloring material-receiving layer is significantly improved by precisely adjusting the weight-average polymerization degree and saponification degree of the polyvinyl alcohol in the coloring material-receiving layer, and hence there is no need to form the releasing layer or the anchor layer. Such construction has an advantage in that the transfer material, and by extension, the recorded matter can be thinned.

When the second transfer material further includes the releasing layer 51, the anchor layer 59, and the hologram layer 58 as illustrated in FIG. 32, the transfer material preferably has a laminated structure in which the coloring material-receiving layer 53, the anchor layer 59, the hologram layer 58, the transparent sheet 52, the releasing layer 51, and the base material sheet 50 are sequentially laminated.

[8-8] Shape and Thickness of Transfer Material:

The same shape and thickness as those described in the section [1-7] can be used as the shape and thickness of the second transfer material.

[8-9] Manufacturing Method:

The second transfer material can be manufactured by, for example, applying a coating liquid containing the inorganic fine particles, the water-soluble resin, and the cationic resin to a laminate in which the base material sheet and the transparent sheet are sequentially laminated. It should be noted that in the following description, a matter that has already been described in, for example, the section of the transfer material is omitted, and only a matter intrinsic to the manufacturing method is described.

[8-9-1] Transparent Sheet:

A transparent sheet subjected to surface modification in advance may be used. The performance of the surface modification for roughening the surface of the transparent sheet improves the wettability of the transparent sheet, and hence can improve its adhesiveness to the coloring material-receiving layer or the anchor layer in some cases. A method for the surface modification is not particularly limited. Examples thereof can include: a method involving subjecting the surface of the transparent sheet to a corona discharge process or a plasma discharge process in advance; and a method involving applying an organic solvent, such as IPA or acetone, to the surface of the transparent sheet. Any such surface process improves the binding property between the coloring material-receiving layer and the transparent sheet, improves the strength of the transparent sheet, and hence can prevent such an inconvenience that the coloring material-receiving layer peels from the transparent sheet.

In addition, the transparent sheet may be used in the state of a laminate with any other layer or sheet. For example, a laminated sheet in which the anchor layer, the transparent sheet, the releasing layer formed of a composition containing a release agent, and the base material sheet are sequentially laminated is preferably used.

The releasing layer can be formed by: applying a coating liquid containing a resin and a wax forming the releasing layer to, for example, a resin film forming the base material sheet; and drying the liquid. As an application method, there can be given conventionally known application methods, such as a gravure recording method, a screen recording method, and a reverse roll coating method involving using a gravure plate.

[8-9-2] Coating Liquid:

The coloring material-receiving layer is obtained by: mixing at least the inorganic fine particles, the water-soluble resin, and the cationic resin with a proper medium to prepare a coating liquid; applying the liquid to the surface of the transparent sheet; and drying the liquid.

The same medium, additives, and concentration as those described in the section [1-5] can be used as the medium and other additives of the coating liquid, and the concentration of the inorganic fine particles in the coating liquid.

[8-9-3] Application:

The coloring material-receiving layer is formed by, for example, applying the coating liquid to the surface of the transparent sheet forming a laminate of the base material sheet and the transparent sheet. After the application, the coating liquid is dried as required. Thus, the transfer material 1 having such a laminated structure in which the base material sheet 50, the transparent sheet 52, and the coloring material-receiving layer 53 are sequentially laminated as illustrated in FIG. 31 can be obtained.

When the laminated sheet in which the anchor layer, the transparent sheet, the releasing layer, and the base material sheet are sequentially laminated is used, the coating liquid only needs to be applied to the surface of the anchor layer forming the laminated sheet. Thus, the second transfer material having such a laminated structure in which the coloring material-receiving layer 53, the anchor layer 59, the transparent sheet 52, the releasing layer 51, and the base material sheet 50 are sequentially laminated as illustrated in FIG. 32 can be obtained.

The same application method and coating weight as those described in the section [1-5] can be used as an application method and the coating weight of the coating liquid.

Figure 33:
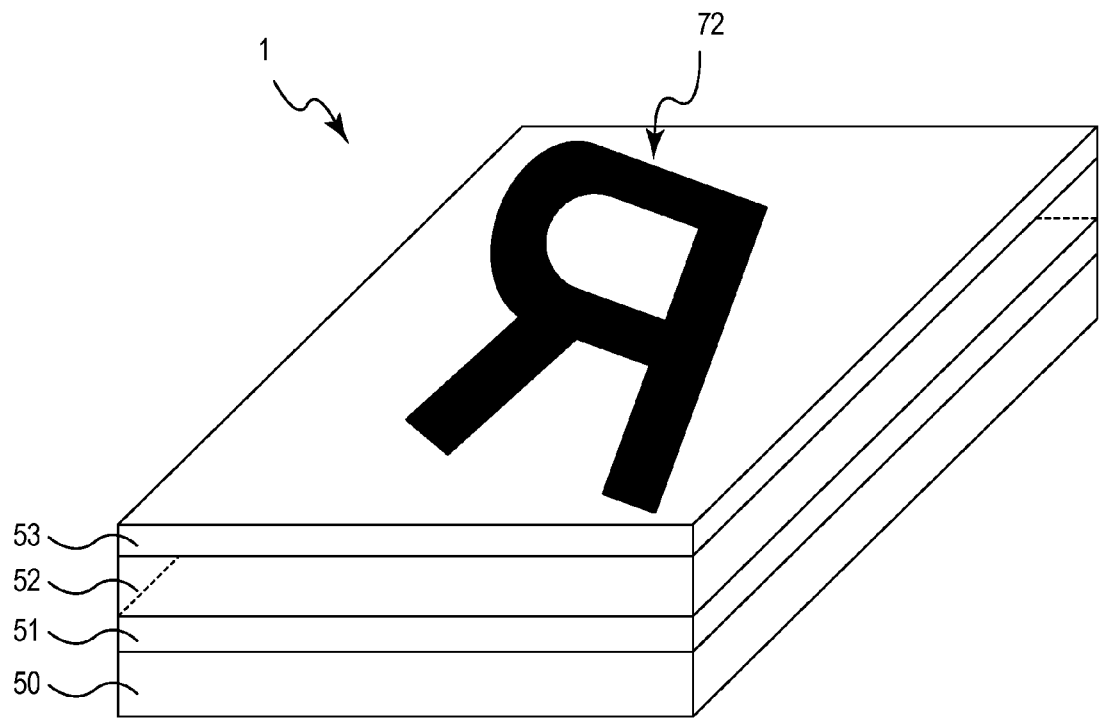
FIG. 33 is a perspective view for schematically illustrating the second transfer material of the present invention.

[8-10] Image:

FIG. 33 is a perspective view for schematically illustrating the second transfer material. The transfer material is preferably such that an image is formed on the coloring material-receiving layer. The reverse image 72 having the following characteristic is particularly preferably recorded on the coloring material-receiving layer 53 like the transfer material 1 illustrated in FIG. 33: the image becomes a mirror image when viewed from a side closer to the coloring material-receiving layer 53, and becomes a normal image when viewed from a side closer to the transparent sheet 52.

In the second transfer material, the reverse image 72 is recorded on the surface of the coloring material-receiving layer 53 on which the transparent sheet 52 is not laminated like the transfer material 1 illustrated in FIG. 33. In particular, the reverse image recorded by an inkjet recording system can improve the productivity and information security of a recorded matter, and can reduce a recording cost as compared to a conventional thermal transfer system.

In the second transfer material, the reverse image may be formed with a dye ink, or may be formed with a pigment ink. However, the reverse image is preferably formed with the pigment ink. When the reverse image is formed with the pigment ink, water and a solvent in the ink hardly remain on the surface of the coloring material-receiving layer (i.e., the ink can be easily dried). Accordingly, a bonding failure between the image support and the transfer material (specifically the coloring material-receiving layer), and migration (movement of the ink) resulting from the water and the solvent can be effectively prevented. Further, the formation of the reverse image with the pigment ink can improve the lightfastness of the reverse image.

Figure 34:
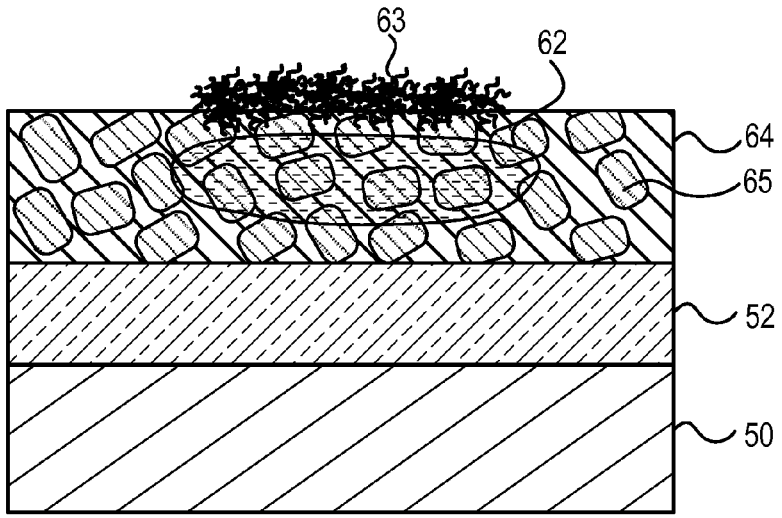
FIG. 34 is a sectional view for schematically illustrating a state in which the pigment ink is fixed to the gap absorption-type coloring material-receiving layer.
Figure 35:
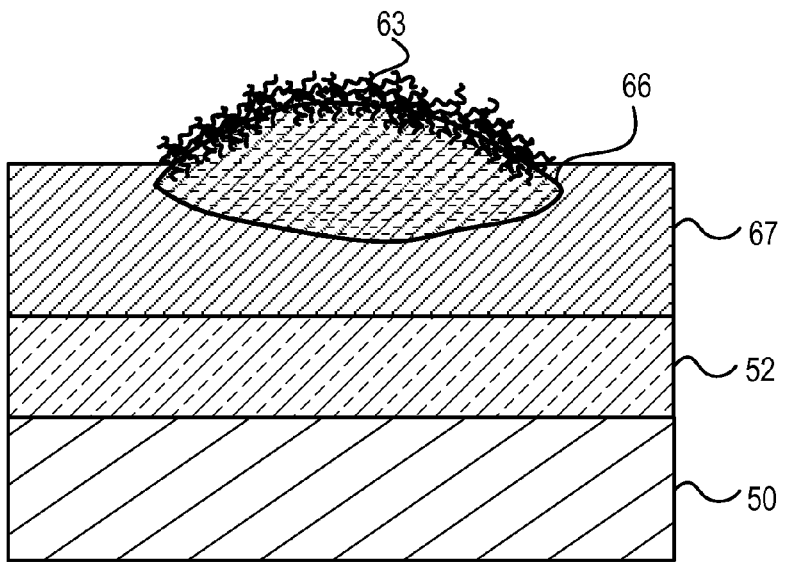
FIG. 35 is a sectional view for schematically illustrating the swollen state of the swelling absorption-type coloring material-receiving layer after the fixation of the ink to the coloring material-receiving layer.

The foregoing contents are described in more detail. The pigment component 63 in the pigment ink has a large particle diameter. Accordingly, as illustrated in FIG. 34, in the gap absorption-type coloring material-receiving layer 64, the pigment component 63 does not permeate the insides of the pores formed of the inorganic fine particles 65 forming the coloring material-receiving layer 64, but is fixed to the recording surface of the coloring material-receiving layer 64. Further, unlike a swelling type coloring material-receiving layer, the gap absorption-type coloring material-receiving layer 64 does not swell and hence the coloring material-receiving layer 64 is kept smooth. On the other hand, in the case of the swelling absorption-type coloring material-receiving layer 67, as illustrated in FIG. 35, the coloring material-receiving layer 67 swells owing to the water in the ink, and hence unevenness occurs on the surface of the coloring material-receiving layer 67. Accordingly, its adhesive property to the image support reduces. In addition, the remaining water and solvent in the ink remain on the surface 66 of the coloring material-receiving layer 67. Accordingly, there is a risk in that the adhesiveness between the image support and the coloring material-receiving layer becomes insufficient owing to the vaporization of the remaining water and solvent in the adhering step, which is not preferred.

Figure 36:
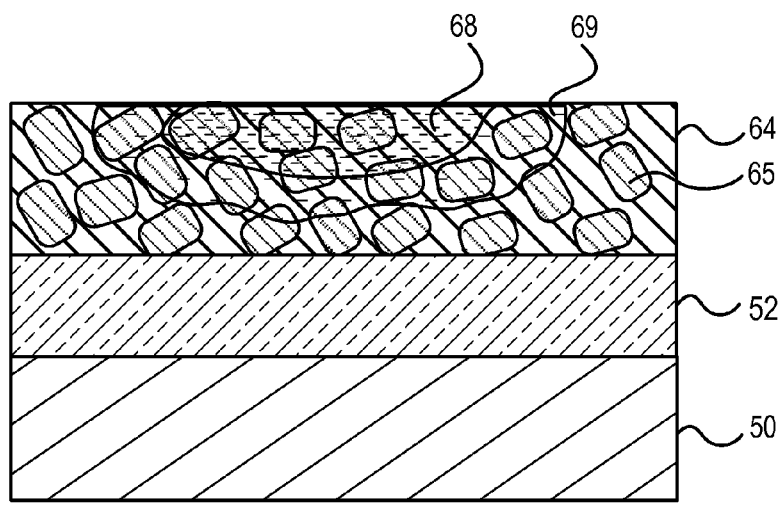
FIG. 36 is a sectional view for schematically illustrating a state in which the dye ink migrates after the fixation of the dye ink to the gap absorption-type coloring material-receiving layer.

In addition, in the gap absorption-type coloring material-receiving layer 64, the pigment component 63 in the pigment ink fixes on the surface of the coloring material-receiving layer 64. Meanwhile, the water and solvent component 62 in the ink permeates the inside of the coloring material-receiving layer 64 to separate (solid-liquid separation) from the pigment component 63 on the surface. Thus, a pigment surface is in a dry state at the time of the transfer, and hence a bonding failure due to the vaporization of the water can be prevented and the adhesive property can be improved. In addition, the remaining water and solvent component 62 remains in the coloring material-receiving layer 64. Accordingly, the pigment component 63 is not brought into contact with the remaining water and solvent component 62 again, and hence the movement (migration) of the ink can be prevented. On the other hand, in the dye ink, as illustrated in FIG. 36, the dye component 68 moves (migrates) like the dye component 69 owing to an influence of the remaining water, and hence bleeding occurs.

The same ink as that described in the section [3-1] can be used as the pigment ink. It should be noted that when the coloring material-receiving layer of the transfer material contains the cationic resin, in general, negatively charged pigment particles electrostatically bond to the cationic resin to strengthen an adhesive property between the coloring material-receiving layer and the pigment ink. However, when the self-dispersible pigment is used, if the surface of the coloring material-receiving layer is covered with the self-dispersible pigment, there is a case in which the adhesiveness between the image support and the coloring material-receiving layer reduces to reduce the transfer performance. In view of the foregoing, in the embodiments of the present invention, the resin dispersion-type pigment is used. The resin dispersion-type pigment has the pigment particles of which the peripheries are covered with a resin. Therefore, the resin dispersion-type pigment is preferred because the transfer performance is more improved than the self-dispersible pigment. In addition, when the resin dispersion-type pigment is used as the pigment ink, the SP values of the dispersing resin and the cationic resin in the coloring material-receiving layer are preferably brought close to each other. Thus, the adhesive property of the resin dispersion-type pigment to the coloring material-receiving layer improves. An acrylic resin, such as a (meth)acrylate copolymer, is preferably used as the resin. The SP value of the acrylic resin is close to the SP values of, for example, the polyvinyl alcohol or the cationic resin in the coloring material-receiving layer, a primer resin, and the PVC or PET-G of the image support. Accordingly, even when a printed surface is covered with a pigment film after printing, a binding property between the image support and the coloring material-receiving layer can be improved. Accordingly, when a mode in which the transparent sheet is arranged between the base material and the coloring material-receiving layer is adopted, the transfer performance of the coloring material-receiving layer onto the image support can be improved.

[8-11] Recording of Image:

Next, an image is recorded on the surface of the coloring material-receiving layer in the second transfer material on which the transparent sheet is not laminated. In particular, a reverse image having the following characteristic is recorded: the image becomes a mirror image when viewed from the side closer to the coloring material-receiving layer, and becomes a normal image when viewed from the side closer to the transparent sheet. Thus, as illustrated in FIG. 33, the reverse image 72 is recorded on the coloring material-receiving layer 53 of the transfer material 1.

The same construction as that described in the section [3-2] can be used in the recording of the image.

When the transparent sheet is arranged between the base material and the coloring material-receiving layer, the ejection amount of the ink from a recording head is preferably 20 pl or less. The ejection amount of the ink is set to 20 pl or less, preferably 10 pl or less, more preferably 5 pl or less. Thus, an improvement in absorbability of the ink and high-speed recording thereof can be achieved. In addition, the water content of the ink can be controlled to an appropriate level in the step of thermally pressure-bonding the coloring material-receiving layer and the image support, and hence the transferability of the coloring material-receiving layer can be improved.

In addition, the image is preferably printed so as to have a size larger than that of the image support. Thus, borderless printing can be performed and hence a satisfactory image can be obtained. In particular, when an inkjet system is used, direct borderless printing on the image support leads to the absorption of the ink in an edge portion, thereby deteriorating the image quality of the edge portion. However, in the present invention, satisfactory printing of the edge portion can be performed even by the inkjet system.

Figure 37:
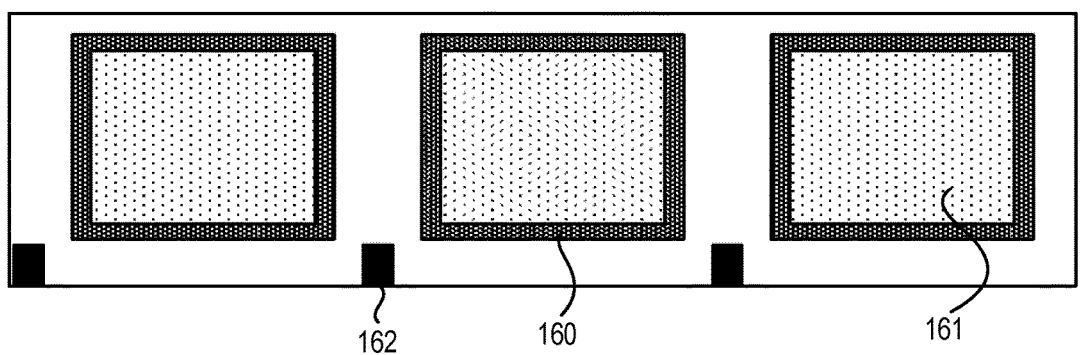
FIG. 37 is a schematic view for illustrating a state in which a marking is printed on the transfer material.
Figure 38:
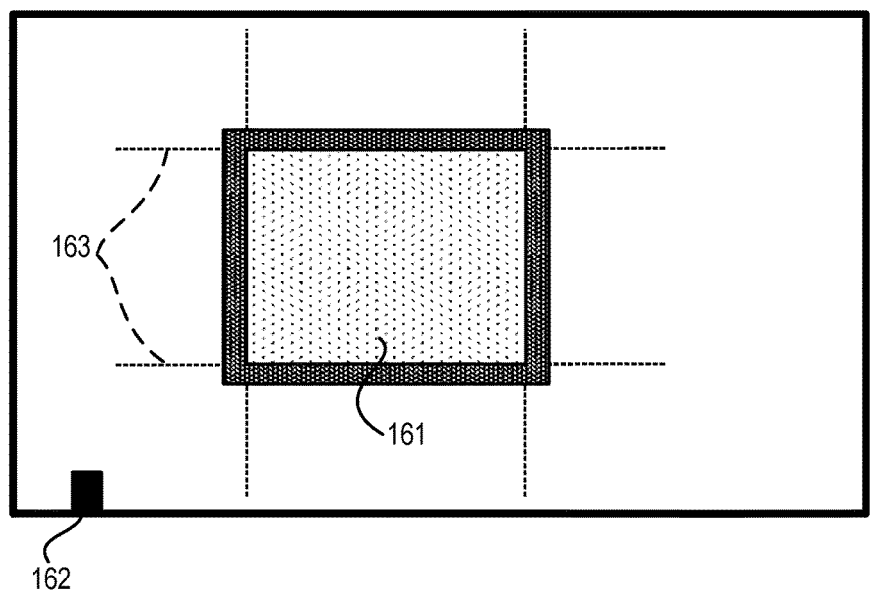
FIG. 38 is a schematic view for illustrating a state in which attachment guides are printed on the transfer material.

[8-11-1] Marking Process:

In addition, upon printing of the image, as illustrated in FIG. 37, a marking 162 for registration can be printed outside an image formation region 161 or a printing region 160 for the registration of an automatic laminating machine in the transferring step. When the marking is read with a transmission- and reflection-type sensor, the transfer material and the image support can be attached to each other at an accurate position at the time of the transfer. In addition, when the transfer material has a cut sheet shape as illustrated in FIG. 38, in addition to the marking 162, attachment guides 163 are printed outside the image formation region 161, whereby the attachment position at the time of the transfer can be easily adjusted.

[8-11-2] Drying of Ink:

In the embodiments of the present invention, the ink for inkjet recording with which an image is formed is preferably dried until its water content becomes 70 mass % or less with respect to the total input amount of the ink. Setting the water content of the ink to 70 mass % or less, preferably 50 mass % or less suppresses abrupt vaporization of an ink component, and hence can prevent inconveniences such as a reduction in adhesive strength between the image support and the transfer material, and the remaining of air bubbles in the coloring material-receiving layer. It should be noted that the term "water content" as used herein means the total amount of, for example, water and a nonvolatile solvent except a coloring material. The total input amount of the ink can be adjusted by the ink ejection amount from the recording head. The input amount may be limited by, for example, thinning down the number of dots at the time of image recording in advance so that the control of the water content can be easily performed. The drying can be performed with, for example, a heater (heat source), such as a halogen heater, or an exhaust apparatus, such as a fan. However, natural drying may be promoted by causing a conveying path having a sufficient length to dry the ink by conveyance without arranging a special drying unit, such as a heater.

Figure 39:
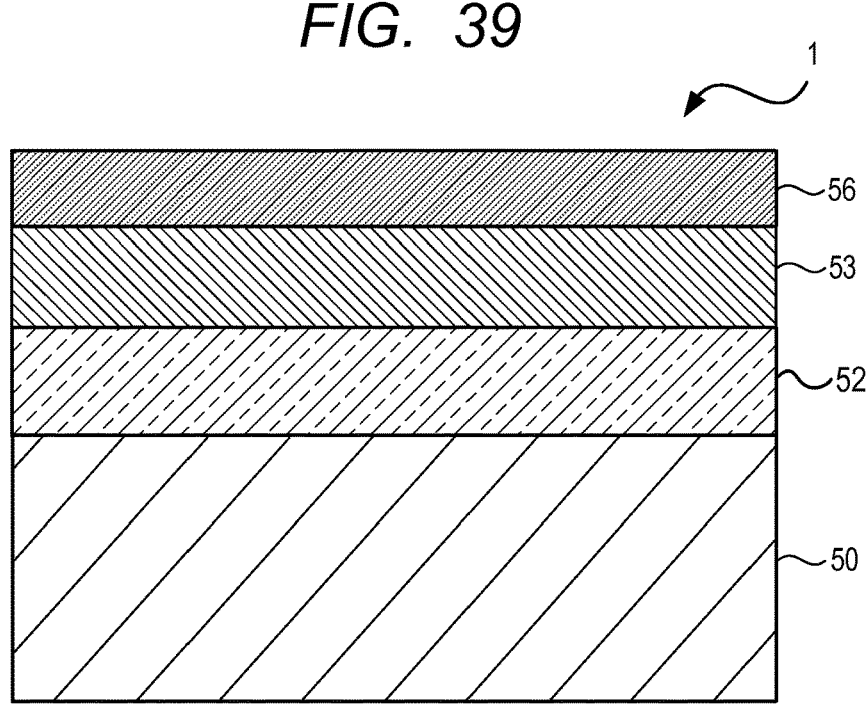
FIG. 39 is a sectional view for schematically illustrating another embodiment of the second transfer material.

[8-12] Primer Layer:

As illustrated in FIG. 39, the transfer material 1 after the printing preferably further includes the primer layer 56 on the surface of the coloring material-receiving layer 53. The primer layer 56 has an adhesive property and is arranged on the surface of the coloring material-receiving layer. In this case, the primer layer is brought into contact with the image support. When the transfer material includes the primer layer, the adhesiveness and adhesive strength between the image support and the transfer material can be improved, and hence the following inconvenience can be suppressed: the transfer material peels from the image support owing to an insufficient adhesive strength. Arranging the primer layer can control the difference SP2 between the SP value of the primer layer and the SP value of the image support to the range represented by the general formula (1), and hence can improve the adhesiveness and the adhesive strength. Accordingly, the following inconvenience can be suppressed: the coloring material-receiving layer peels from the image support. In particular, when a PET base material except PVC or PET-G is used as the image support, it is effective to arrange the primer layer.

The same layer as that described in the section [1-6] can be used in the primer layer.

[9] Second Recorded Matter:

A second recorded matter includes the image support 55 on which an image is supported and a recording medium having recorded thereon the image like a recorded matter 73 illustrated in FIG. 30. In addition, the recording medium is obtained by recording the image on the coloring material-receiving layer 53 of the second transfer material and peeling the base material sheet. Further, the recorded matter has a laminated structure in which the image support 55, the coloring material-receiving layer 53, and the transparent sheet 52 are sequentially laminated, and the difference SP2 between the SP value of the image support 55 and the SP value of the layer of the transfer material to be brought into abutment with the image support 55 (in the example illustrated in FIG. 1, the coloring material-receiving layer 53) satisfies a relationship represented by the following formula (1).

$$0 \leq SP2 \leq 1.0 \tag{1}$$

[9-1] Method of Manufacturing Recorded Matter (Step 2 and Step 3)

Figure 41:
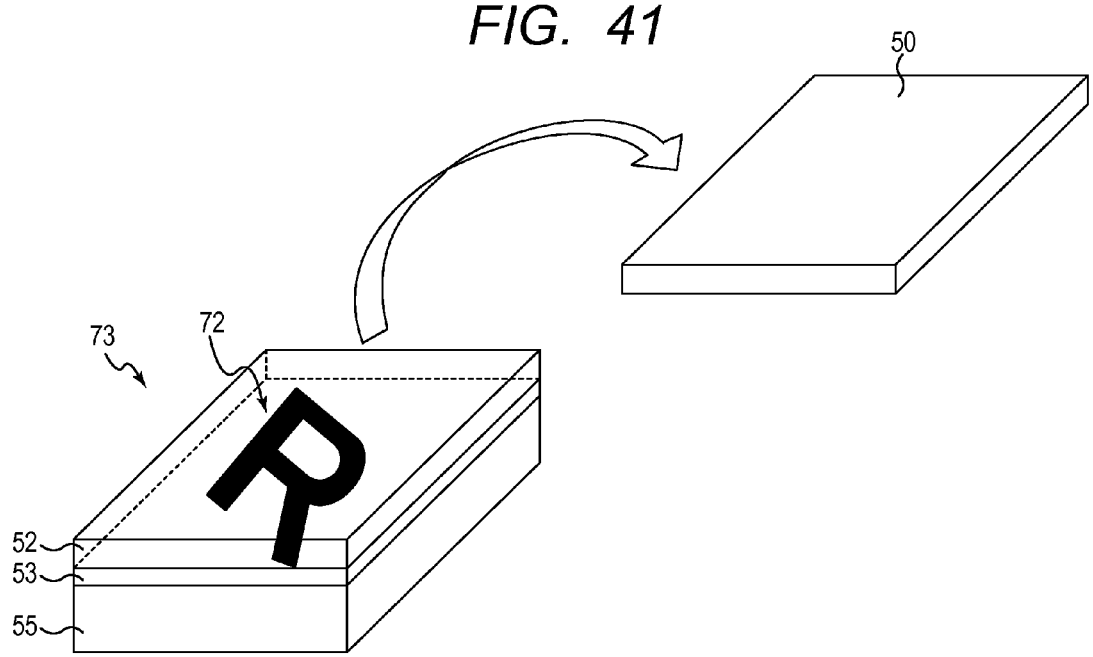
FIG. 41 is a perspective view for schematically illustrating a state in which a recorded matter is formed by attaching the second transfer material to the image support.

FIG. 40 is a sectional view for schematically illustrating a laminate 84 obtained by attaching the second transfer material to the image support 55, and FIG. 41 is a perspective view for schematically illustrating the step of peeling the base material sheet 50 from the laminate 84 illustrated in FIG. 40 to provide the recorded matter 73.

As illustrated in FIG. 40, the second transfer material is used by being attached to the image support 55 so that the coloring material-receiving layer 53 may face the image support 55. Thus, the laminate 84 in which the image support 55, the coloring material-receiving layer 53, and the transparent sheet 52 are sequentially laminated is formed. Thus, the reverse image recorded on the coloring material-receiving layer 53 of the transfer material is attached to the image support 55.

After that, as illustrated in FIG. 41, the base material sheet 50 is peeled from the laminate, whereby the recorded matter 73 can be obtained.

[9-2] Image Support:

The same image support as that described in the section [2-1] can be used.

[9-3] Laminated Structure:

The recorded matter obtained by utilizing the second transfer material has a laminated structure in which the image support 55, the coloring material-receiving layer 53, and the transparent sheet 52 are sequentially laminated like the recorded matter 73 illustrated in FIG. 30 or FIG. 41.

[9-4] Thermal Pressure Bonding of Transfer Material and Image Support:

The image support and the second transfer material are thermally pressure-bonded under a state of being brought into abutment with each other so that the image support, the coloring material-receiving layer, and the transparent sheet may be sequentially laminated. Thus, the recorded matter having a laminated structure in which the image support, the coloring material-receiving layer, and the transparent sheet are sequentially laminated is obtained.

The same temperature and method as those described in the section [2-2-1] can be used as the temperature at which the thermal pressure bonding is performed and a method for the thermal pressure bonding.

[9-5] Peeling of Base Material Sheet and Releasing Layer:

Finally, as illustrated in FIG. 41, the base material sheet 50 is peeled, whereby the second recorded matter 73 having a structure in which the image support 55, the coloring material-receiving layer 53, and the transparent sheet 52 are sequentially laminated is obtained. In the recorded matter 73, the transparent sheet 52 is positioned in the uppermost layer to protect the reverse image 72 recorded on the coloring material-receiving layer 53 positioned on a lower layer side thereof. It should be noted that when a primer layer is used, the image support 55 is sufficiently brought into close contact with, and fixed to, the coloring material-receiving layer 53 through intermediation of the primer layer.

Figure 42:
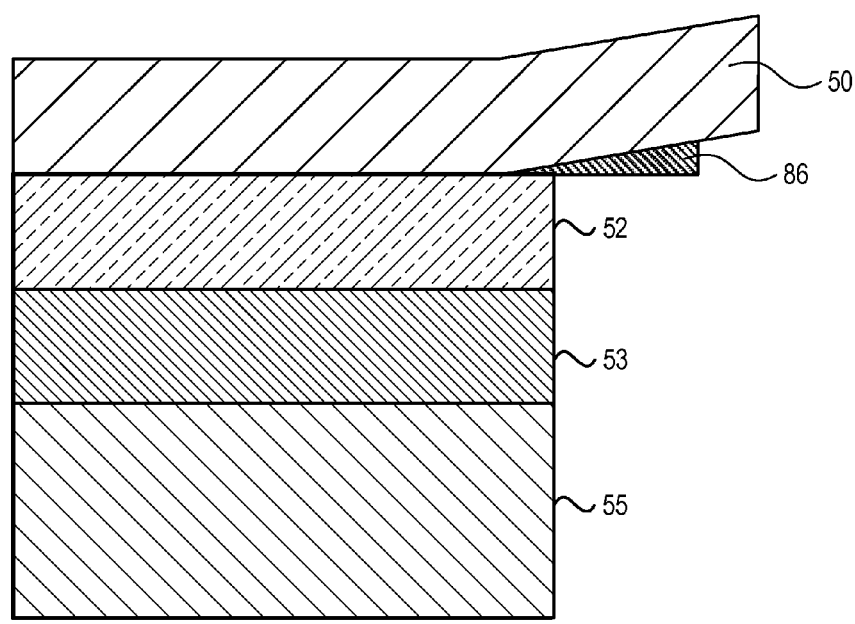
FIG. 42 is a sectional view for schematically illustrating the step of peeling a base material sheet from a laminate of the second transfer material and the image support with the separation claw.

Upon peeling of the base material sheet, when the transfer material is of a hot peeling type, it is preferred that the peeling be immediately performed before the temperature reduces after the thermal pressure bonding. In the case of such hot peeling type, the peeling is preferably performed by a peeling mechanism based on the separation claw 86 illustrated in FIG. 42 or by the peeling roll 88 illustrated in FIG. 43. The hot peeling type is suitable in terms of productivity when the supply of the transfer material in the transferring step is performed by a "roll-to-roll" process.

Figure 43:
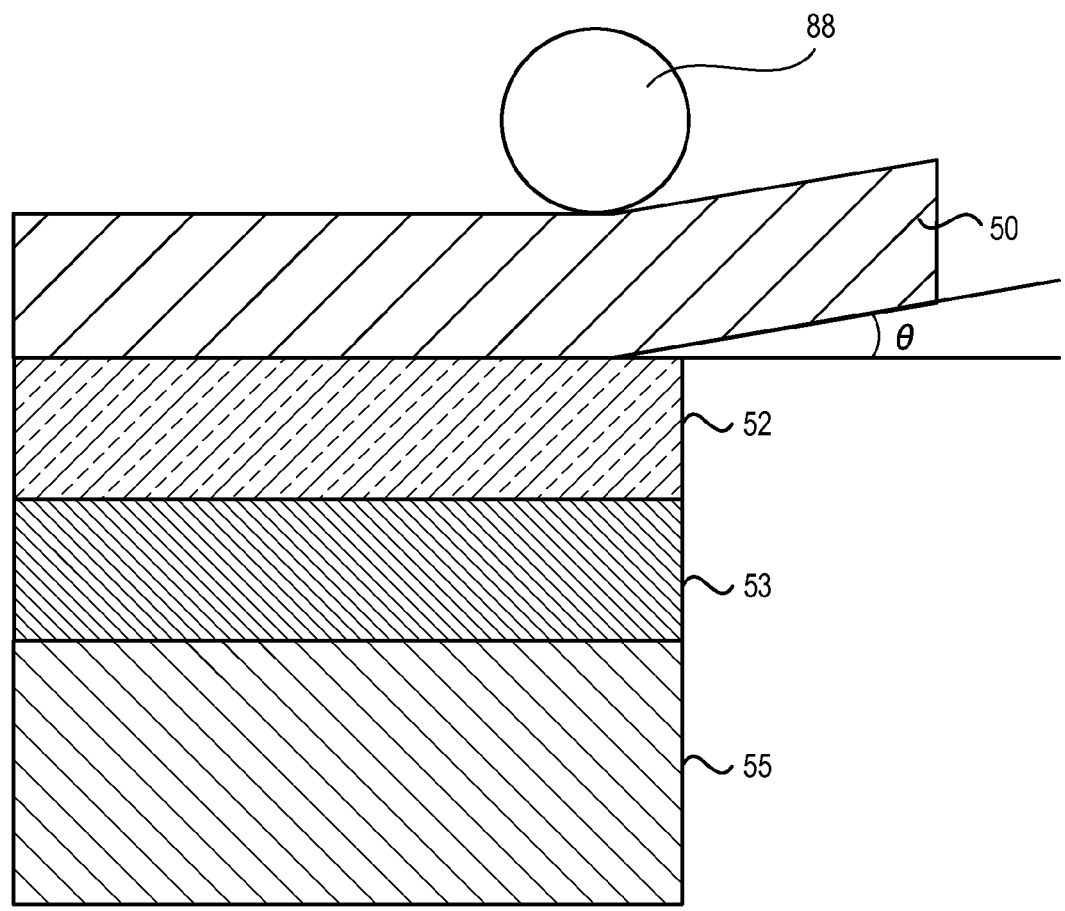
FIG. 43 is a sectional view for schematically illustrating the step of peeling the base material sheet from the laminate of the second transfer material and the image support with the peeling roll.

On the other hand, when the second transfer material to be utilized is of a cold peeling type, the peeling can be performed even after the temperature has reduced. In such case, not only the peeling by the roll or the peeling mechanism but also manual peeling is available. Accordingly, the cold peeling type can be suitably used particularly when a transfer material processed into a cut sheet shape is used. It should be noted that the peeling angle θ upon performance of the peeling by the "roll-to-roll" process is from 0° to 165°, more preferably from 0° to 90°. Setting the peeling angle θ as described above can prevent a patch portion separated by the precut process of the transfer material in the precut process portion from peeling or being turned up casually during the running of a printer. In FIG. 43, the peeling angle θ is an angle illustrated in the figure but is not limited thereto.

In the thermal pressure bonding and the peeling step, known laminating machines of a two-roll type and a four-roll type may be used. A laminating machine of a four-roll type is preferably used because as compared to a laminating machine of a two-roll type, heat at the time of the thermal pressure bonding can be easily transferred, and hence the transferring and peeling steps can be easily performed.

[9-6] Double-Sided Simultaneous Peeling:

The same double-sided simultaneous peeling as that described in the section [2-2-3] can be used. When printed products are simultaneously transferred onto both surfaces of the image support, the printing positions of the upper-surface transfer material 92 and the lower-surface transfer material 94 on the film are preferably shifted as shown in FIG. 8.

Figure 44:
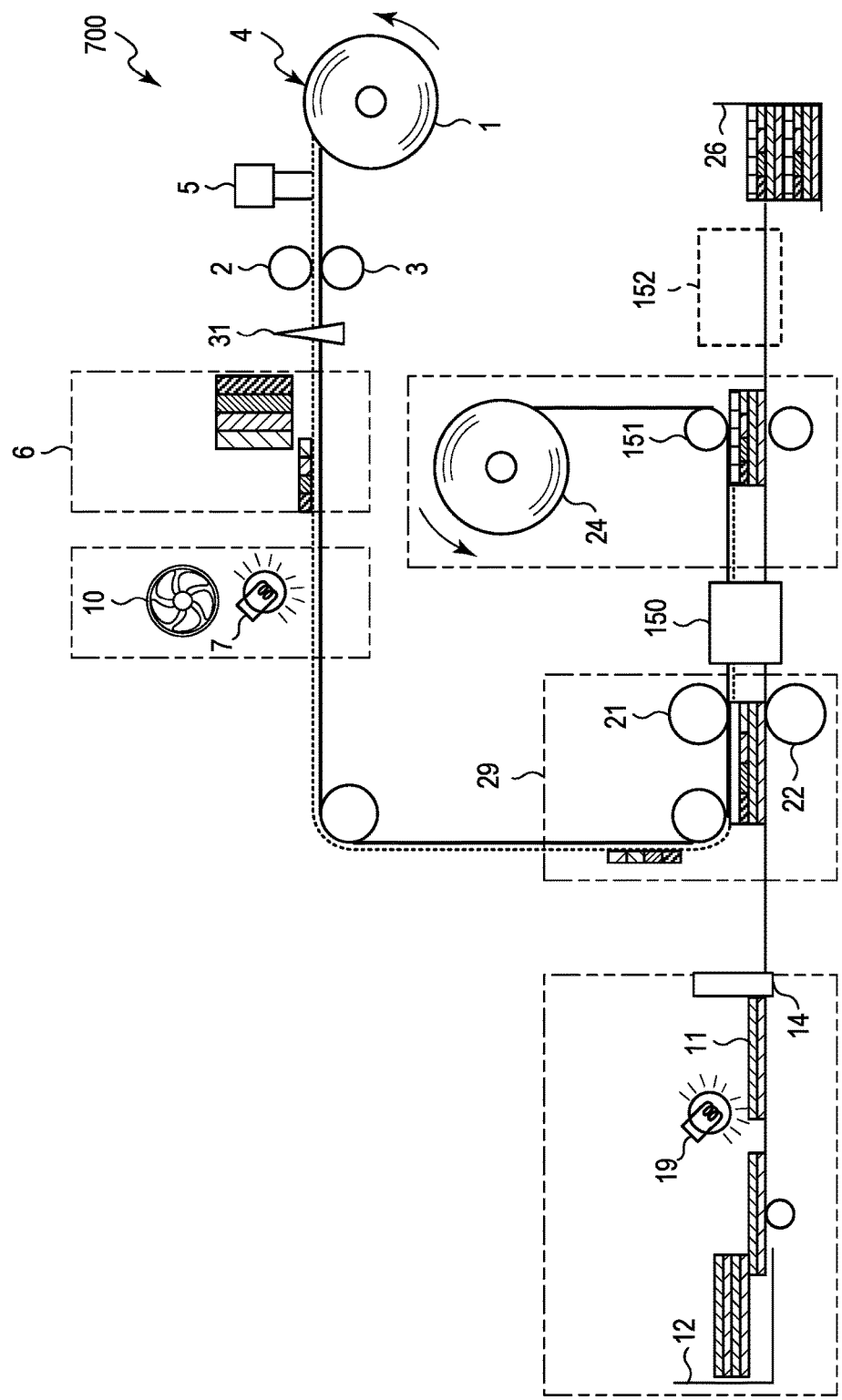
FIG. 44 is a side view for schematically illustrating an example of the construction of a sixth manufacturing apparatus for manufacturing the second recorded matter.

[11-1] Sixth Manufacturing Apparatus:

FIG. 44 is a side view for schematically illustrating a sixth construction example of the manufacturing apparatus for manufacturing a recorded matter (hereinafter sometimes referred to as "sixth manufacturing apparatus").

[11-1-1] Main Construction:

The sixth manufacturing apparatus includes: a supply portion 4 configured to feed the second transfer material 1 that has a roll shape and is rolled so that the coloring material-receiving layer is arranged on its outer surface to a conveying path; the precut process portion 5 for performing a precut process; and the recording portion 6 configured to directly eject an aqueous ink containing, for example, a coloring material, water, and a nonvolatile organic solvent onto the transfer material 1 fed to the conveying path to record a reverse image.

In addition, the sixth manufacturing apparatus includes: a drying portion 7 configured to vaporize water in the transfer material 1 having applied thereto the ink to improve its adhesiveness to the image support 11; and a fan 10 configured to prevent dew condensation in the machine due to the vaporized water.

Further, the sixth manufacturing apparatus includes: the preheating portion 19 configured to heat the image support 11 to improve its adhesiveness to the transfer material 1; the adhesion portion 29 configured to allow the coloring material-receiving layer having recorded thereon the reverse image and a transparent sheet to adhere to the image support 11; the decurling portion 150 configured to correct the curl of the image support 11 after the adhesion; the peeling portion 151 configured to peel a base material sheet; the image-reversing portion 152 configured to reverse the image support 11 upon performance of duplex printing; and the discharge portion 26 configured to accumulate the discharged image support 11 having recorded thereon the reverse image.

[11-1-2] Operation:

The supply portion 4 rotates the second transfer material 1 that has a roll shape and is rolled so that the coloring material-receiving layer may be arranged on its outer surface in a direction indicated by the arrow in the figure, and feeds the transfer material 1 to the recording portion 6. At that time, the transfer material 1 is guided by a guide plate, and is sandwiched between a grip roller 3 and a nip roller 2, and is hence conveyed in a flat state to the recording portion 6.

When the conveyance of the second transfer material 1 from the supply portion 4 is started, a portion to be detected (through-hole) subjected to the precut process in the precut process portion 5 is detected by the sensor portion 31, and the coloring material-receiving layer is subjected to a precut process. The recording portion 6 is configured to record the reverse image on the coloring material-receiving layer of the transfer material 1. After that, the transfer material 1 passes the drying portion 7. The drying portion 7 is configured to vaporize, for example, water in the ink forming the reverse image and the fan 10 exhausts the vaporized water. Thus, the transfer material 1 in which the reverse image has been recorded on the coloring material-receiving layer is obtained. At this time, marking printing is also performed.

Meanwhile, the image support-supply portion 12 is configured to supply the image support 11 to the preheating portion 19 one by one.

The preheating portion 19 is configured to heat the image support 11 for improving the adhesiveness to the second transfer material 1. Further, the registration guide 14 performs registration between the image support 11 and the transfer material 1. After that, the image support 11 is laminated on the transfer material 1.

The laminate of the image support 11 and the second transfer material 1 is conveyed to the adhesion portion 29. The adhesion portion 29 includes the pair of heat rollers 21 and 22. The image support 11 and the second transfer material 1 are thermally pressure-bonded upon passage of the laminate through the pair of heat rollers 21 and 22.

After that, the laminate of the image support 11 and the second transfer material 1 is conveyed to the decurling portion 150, and its curl is corrected. Further, the base material sheet and releasing layer of the transfer material 1 are peeled in the peeling portion 151, and are rolled around the take-up roll 24. In addition, upon performance of the duplex printing, the image support is reversed by the image-reversing portion 152 and the image support is fed back to the registration guide 14. In addition, a back surface image is similarly printed on the coloring material-receiving layer transferred onto the image support that has been fed back. After that, back surface printing is performed through the steps in the adhesion portion 29, the decurling portion 150, and the peeling portion 151 as in front surface printing. Through such operations, the recorded matter in which the second transfer material 1 has been thermally pressure-bonded onto the image support 11 can be obtained.

Figure 45:
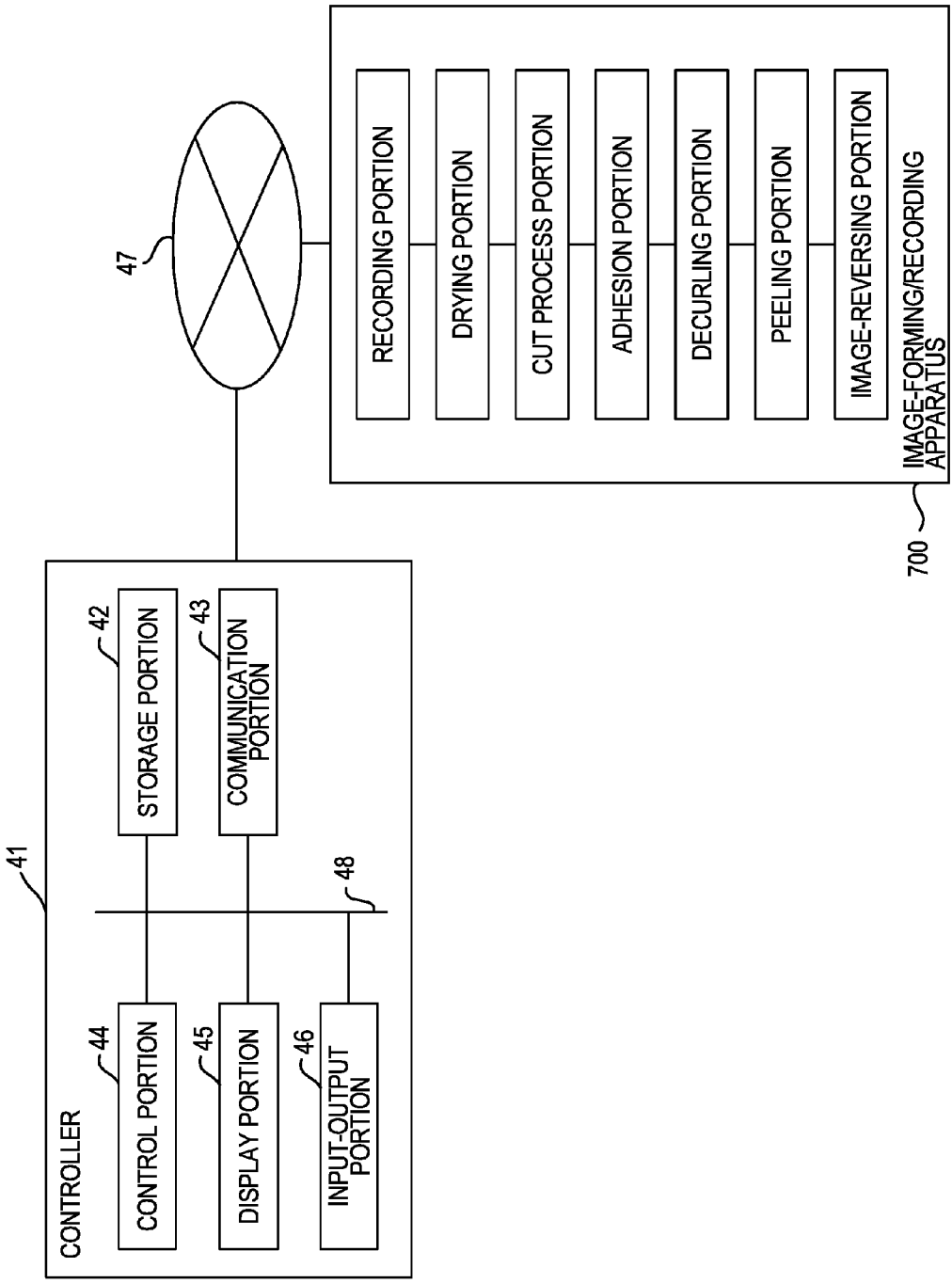
FIG. 45 is a block diagram for illustrating the state of connection between the sixth manufacturing apparatus and the controller.

[11-1-3] Connection Between Sixth Manufacturing Apparatus and Controller:

As illustrated in FIG. 45, a manufacturing apparatus 700 (image-forming/recording apparatus) is connected to the controller 41 through the network 47. However, the manufacturing apparatus 700 can be connected to the controller 41 not through the network 47 but through, for example, a serial port, a parallel port, or a USB port. The manufacturing apparatus 700 includes, for example, the precut process portion, the recording portion, the drying portion, the adhesion portion, the decurling portion, the peeling portion, and the image-reversing portion. In addition, a CPU is included in the recording portion, and is connected to the precut process portion, the recording portion, the drying portion, the preheating portion, the adhesion portion, the decurling portion, the peeling portion, and the image-reversing portion. In addition, the CPU is configured to control the operations of the precut process portion, the recording portion, the drying portion, the preheating portion, the adhesion portion, the decurling portion, the peeling portion, and the image-reversing portion.

The network 47 is a network such as the Internet or a local area network (LAN), and may be a wired network or a wireless network. The controller 41 is a computer configured to control the manufacturing apparatus 700. In the controller 41, the controlling portion 44, the display portion 45, the input-output portion 46, the storage portion 42, and the communication portion 43 are connected to one another through the system bus 48. In addition, for example, a digital camera and a drive apparatus configured to read image data or the like are connected to the controller 41 in some cases. Further, a plate-making apparatus or the like is connected to the controller 41 in some cases.

The controlling portion 44 includes, for example, a central processing unit (CPU), a random access memory (RAM), and a read only memory (ROM). The CPU calls a program stored in, for example, the recording portion or the ROM to a work memory region on the RAM and executes the program, and performs arithmetic processing and operation control to control the entire system. The ROM is a nonvolatile memory, and permanently holds a program, data, and the like. In addition, the RAM is a volatile memory, and temporarily holds a program, data, and the like.

The display portion 45 is, for example, a display apparatus including: a display device such as a CRT monitor or a liquid crystal panel; and a logic circuit (such as a video adapter) for realizing the video function of a computer in cooperation with the display device.

The input-output portion 46 performs the input and output of data. Examples of the input-output portion include a keyboard, a pointing device such as a mouse, and a ten key. An operating instruction, a movement directive, data input, maintenance, and the like can be performed on the controller 41 through such input-output portion. In addition, the portion is connected to, for example, a scanner and a drive apparatus (not shown), and transmits data input from any such external apparatus to the controlling portion 44 or outputs data to the external apparatus.

The storage portion 42 is an apparatus configured to store data, and examples thereof include a magnetic disk, a memory, and an optical disk apparatus. The program to be executed by the controlling portion 44, data necessary for the execution of the program, an operating system (OS), and the like are stored in the storage portion 42. In addition, a pattern to be recorded by the recording portion 6 of the manufacturing apparatus 700 can be stored. The communication portion 43 is a communication interface that mediates communication between the controller 41 and the network 47, and the portion includes, for example, a communication-controlling apparatus and a communication port. It should be noted that a personal computer or the like can be used instead of the controller 41.

Figure 46:
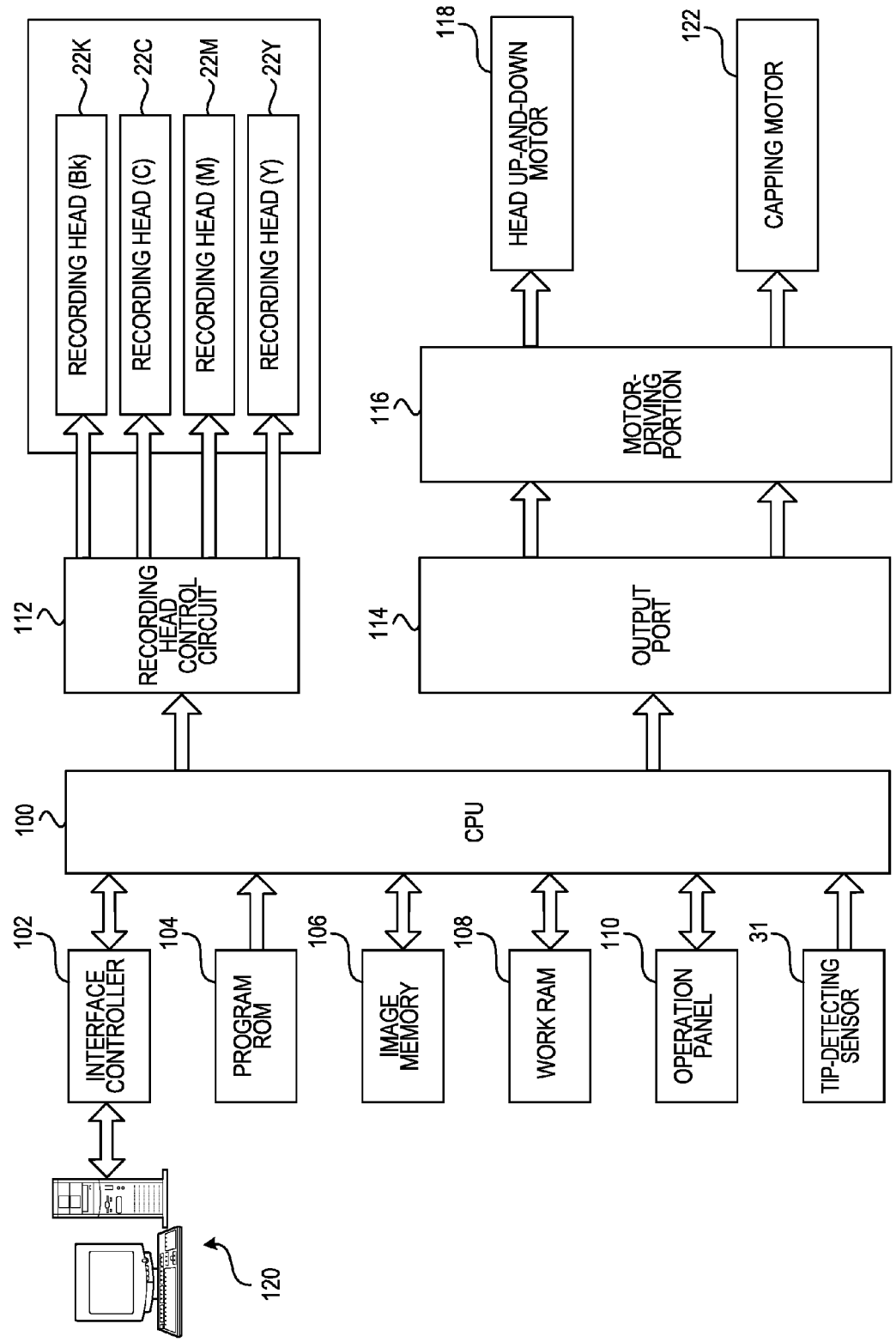
FIG. 46 is a block diagram for illustrating the construction of the control system of a recording portion illustrated in FIG. 45.

[11-1-4] Control System:

FIG. 46 is a block diagram for illustrating the construction of a control system arranged in the recording portion 6 illustrated in FIG. 44. Recorded data and a command transmitted from the host PC 120 are received by the CPU 100 through the interface controller 102. The CPU 100 is an arithmetic processing unit configured to govern general control such as the reception of the recorded data of the recording portion, a recording operation, and the handling of the rolled paper P. After having analyzed the received command, the CPU 100 develops image data on each color component of the recorded data into a bit map in the image memory 106. As operation processing before recording, the CPU 100 drives the capping motor 122 and the head up-and-down motor 118 through the output port 114 and the motor-driving portion 116. The respective recording heads 22K, 22C, 22M, and 22Y leave their capping positions (standby positions) to move to their recording positions (image-forming positions).

Subsequently, the position of the transfer material conveyed at a constant speed is detected by the sensor portion 31 (tip-detecting sensor) for determining the timing at which the ejection of an ink onto the transfer material is started (recording timing). After that, the CPU 100 sequentially reads out recorded data on the corresponding colors from the image memory 106 in synchronization with the conveyance of the transfer material, and transmits the data that has been read out to the respective recording heads 22K, 22C, 22M, and 22Y through the recording head-controlling circuit 112. Thus, ejection energy-generating elements arranged in the respective nozzles of the recording heads are driven in accordance with the recorded data, and ink droplets are ejected from the nozzles by the driven ejection energy-generating elements. The ejected ink droplets impinge on the coloring material-receiving layer (ink-receiving portion) of the transfer material at a position facing the recording heads to form dots. A desired image is formed by a set of the dots.

The operation of the CPU 100 is performed based on a processing program stored in the program ROM 104. A processing program, a table, and the like corresponding to a control flow are stored in the program ROM 104. In addition, the work RAM 108 is used as a working memory.

Figure 47:
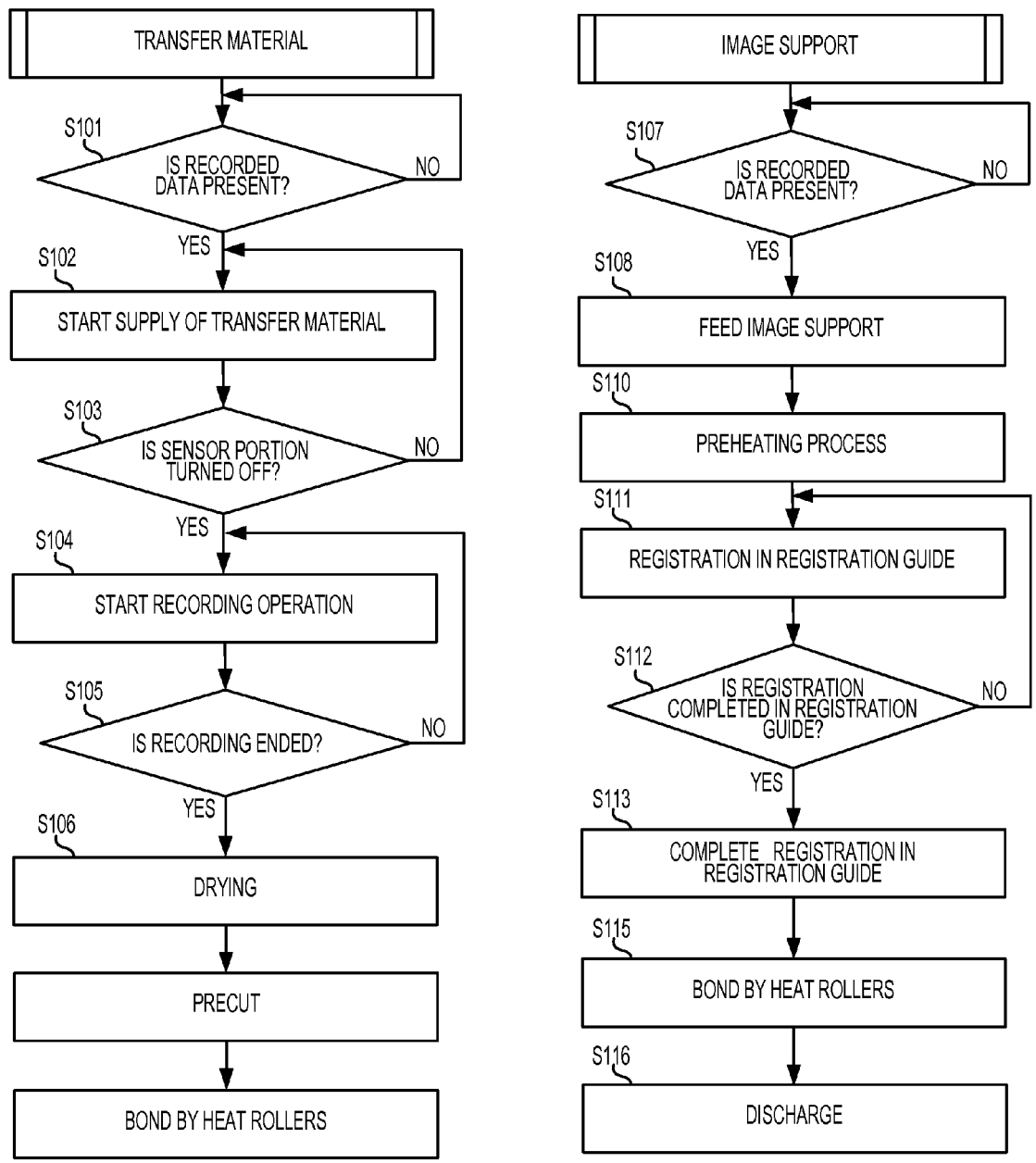
FIG. 47 is a flow chart for illustrating the operation flow of the sixth manufacturing apparatus.

[11-1-5] Operation Flow of Sixth Manufacturing Apparatus:

Next, the operation flow of the sixth manufacturing apparatus illustrated in FIG. 44 is described in accordance with the flow chart of FIG. 47. The flow chart is performed by the CPU 100 illustrated in FIG. 46.

The CPU of the recording portion judges whether or not the recorded data is transmitted by the controller through the network or the various ports (Step S101). When it is judged that the recorded data is transmitted (YES of Step S101), the CPU starts the supply of an unrecorded transfer material from the supply portion (Step S102). At this time, the sensor portion detects the portion to be detected (through-hole) subjected to the precut process in the precut process portion. When the sensor portion does not detect the portion to be detected (is turned off (YES of Step S103)), a recording operation on the transfer material by the recording portion is started (Step S104). When the recording operation ends (YES of Step S105), the drying portion performs a drying process for vaporizing excess water from the transfer material recorded by the recording portion (Step S106). The foregoing operations each use the time point when the sensor portion detects the portion to be detected as a reference, and are performed while being synchronized with each other. It should be noted that the portion to be detected that is processed in the precut process portion may be formed in a recording medium in advance.

Meanwhile, when the recorded data is transmitted to the CPU (YES of Step S107), the image support is fed from the image support-supply portion to the preheating portion (Step S108). After that, in order to improve the adhesiveness of the transfer material recorded by the recording portion with the image support, a preheating process by the preheating portion is performed (Step S110). The CPU starts the registration between the image support and the transfer material in the registration guide (Step S111), and proceeds to a subsequent step at the time point when the registration with the transfer material is completed (Step S113). At this time, determination in Step S112 becomes YES, the image support is mounted on the transfer material, and the transfer material and the image support are bonded to each other by the adhesion portion (Step S115). After that, in association with the conveyance of the resultant to the peeling portion, the base material of the transfer material is peeled with a portion precut in the precut process portion as a starting point, whereby the recorded matter (final recorded matter) is mounted on the discharge portion (Step S116). The transparent sheet adheres to the recorded matter so as to sandwich the coloring material-receiving layer, and hence the recorded matter realizes excellent image quality and has a strong fastness property.

[11-1-6] Process performed by Sixth Manufacturing Apparatus:

[11-1-6-1] Position Detection and Precut Process of Second Transfer Material:

In the portion to be detected illustrated in FIG. 44, in order to synchronize the recording medium 1 and the recording portion 6 with each other, the position of the recording medium 1 is detected and each portion is controlled based on the result of the detection. A reflection- or transmission-type optical sensor is used in marking detection.

[11-1-6-2] Precut Process:

In the manufacture of the second transfer material, after the formation of the coloring material-receiving layer, a precut process involving making a notch in part of the coloring material-receiving layer and the transparent sheet from a side closer to the coloring material-receiving layer may be performed. As a result of the precut process, after the reverse image has been recorded on the transfer material to provide a transfer material, and the transfer material and the image support have been bonded to each other, the transparent sheet can be beautifully cut with the notch as a starting point. Therefore, a strong protective layer formed of a transparent sheet having a uniform thickness can be formed, and hence sufficient durability is imparted to the reverse image formed on the coloring material-receiving layer.

Figure 48:
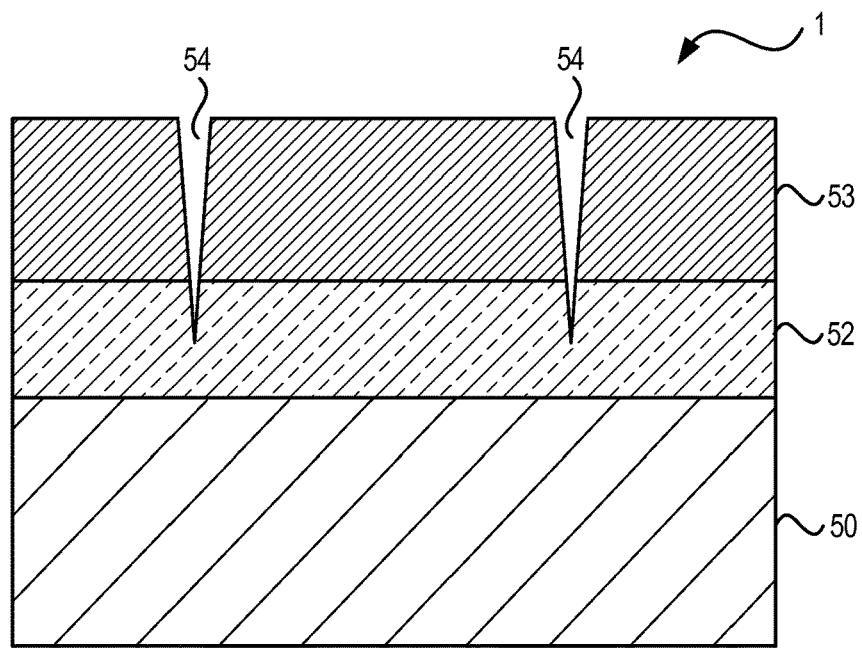
FIG. 48 is a sectional view for schematically illustrating a state in which the transfer material illustrated in FIG. 30 is subjected to a precut process.
Figure 49:
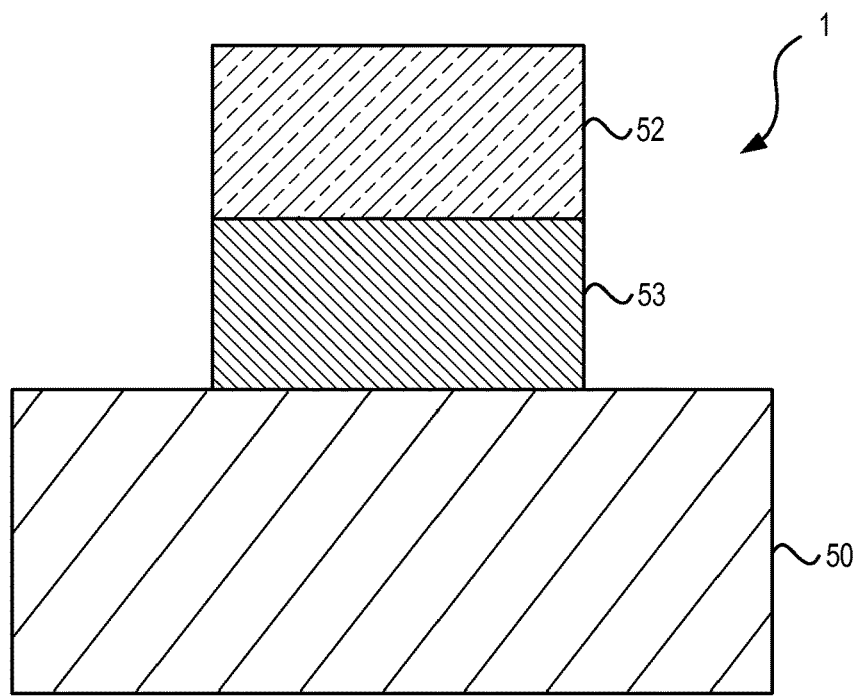
FIG. 49 is a sectional view for schematically illustrating the construction of a recorded matter obtained through the precut process.

Specifically, the second transfer material is subjected to the precut process involving forming the notches 54 in part of the coloring material-receiving layer 53 and the transparent sheet 52 as illustrated in FIG. 48 as required. Accordingly, when the transfer material 1 is allowed to adhere to the image support, the transparent sheet 52 is cut with each of the notches 54 formed by the precut process as a boundary. A portion having recorded thereon the image (image recording region) is covered with the transparent sheet 52. Sufficient durability is imparted to the image because the transparent sheet 52 functions as a strong protective layer having a uniform thickness. In addition, as illustrated in FIG. 49, upon peeling of part of the transparent sheet 52 and the coloring material-receiving layer 53 together with the base material sheet, the transparent sheet 52 is beautifully cut with the notches 54 formed by the precut process. Accordingly, the protective layer can be accurately and easily transferred onto the image.

In this case, as illustrated in FIG. 48, the notches 54 formed by the precut process are present in part of the coloring material-receiving layer 53 and the transparent sheet 52. The precut process involving forming the notches 54 is different from a cut process in the case where the releasing layer 51 is arranged, the process involving forming the notches 54 as far as the releasing layer 51 as illustrated in FIG. 50.

Figure 50:
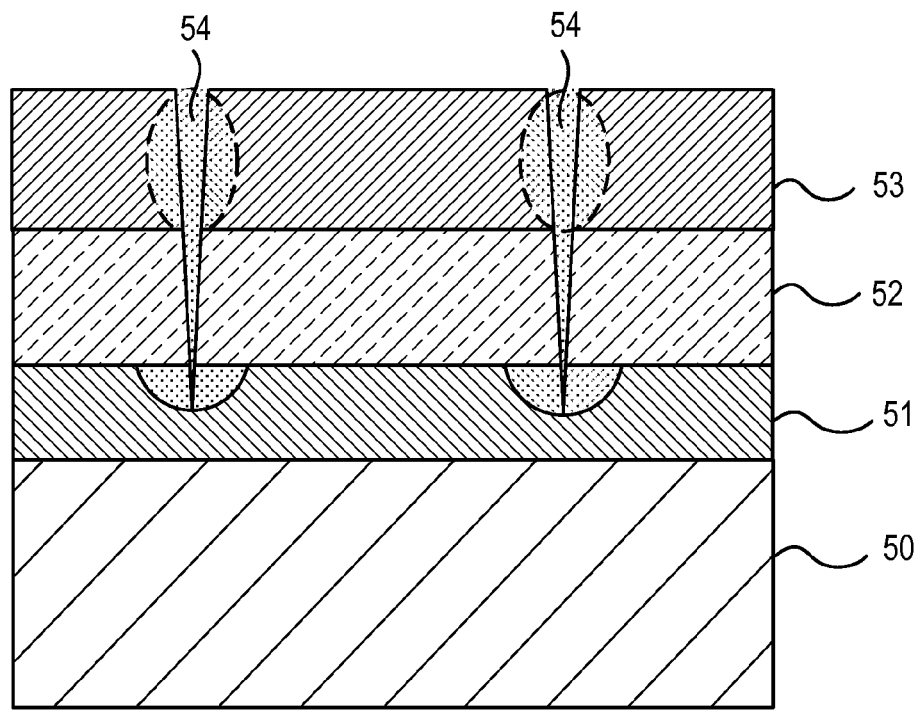
FIG. 50 is a sectional view for schematically illustrating a state in which an ink penetrates a portion subjected to a cut process of the related art.
Figure 51:
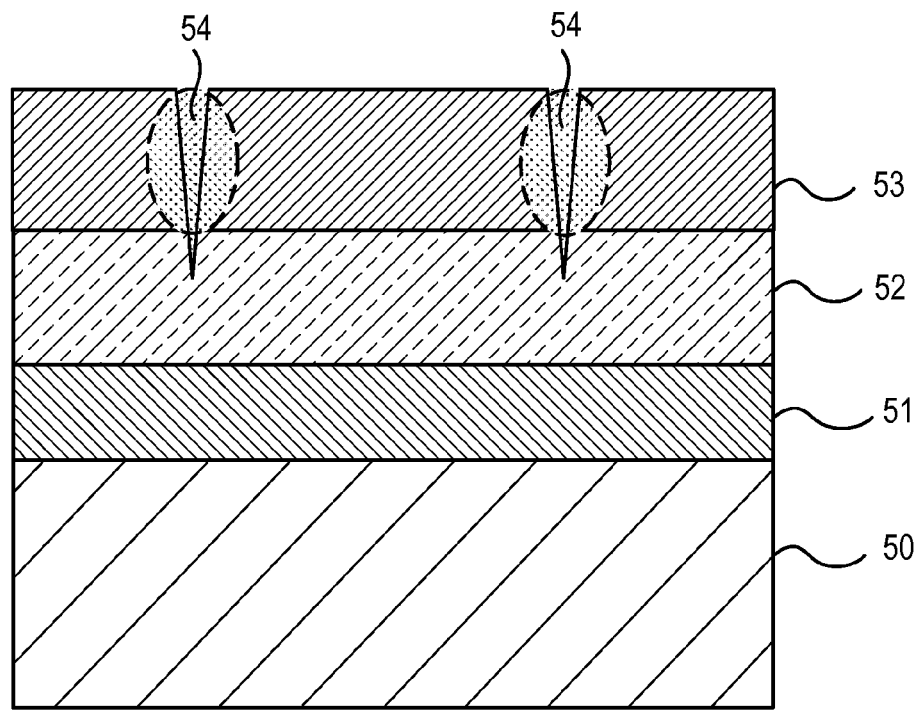
FIG. 51 is a sectional view for schematically illustrating a state in which the ink penetrates a portion subjected to a precut process.

In addition, when the cut process is performed as far as the releasing layer 51, in the sixth manufacturing apparatus configured to record an image by an inkjet system, in the case where an ink is ejected into a cut portion, the ink is absorbed in the releasing layer 51 as illustrated in FIG. 50, which causes a reduction in quality of a recorded image. In contrast, in the case where part of the coloring material-receiving layer 53 and the transparent sheet 52 are subjected to the precut process as illustrated in FIG. 51, even when recording is performed on portions corresponding to the notches 54, the ink is merely appropriately absorbed in the coloring material-receiving layer 53 and is not absorbed in the releasing layer 51, and hence a satisfactory recorded image can be obtained. Accordingly, a precut process involving forming notches in part of the coloring material-receiving layer 53 and the transparent sheet 52, or part of the coloring material-receiving layer, an anchor layer (not shown), and the transparent sheet as illustrated in FIG. 48 is preferably performed.

In the sixth manufacturing apparatus, recording by the inkjet system is performed. Accordingly, the coloring material-receiving layer needs to absorb the ink, and hence the thickness of the coloring material-receiving layer needs to be increased in order to secure absorbability. In particular, when the coloring material-receiving layer is formed so as to be of a gap absorption type, and a resin or the like having an adhesive property is not incorporated into the coloring material-receiving layer or the coating weight thereof becomes 20 $g/m^2$ or more, an image formation region casually peels from the transfer material owing to the thickness of the coloring material-receiving layer in some cases. Accordingly, a precut process is preferably performed for preventing the peeling of the image formation region.

In order to prevent image peeling, the conveyance of the transfer material in a printer before transfer is preferably performed under a state in which the transfer material does not have any curvature and is flat. Thus, the image formation portion does not casually peel from the transfer material during the running of the printer, and hence a recorded matter excellent in various kinds of durability of a transferred image can be manufactured even under a severe use condition. In addition, the transparent sheet can be accurately and easily transferred onto the image on the image support without any transfer failure.

[11-1-6-3] Recording Process:

The same recording process as that described in the section [7-1-6-6] can be used.

In the sixth manufacturing apparatus illustrated in FIG. 44, the transfer material 1 is conveyed to the recording portion 6 while being sandwiched between the grip roller 3 and the nip roller 2. The guide plate is present in the course, and the transfer material 1 passes a portion above, and is guided by, the guide plate to enter the recording portion 6. The recording portion 6 uses four recording heads of K, C, M, and Y inks as main constituent elements. The four recording heads eject the inks in accordance with image data, and eject ink droplets toward the coloring material-receiving layer arranged on the transfer material 1 to form an image.

[11-1-6-4] Water Vaporization Control:

After the manufacture of the recorded matter, when the ink remains on the surface of the receiving layer containing the ink, its adhesion to the image support becomes insufficient. There is a risk in that a heating process causes an inconvenience such as insufficient adhesiveness or partial remaining of air bubbles in the receiving layer due to abrupt vaporization of the ink component or ink remaining on the surface layer of the receiving layer. Accordingly, after the inkjet recording, drying in which an effective twist is added to the conveying path of the image support with a coloring material-receiving layer may be needed. Natural drying may be promoted as a construction including a conveying path having a sufficient length without arranging a special drying unit, such as a heater. In addition, a unit configured to control or exhaust an air flow due to the ink component, which has vaporized at that time, in the apparatus may be needed. As illustrated in FIG. 44, a reverse image recorded on the coloring material-receiving layer on the second transfer material is passed through a gap between a drying portion and a guide plate by the recording portion 6. At this time, water as a main component for the ink in the image recorded on the receiving layer and a slight amount of a volatile solvent component in the ink are vaporized by the drying portion having a vaporizing function by a heat source based on a halogen or a material equivalent thereto and wind, or a combination of the two. The air flow and an exhaust air are controlled by a fan in order to prevent an vaporized gas from, for example, undergoing dew condensation in the machine. When the air flow control is used in combination, a saturated vapor pressure on the surface of the coloring material-receiving layer is improved, and hence the drying is accelerated in some cases. At the time of the adhering step, the water content (total amount of, for example, water and a nonvolatile solvent except the coloring material) of the ink in the coloring material-receiving layer is controlled to 70% or less, more preferably 50% or less with respect to the total input amount of the ink by the water control. The case where the water of the ink remains at a content of more than 70% is not preferred because there is a risk in that an inconvenience such as insufficient adhesiveness or partial remaining of air bubbles in the coloring material-receiving layer occurs owing to abrupt vaporization of the ink component or ink remaining on the surface layer of the receiving layer, though the risk varies depending on the thickness of the coloring material-receiving layer. In addition, the total input amount of the ink can be set to a proper input amount by, for example, limiting the input amount through, for example, the thinning-down of the number of dots at the time of image formation in advance so that the water control may be appropriately performed, though the proper input amount varies depending on the ejection amount from the head.

[11-1-6-5] Adhering Step:

As illustrated in FIG. 44, the image is formed on the coloring material-receiving layer on the transfer material 1 in the recording portion 6, and then the transfer material 1 is guided to the portion above the guide plate to move to the adhesion portion 29 including the two heat rollers 21 and 22. In the adhesion portion 29, the image support 11 is placed in the form of a sheet-like sheet on the image support-supply portion 12, its position is corrected by the registration guide 14, and the image support is supplied in accordance with the conveyance of the transfer material 1. The image support 11 is fed from a lower portion of the image support-supply portion 12 in order to prevent the adhesion of dirt to the transfer surface of the image support 11 and the contamination of the image support from a rubber roll at the time of its pickup.

The transfer material 1 and the image support 11 are conveyed to a gap between the heat rollers 21 and 22 while being superimposed on each other so that the coloring material-receiving layer of the transfer material 1 having formed thereon the image and the primer layer of the image support 11 may be brought into abutment with each other, followed by the heating of the transfer material and the image support. Thus, the image support 11 and the transfer material 1 having formed thereon the image bond to each other. After that, the base material sheet is peeled from the transfer material 1. Thus, a state in which the transparent sheet adheres onto the image support 11 together with the coloring material-receiving layer having formed thereon the image is established. In other words, on the image support 11, the transparent sheet is positioned as a protective film in the uppermost layer and the image is formed below the protective film.

In addition, the temperature at the time of the transfer is set to fall within the range of the vaporization temperature of the ink or less because the occurrence of abrupt vaporization of the water in the ink at the time of the transfer causes faulty adhesion failure, or partial remaining of air bubbles in the receiving layer. The heating of the coloring material-receiving layer at the time of the transfer is performed by thermal transfer not from the side of a thick image support, such as a plastic card, but mainly from the base material sheet side of the transfer material. The maximum temperature which the coloring material-receiving layer reaches at the time of the adhering step only needs to be controlled so as not to exceed the vaporization temperature of the water as a main component of the ink. In other words, the surface temperature of each heat roller upon bonding of the transfer material 1 and the image support 11 only needs to be such a temperature that air bubbles are not formed between the transfer material 1 and the image support 11 by the vaporization of the water. In addition, when the conveying speed or the like is so high that a time period for heating with a heat source cannot be sufficiently secured, a temperature difference can occur between the heat source and the receiving portion. Accordingly, the surface temperature of the heat roller can be controlled so as to be higher than the ordinary vaporization temperature of water, specifically to from 100° C. to 180° C. In addition, heating in a closed space causes an increase in boiling point due to an increase in pressure, and hence the vaporization temperature of water increases in the coloring material-receiving layer sandwiched between the primer layer and the transparent sheet layer. Accordingly, the surface temperature can be controlled to even higher temperature in consideration of the adhesiveness and foil-cutting property.

[11-1-6-6] Preheating:

The same preheating as that described in the section [7-1-6-3] can be used.

[11-1-6-7] Decurling:

The same decurling as that described in the section [7-1-6-5] can be used. In the decurling, the curl of the image support is corrected in the decurling portion 150 as illustrated in FIG. 44.

[11-1-6-8] Peeling Process:

As illustrated in FIG. 44, the base material sheet portion of the transfer material 1 that has passed the adhesion portion 29 is rolled on the take-up roll 24 side after a region except the image-forming region has been peeled by the precut process, and the image supports 11 having formed thereon images are conveyed to the discharge portion 26 and accumulated one by one.

[11-1-6-9] Image-Reversing Apparatus:

The same image-reversing apparatus as that described in the section [5-6-9] can be used. As illustrated in FIG. 44, the recorded matter is reversed by the reversing apparatus in the image-reversing portion 152. The reversed recorded matter is fed back to the registration guide 14 in order to perform back surface printing. Simultaneously with the foregoing, the transfer material is also fed back. After the feedback, the same processes as those of front surface printing are performed in the recording portion, the adhesion portion, the decurling portion, and the peeling portion, whereby an image is formed on the back surface of the recorded matter as well.

FIG. 30 is an illustration of the construction of the recorded matter 73. As illustrated in FIG. 30, the transparent sheet 52 adheres so that the coloring material-receiving layer 53 may be sandwiched between the image support 55 and the transparent sheet 52. Thus, the recorded matter 73 brings together excellent image quality and a strong fastness property.

[11-2] Seventh Manufacturing Apparatus:

Next, a seventh construction example of the manufacturing apparatus for manufacturing the recorded matter (hereinafter sometimes referred to as "seventh manufacturing apparatus") is described.

Figure 52:
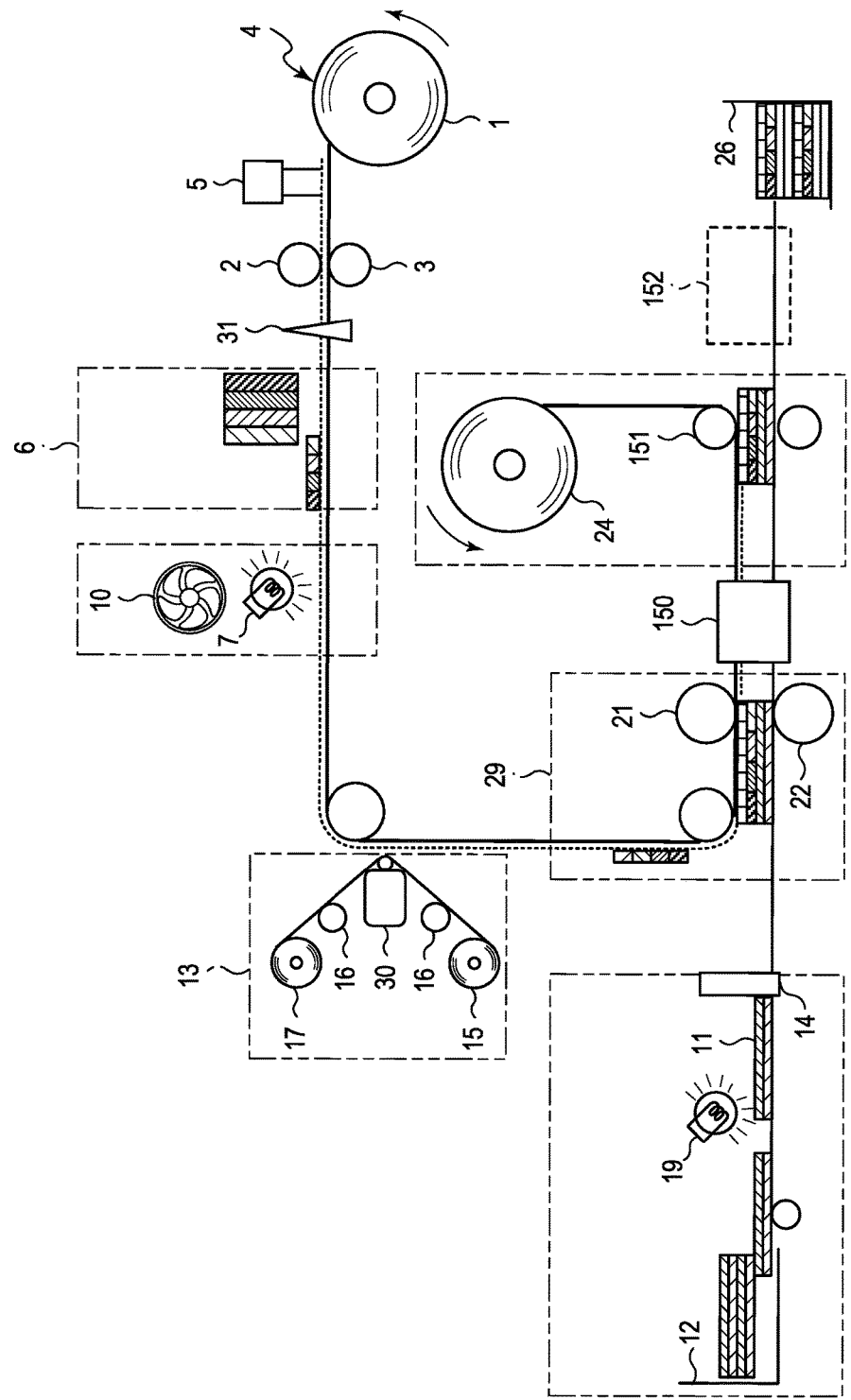
FIG. 52 is a side view for schematically illustrating an example of the construction of a seventh manufacturing apparatus for manufacturing a recorded matter.

FIG. 52 is a schematic view for illustrating the entire construction of the seventh manufacturing apparatus. The manufacturing apparatus includes: the supply portion 4 for supplying the transfer material 1 that has a roll shape and is rolled so that the coloring material-receiving layer can be arranged on its outer surface to a conveying path; and the recording portion 6 for directly ejecting an aqueous ink onto the transfer material 1 supplied to the conveying path to perform recording. Further, the seventh manufacturing apparatus includes: the drying portion 7 for vaporizing a solvent in the reverse image recorded on the transfer material 1 to improve its adhesiveness to the image support 11; the fan 10 for preventing condensation in the apparatus due to vaporized water; the transfer material 1 having recorded thereon the image by the recording portion; and the image support supply portion 12. Further, the seventh manufacturing apparatus includes, on the conveying path for the transfer material 1, the transfer portion 13 for transferring the primer layer for allowing the image support 11 positioned in the registration guide 14 to adhere to the transfer material 1. This construction is a main difference from the sixth manufacturing apparatus. The description of portions common to the sixth manufacturing apparatus is omitted because the manufacturing apparatus has the same apparatus and same control system construction as those of the sixth manufacturing apparatus.

The same construction as that described in the section [7-2] "Second Manufacturing Apparatus" can be used in the transfer of the primer layer.

[11-3] Eighth Manufacturing Apparatus:

In an eighth manufacturing apparatus, a printer portion and a transferring portion are separated from and independent of each other. The eighth manufacturing apparatus processes a transfer material into a roll shape, mounts the transfer material on a printer having a line head mounted thereon, performs printing on the transfer material, and rolls the transfer material in a roll shape. After that, the transfer material is thermally pressure-bonded (transferred) onto an image support by a known laminator based on a "roll-to-roll" process. At this time, marking printing is also performed simultaneously with the performance of the printing on the roll. At the time of the transfer, the marking printed on the roll is read with a sensor, the registration of the transfer material with the image support is automatically performed, and transfer and peeling are performed.

Figure 53:
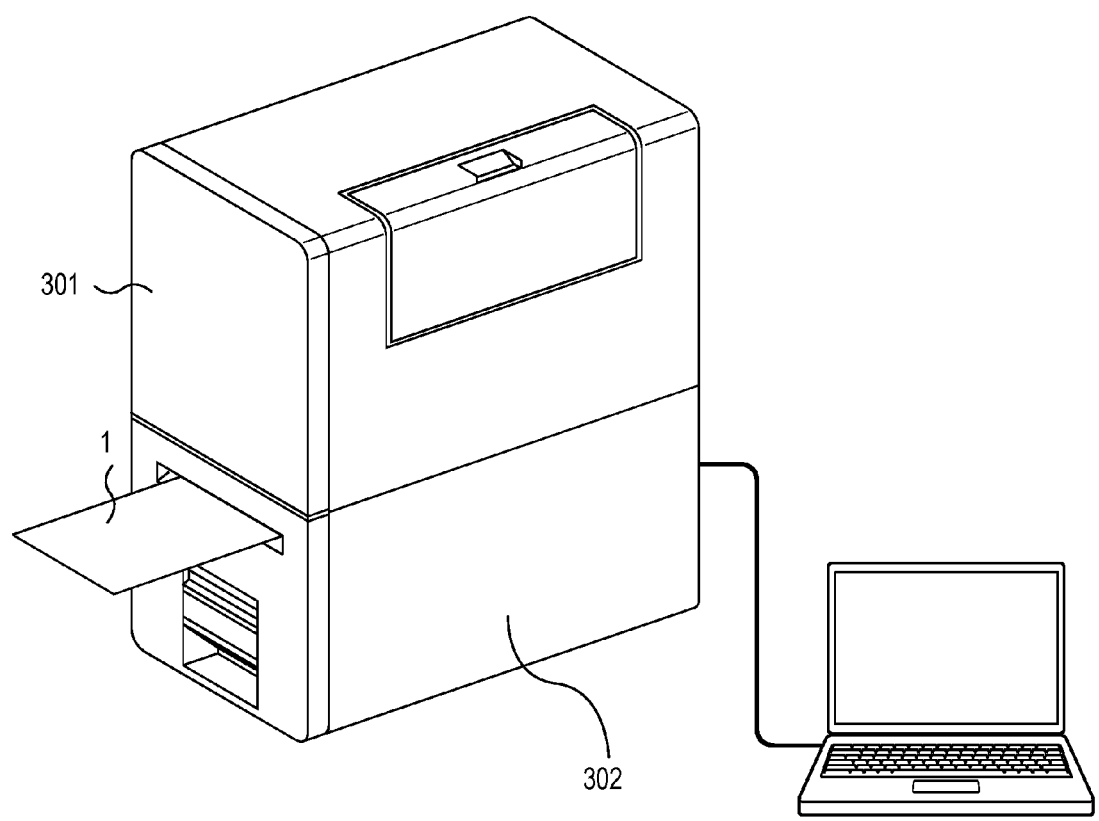
FIG. 53 is a perspective view for illustrating one example of a printer configured to perform printing on a transfer material.
Figure 54:
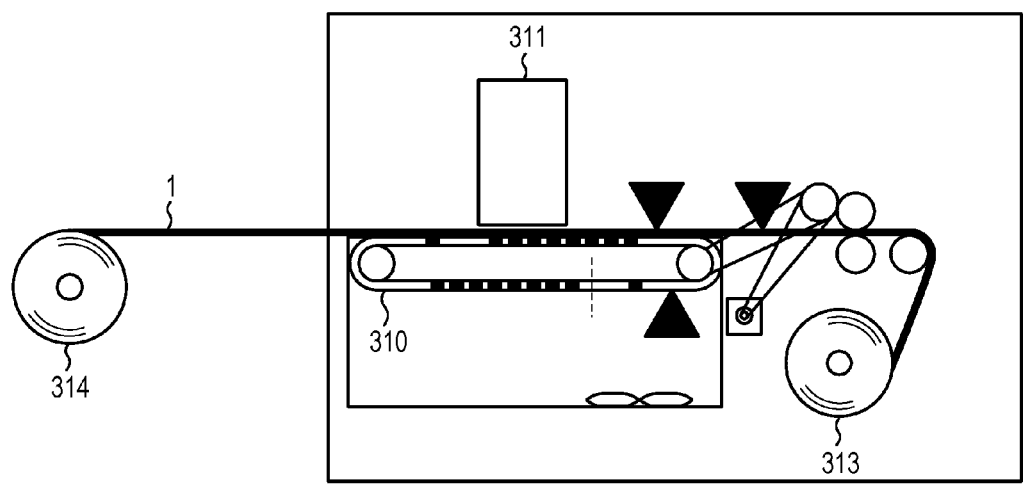
FIG. 54 is a side view for schematically illustrating the conveying mechanism of the printer that performs printing on the transfer material.
Figure 55:
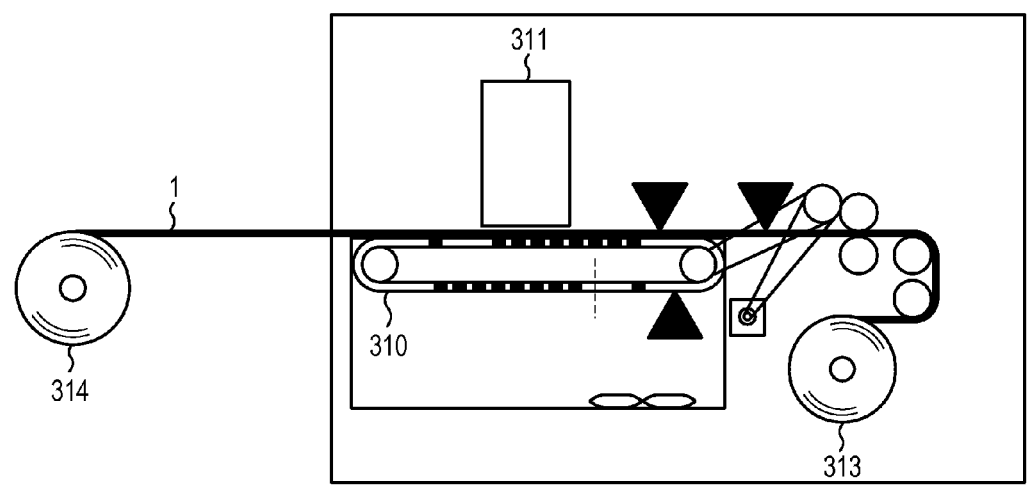
FIG. 55 is a side view for schematically illustrating one example of the conveying mechanism of the line head printer.

FIG. 53 is an illustration of a printer 301 that performs printing on the transfer material 1. FIG. 55 and FIG. 54 are each a schematic view of a conveying mechanism 302 illustrated in FIG. 53 for conveying the transfer material. First, the transfer material 1 rolled so that the coloring material-receiving layer 53 may be arranged on its outer surface as illustrated in FIG. 19 is set in a feed roll 313 illustrated in each of FIG. 55 and FIG. 54. The transfer material 1 is conveyed to the printing head 311 by a conveying belt 310, a reverse image is printed on the transfer material, and the transfer material is rolled as a printed product around a take-up roll 314.

Next, the printed transfer material roll thus obtained is set in, for example, the feed roll 201 of the laminating machine illustrated in FIG. 20. When the image support is conveyed from the supply portion 206, the transfer material that has been subjected to the printing and processed into the roll shape is conveyed from the feed roll 201 to the transferring portion 203. At this time, the sensor 208 detects the marking and performs the registration with the image support. The transfer material is conveyed to a gap between the transfer roll 204 and the image support, and is thermally pressure-bonded by the transfer roll 204. After that, a base material sheet is peeled by the peeling roll 207, whereby a recorded matter is formed. It should be noted that when an inwardly rolled roll in which the base material sheet 50 is arranged on an outer side and the coloring material-receiving layer is arranged on an inner side like the transfer material 1 illustrated in FIG. 21 is used, the printing is performed along such a conveying path as illustrated in FIG. 55. The inwardly rolled roll has a preventing effect on the adhesion of dirt to the surface of the coloring material-receiving layer.

Figure 56:
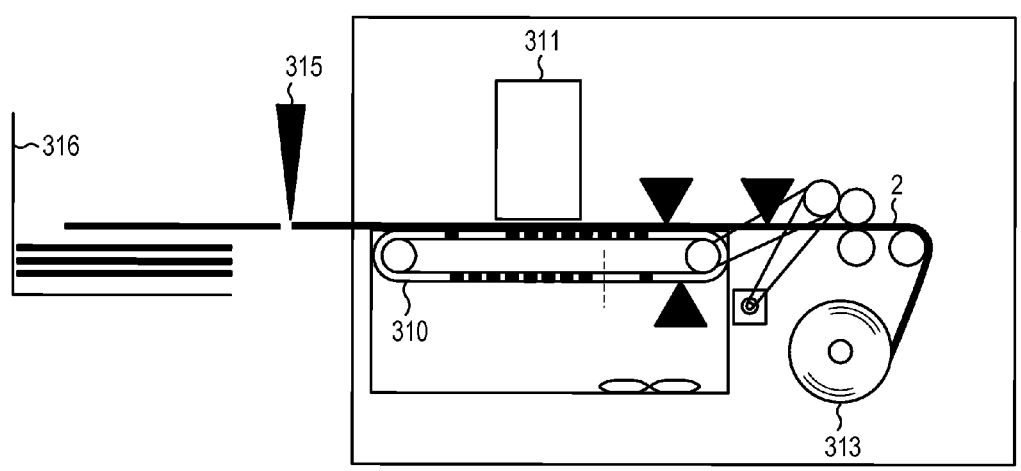
FIG. 56 is a side view for schematically illustrating another example of the conveying mechanism of the line head printer.
Figure 57:
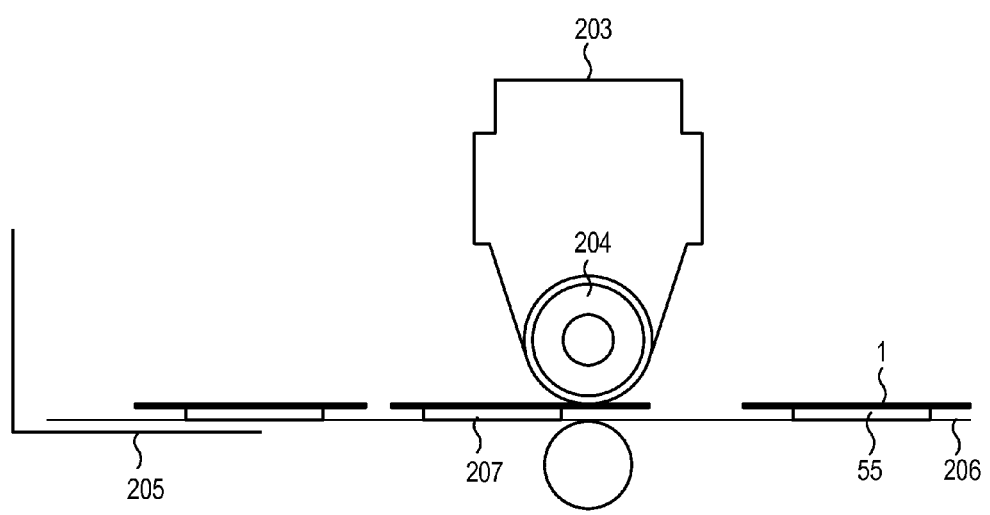
FIG. 57 is a side view for schematically illustrating another embodiment of the manufacturing apparatus configured to perform the thermal pressure bonding of the transfer material and the image support.

[11-4] Ninth Manufacturing Apparatus:

In a ninth manufacturing apparatus, a printer portion and a transferring portion are separated from and independent of each other. The ninth manufacturing apparatus processes a transfer material into a roll shape, mounts the transfer material on a printer having a line head mounted thereon, performs printing on the transfer material, and cuts the transfer material into a sheet shape. After that, the transfer material is thermally pressure-bonded (transferred) onto an image support with a known laminator while being visually observed. At this time, an attachment guide is printed simultaneously with the formation of a printed character on the roll-shaped transfer material. The image support is placed along the attachment guide while being visually observed, and is conveyed to a laminating machine, followed by the performance of a thermal pressure bonding process and a process for peeling a base material sheet. As illustrated in FIG. 56, in the manufacturing apparatus, after the printing on the transfer material 1, a cutting mechanism 315 is arranged to cut the transfer material 1 into a sheet shape and discharge the transfer material to a discharge portion 316. After that, as illustrated in FIG. 57, the sheet-shaped transfer material 1 is manually registered with the image support 55, and is then conveyed to the transfer roll 204 forming the transferring portion 203. After having been thermally pressure-bonded, the transfer material 1 and the image support 55 are discharged to the discharge portion 205, and the base material sheet is manually peeled, whereby a recorded matter is obtained.

[11-5] Tenth Manufacturing Apparatus:

In a tenth manufacturing apparatus, a printer portion and a transferring portion are separated from and independent of each other. The tenth manufacturing apparatus processes a transfer material into a cut sheet shape, mounts the transfer material on a printer having a line head mounted thereon, and performs printing on the transfer material. After that, the transfer material is transferred with a known laminator. At this time, an attachment guide is printed simultaneously with the formation of a printed character on the coloring material transfer member having a cut sheet shape. The image support is placed along the attachment guide while being visually observed, and is conveyed to a laminating machine, followed by the performance of thermal pressure bonding and a process for peeling a base material sheet.

FIG. 23 is an illustration of the printer 401 that performs printing on the transfer material 1, and FIG. 25 is an illustration of a conveying mechanism for conveying the transfer material 1. First, the transfer material 1 is set in the supply portion. The transfer material 1 is conveyed to the printing head 311 by the conveying belt 410, a reverse image is printed on the transfer material, and the transfer material is discharged as a printed product by the discharge portion 414. Next, the printed transfer material and the image support are thermally pressure-bonded with a laminating machine illustrated in FIG. 26, and the base material sheet is manually peeled, whereby a recorded matter is formed.

[11-6] Eleventh Manufacturing Apparatus:

In an eleventh manufacturing apparatus, a printer portion and a transferring portion are separated from and independent of each other. The eleventh manufacturing apparatus processes a transfer material into a cut sheet shape, mounts the transfer material on a printer having a serial head mounted thereon, and performs printing on the transfer material. After that, the transfer material is transferred with a known laminator. When a serial-type inkjet printer is used, in an integrated apparatus like the sixth manufacturing apparatus illustrated in FIG. 52, the head may cause a speed difference between the printer portion and the transferring portion. Accordingly, a sagging portion configured to absorb and regulate the speed difference needs to be arranged. Therefore, a separation type in which the printer portion and the transferring portion are independent of each other is preferably used because processes in the printer portion and the transferring portion can be performed at their respective optimum speeds. It should be noted that upon printing, an attachment guide is printed simultaneously with the printing on the transfer material having a cut sheet shape. The image support is placed along the attachment guide while being visually observed, and is conveyed to a laminating machine, followed by the performance of the thermal pressure bonding of the transfer material and the image support, and a process for peeling a base material sheet.

FIG. 27 is an illustration of the serial printer 501 configured to perform printing on the transfer material 1, and the transfer material 1 is set in the supply portion 513. The transfer material 1 is conveyed to the printing head 502 by the conveying roll 510, a reverse image is printed on the transfer material, and a printed product is discharged. At this time, the transfer materials 1 are sequentially conveyed while the printing head 502 is caused to move and scan relative to a recording surface. The printing head 502 is fixed to the shaft 503, and scans the transfer material 1 to be conveyed in a direction perpendicular thereto (a or b in the figure). The image recording is performed through the ejection of an ink from the nozzle 511 illustrated in FIG. 28. Next, the printed transfer material and the image support are thermally pressure-bonded with the laminating machine illustrated in FIG. 26, and the base material sheet is manually peeled, whereby a recorded matter is formed.

As described above, according to the sixth to eleventh manufacturing apparatus, in a mode in which a second transfer material includes at least a transparent sheet and a coloring material-receiving layer on a base material sheet, the control of the ink water content of the coloring material-receiving layer and temperature control at the time of adhesion are performed in the step of adhering the transfer material to an image support. Thus, the adhesiveness between the transparent sheet forming of the transfer material and the image support is improved, and hence a recorded matter excellent in various kinds of durability, such as weatherability, water resistance, chemical resistance, and gas resistance, can be provided.

EXAMPLES

The present invention is hereinafter more specifically described by way of Examples and Comparative Examples. However, the present invention is not limited to only the constructions of Examples below. It should be noted that "part(s)" and "%" in the following description refer to "part(s) by mass" and "mass %", respectively, unless otherwise stated.

Example 1

A transfer material including a gap absorption-type coloring material-receiving layer and a recorded matter were manufactured by the following method.

[Preparation of Hydrated Alumina Dispersion Liquid]

20 Parts of a hydrated alumina A having a boehmite structure (pseudoboehmite structure) (trade name: "Disperal HP14," manufactured by Sasol) was added to pure water, and 0.4 part of acetic acid was further added to perform a peptization process. Thus, a hydrated alumina dispersion liquid was obtained. The average particle diameter of hydrated alumina fine particles in the hydrated alumina dispersion liquid was 140 nm. Next, 0.3 part of boric acid was added to the dispersion liquid to provide a boric acid-added hydrated alumina dispersion liquid.

[Preparation of Aqueous Solution of Polyvinyl Alcohol]

Separately from the foregoing, polyvinyl alcohol (trade name: "PVA235," manufactured by KURARAY Co., Ltd.) was dissolved in ion-exchanged water to prepare an aqueous solution of the polyvinyl alcohol having a solid matter content of 8%. It should be noted that the polyvinyl alcohol had a weight-average polymerization degree of 3,500, a saponification degree of from 87 mol % to 89 mol %, and a SP value of 9.4.

[Preparation of Coating Liquid for Forming Coloring Material-Receiving Layer]

27.8 Parts of an aqueous solution of polyvinyl alcohol was added to 100 parts of a boric acid-added hydrated alumina dispersion liquid. Further, 3.0 parts of polyallylamine as a cationic resin was added to the mixture, and the contents were mixed with a static mixer to provide a coating liquid for forming a coloring material-receiving layer. A polyallylamine having a melting point of 83.3° C. and an average molecular weight of 1,000 (trade name: "PAA-01", manufactured by Nitto Boseki Co., Ltd.) was used as the polyallylamine.

[Manufacture of First Transfer Material]

Immediately after the mixing, the coating liquid was applied to the surface of a base material sheet and dried. Thus, a transfer material of Example 1 including a gap absorption-type coloring material-receiving layer was manufactured. The coating liquid was applied with a die coater at an application speed of 5 m/min so that its coating weight after the drying became 15 g/m$^2$. A drying temperature was set to 60° C. The transfer material was turned into a roll-shaped transfer material by being rolled into a roll shape in which the coloring material-receiving layer was arranged on an outer side and the base material sheet was arranged on an inner side. It should be noted that a sheet made of a PET and having a thickness of 30 μm (trade name: "Teijin Tetoron Film", manufactured by Teijin Limited) was used as the base material sheet. The thickness of the coloring material-receiving layer was 15 μm. At this time, a difference SP1 between the SP value of the base material sheet of the transfer material and the SP value of the coloring material-receiving layer thereof was 1.3.

The resultant transfer material was thermally pressure-bonded onto an image support with the first manufacturing apparatus (manufacturing apparatus illustrated in FIG. 12). After that, the base material sheet was peeled. Thus, an image support with a coloring material-receiving layer of Example 1 was obtained. A card made of vinyl chloride (trade name: "C-4002", manufactured by Evolis) was used as the image support. The thermal pressure bonding was performed under the conditions of a temperature of 160° C., a pressure of 3.9 kg/cm, and a conveying speed of 50 mm/sec. A peeling angle upon peeling of the base material sheet was set to 90°. A difference SP2 between the SP value of the coloring material-receiving layer and the SP value of the image support was 0.2.

60 Percent solid printing was performed on the resultant image support with a coloring material-receiving layer with a pigment ink by using the first manufacturing apparatus (manufacturing apparatus illustrated in FIG. 12). Thus, a recorded matter of Example 1 was obtained. A method of preparing the pigment ink is described later. A print module mounted with a line head (trade name: "PM-200Z", manufactured by Canon Finetech Inc.) was used as the recording portion 6 of the manufacturing apparatus illustrated in FIG. 12.

[Preparation of Pigment Ink]
<Synthesis of (Meth)Acrylate-Based Copolymer>

Synthesis Example 1

1,000 Parts of methyl ethyl ketone was loaded into a reaction vessel provided with a stirring apparatus, a dropping apparatus, a temperature sensor, and a reflux apparatus including a nitrogen-introducing apparatus in an upper portion thereof, and the reaction vessel was purged with nitrogen while the methyl ethyl ketone was stirred. While a nitrogen atmosphere in the reaction vessel was maintained, a temperature in the vessel was increased to 80° C. After that, a mixed liquid obtained by mixing 63 parts of 2-hydroxyethyl methacrylate, 141 parts of methacrylic acid, 417 parts of styrene, 188 parts of benzyl methacrylate, 25 parts of glycidyl methacrylate, 33 parts of a polymerization degree adjustor (trade name: "BLEMMER TGL", manufactured by Nippon Oil & Fats Co., Ltd.), and 67 parts of t-butyl peroxy-2-ethylhexanoate was dropped from the dropping apparatus over 4 hours. After the completion of the dropping, a reaction was further continued at the temperature for 10 hours to provide a solution (resin content: 45.4%) of a (meth)acrylate-based copolymer (A-1) having an acid value of 110 mgKOH/g, a glass transition point (Tg) of 89° C., and a weight-average molecular weight of 8,000.

<Aqueous Pigment Dispersion Preparation 1>

1,000 Parts of a phthalocyanine-based blue pigment, the solution of the (meth)acrylate-based copolymer (A-1) obtained in Synthesis Example 1, a 25% aqueous solution of potassium hydroxide, and water were loaded into a mixing tank having a cooling function, and were stirred and mixed to provide a mixed liquid. It should be noted that the (meth)acrylate-based copolymer (A-1) was used in such an amount that its ratio with respect to the phthalocyanine-based blue pigment became 40% in terms of a nonvolatile content. In addition, the 25% aqueous solution of potassium hydroxide was used in an amount by which 100% of the (meth)acrylate-based copolymer (A-1) was neutralized. Further, water was used in an amount by which the nonvolatile content of the mixed liquid to be obtained was set to 27%. The resultant mixed liquid was passed through a dispersing apparatus filled with zirconia beads each having a diameter of 0.3 mm, and was dispersed for 4 hours by a circulation system. It should be noted that the temperature of the dispersion liquid was held at 40° C. or less.

After the dispersion liquid had been taken out from the mixing tank, a flow channel between the mixing tank and the dispersing apparatus was washed with 10,000 parts of water, and the washing liquid and the dispersion liquid were mixed to provide a diluted dispersion liquid. The resultant diluted dispersion liquid was loaded into a distilling apparatus, and the total amount of methyl ethyl ketone and part of water were removed by distillation. Thus, a concentrated dispersion liquid was obtained. While the concentrated dispersion liquid left standing to cool to room temperature was stirred, 2% hydrochloric acid was dropped to the dispersion liquid to adjust its pH to 4.5. After that, the solid matter of the resultant was filtered out with a Nutsche-type filtering apparatus and washed with water. The resultant solid matter (cake) was loaded into a container and water was added. After that, the mixture was redispersed with a dispersion stirring machine and the pH of the resultant was adjusted to 9.5 with a 25% aqueous solution of potassium hydroxide. After that, coarse particles were removed with a centrifugal separator at 6,000 G over 30 minutes, and then the nonvolatile content of the remainder was adjusted. Thus, an aqueous cyan pigment dispersion (pigment content: 14%, acid value: 110) was obtained.

An aqueous black pigment dispersion, an aqueous magenta pigment dispersion, or an aqueous yellow pigment dispersion was obtained in the same manner as in the aqueous cyan pigment dispersion except that the phthalocyanine-based blue pigment was changed to a carbon black-based black pigment, a quinacridone-based magenta pigment, or a diazo-based yellow pigment.

<Preparation of Ink>

An aqueous pigment dispersion and respective components shown in Table 2 were loaded into a container so as to achieve composition shown in Table 2 (total: 100 parts), and were stirred with a propeller stirring machine for 30 minutes or more. After that, the mixture was filtered with a filter having a pore diameter of 0.2 μm (manufactured by Nihon Pall Ltd.) to prepare a pigment ink. It should be noted that the term "AE-100" in Table 2 represents an adduct of acetylene glycol with 10 mol of ethylene oxide (trade name: "Acetylenol E100", manufactured by Kawaken Fine Chemicals Co., Ltd.).

TABLE 2

|  | Bk | C | M | Y |
| --- | --- | --- | --- | --- |
| Acid value (mgKOH/g) | 110 | 110 | 110 | 110 |
| Pigment (part(s)) | 2.5 | 2.5 | 2.5 | 2.5 |
| Glycerin (part(s)) | 7 | 7 | 7 | 7 |
| Triethylene glycol (part(s)) | 5 | 5 | 5 | 5 |
| Ethylene urea (part(s)) | 12 | 12 | 12 | 12 |
| AE-100 (part(s)) | 0.5 | 0.5 | 0.5 | 0.5 |
| Pure water (part(s)) | Balance | Balance | Balance | Balance |

Example 2

A transfer material, an image support with a coloring material-receiving layer, and a recorded matter were obtained in the same manner as in Example 1 except that the image support was changed to a card made of PET-G (trade name: "PET-G CARD", manufactured by Taihei Chemicals Limited).

Example 3

A transfer material, an image support with a coloring material-receiving layer, and a recorded matter were obtained in the same manner as in Example 1 except that the image support was changed to a card made of an acrylic resin.

Example 4

A transfer material, an image support with a coloring material-receiving layer, and a recorded matter were obtained in the same manner as in Example 1 except that the amount of the aqueous solution of polyvinyl alcohol to be added to the coating liquid for forming the coloring material-receiving layer was changed to 35.7 parts.

Example 5

A transfer material, an image support with a coloring material-receiving layer, and a recorded matter were obtained in the same manner as in Example 1 except that the cationic resin to be used in the preparation of the coloring material-receiving layer was changed to diallylamine (trade name: "PAS-01 DIALLYLAMINE", melting point: −80° C., average molecular weight: 1,600, manufactured by Nitto Boseki Co., Ltd.).

Example 6

A transfer material, an image support with a coloring material-receiving layer, and a recorded matter were obtained in the same manner as in Example 1 except that the cationic resin to be used in the preparation of the coloring material-receiving layer was changed to a cationic urethane resin (trade name: "CP-7050 cationic urethane resin", melting point: 190° C., manufactured by DIC Incorporated).

Example 7

A transfer material, an image support with a coloring material-receiving layer, and a recorded matter were obtained in the same manner as in Example 1 except that the cationic resin to be used in the preparation of the coloring material-receiving layer was changed to another polyallylamine (trade name: "PAA-05", average molecular weight: 5,000, manufactured by Nitto Boseki Co., Ltd.).

Example 8

A transfer material, an image support with a coloring material-receiving layer, and a recorded matter were obtained in the same manner as in Example 1 except that the cationic resin to be used in the preparation of the coloring material-receiving layer was changed to another polyallylamine (trade name: "PAA-08", average molecular weight: 8,000, manufactured by Nitto Boseki Co., Ltd.).

Example 9

A transfer material, an image support with a coloring material-receiving layer, and a recorded matter were obtained in the same manner as in Example 1 except that the cationic resin to be used in the preparation of the coloring material-receiving layer was changed to another polyallylamine (trade name: "PAA-15", average molecular weight: 15,000, manufactured by Nitto Boseki Co., Ltd.).

Example 10

A transfer material, an image support with a coloring material-receiving layer, and a recorded matter were obtained in the same manner as in Example 1 except that the temperature at which the transfer material was thermally pressure-bonded onto the image support was changed to 120° C.

Example 11

A transfer material, an image support with a coloring material-receiving layer, and a recorded matter were obtained in the same manner as in Example 1 except that the temperature at which the transfer material was thermally pressure-bonded onto the image support was changed to 180° C.

Example 12

A transfer material, an image support with a coloring material-receiving layer, and a recorded matter were obtained in the same manner as in Example 1 except that the temperature at which the transfer material was thermally pressure-bonded onto the image support was changed to 110° C.

Example 13

A transfer material, an image support with a coloring material-receiving layer, and a recorded matter were obtained in the same manner as in Example 1 except that the temperature at which the transfer material was thermally pressure-bonded onto the image support was changed to 190° C. It should be noted that the pore volume of the coloring material-receiving layer that had been thermally pressure-bonded onto the image support was 28 ml/m$^2$.

Example 14

A transfer material, an image support with a coloring material-receiving layer, and a recorded matter were obtained in the same manner as in Example 1 except that: the transfer material was changed to a transfer material processed into a cut sheet shape; the coloring material was changed to an aqueous ink; and the apparatus for manufacturing the recorded matter was changed to the fourth manufacturing apparatus illustrated in each of FIG. 23 and FIG. 25. The image support and the transfer material were thermally pressure-bonded with a laminating machine (trade name: "LPD3223 CLIVIA", manufactured by FUJITEX Corporation). A line head-mounted card printer (trade name "CXG-2400", manufactured by Canon Finetech Inc.) was used as an image-recording apparatus. A dye ink available under the trade name "BJI_P211 (Bk, C, M, Y)" (manufactured by Canon Finetech Inc.) were used as the dye ink.

Example 15

A transfer material, an image support with a coloring material-receiving layer, and a recorded matter were obtained in the same manner as in Example 1 except that: the transfer material was processed into a cut sheet shape; the thickness of the base material sheet of the transfer material was changed to 100 μm; the thickness of the coloring material-receiving layer was changed to 20 μm; and the apparatus for manufacturing the recorded matter was changed to the fourth manufacturing apparatus illustrated in each of FIG. 23 and FIG. 25. The image support and the transfer material were thermally pressure-bonded with a laminating machine (trade name: "LPD3223 CLIVIA", manufactured by FUJITEX Corporation). In addition, image recording was performed by using, as an image-recording apparatus, a line head-mounted card printer (trade name: "CXG-2400", manufactured by Canon Finetech Inc.) in which the pigment ink used in Example 1 had been mounted.

Example 16

A transfer material, an image support with a coloring material-receiving layer, and a recorded matter were obtained in the same manner as in Example 1 except that: the transfer material 1 was processed into a roll shape; the thickness of the base material sheet was changed to 15 µm; the thickness of the coloring material-receiving layer was changed to 10 µm; and the manufacturing apparatus was changed to the third manufacturing apparatus illustrated in each of FIG. 20 and FIG. 23 in the manufacture of the recorded matter. The image support and the transfer material were thermally pressure-bonded with a DC-10 laminating machine (manufactured by Dynic Corporation) capable of conveying the transfer material by a roll-to-roll process. In addition, image recording was performed by using, as an image-recording apparatus, a line head-mounted card printer (trade name: "CXG-2400", manufactured by Canon Finetech Inc.) in which the pigment ink used in Example 1 had been mounted.

Example 17

A transfer material, an image support with a coloring material-receiving layer, and a recorded matter were obtained in the same manner as in Example 1 except that: the transfer material 1 was processed into a cut sheet shape; the thickness of the base material sheet was changed to 120 µm; the thickness of the coloring material-receiving layer was changed to 20 µm; and the manufacturing apparatus illustrated in each of FIG. 26 and FIG. 27 was used in the manufacture of the recorded matter. The image support and the transfer material were thermally pressure-bonded with a laminating machine (LPD3223 CLIVIA manufactured by FUJITEX Corporation). In addition, image recording was performed by using, as an image-recording apparatus, (PIXUS Pro9500) manufactured by Canon Inc.

Example 18

A transfer material, an image support with a coloring material-receiving layer, and a recorded matter were obtained in the same manner as in Example 1 except that: the transfer material 1 was processed into a roll shape; the thickness of the base material sheet of the transfer material was changed to 10 µm; the thickness of the coloring material-receiving layer was changed to 10 µm; and the fourth manufacturing apparatus illustrated in each of FIG. 20 and FIG. 23 was used in the manufacture of the recorded matter. The image support and the transfer material were thermally pressure-bonded with a DC-10 laminating machine (manufactured by Dynic Corporation) capable of conveying the transfer material by a roll-to-roll process. In addition, image recording was performed by using, as an image-recording apparatus, a line head-mounted card printer (trade name: "CXG-2400", manufactured by Canon Finetech Inc.) in which the pigment ink used in Example 1 had been mounted.

Example 19

A transfer material, an image support with a coloring material-receiving layer, and a recorded matter were obtained in the same manner as in Example 1 except that: the manufacturing apparatus illustrated in FIG. 18 was used; the surface of the transfer material was treated with a urethane-based primer resin after the printing of the image; and the material for the image support was changed to a PET (trade name: "WHITE PET CARD C-0002", manufactured by Goudou Giken).

Example 20

A transfer material, an image support with a coloring material-receiving layer, and a recorded matter were obtained in the same manner as in Example 1 except that: the surface of the transfer material was treated with a urethane-based primer resin after the printing of the image with the manufacturing apparatus illustrated in FIG. 18; and the material for the image support was changed to POM.

Comparative Example 1

A transfer material, an image support with a coloring material-receiving layer, and a recorded matter were obtained in the same manner as in Example 1 except that the cationic resin to be used in the preparation of the coloring material-receiving layer was not added.

Comparative Example 2

A transfer material, an image support with a coloring material-receiving layer, and a recorded matter were obtained in the same manner as in Example 1 except that the image support was changed to a card made of PET (trade name: "WHITE PET CARD C-0002", manufactured by Goudou Giken).

Comparative Example 3

A transfer material, an image support with a coloring material-receiving layer, and a recorded matter were obtained in the same manner as in Example 1 except that the image support was changed to a card made of POM.

Example 21

Manufacture of Second Transfer Material

Immediately after the mixing, the coating liquid was applied to the surface of a transparent sheet in a laminated sheet (laminated sheet of a base material sheet and the transparent sheet), and was dried. Thus, a transfer material of Example 21 including a gap absorption-type coloring material-receiving layer was manufactured. The coating liquid was applied with a die coater at an application speed of 5 m/min so that its coating weight after the drying became 15 g/m². A drying temperature was set to 60° C. The transfer material was turned into a roll-shaped transfer material by being rolled into a roll shape in which the coloring material-receiving layer was arranged on an outer side and the base material sheet was arranged on an inner side. It should be noted that a laminated sheet of a base material sheet having a thickness of 30 µm and a transparent sheet (trade name: "DCR-320", manufactured by Dynic Corporation) was used as the laminated sheet. The thickness of the coloring material-receiving layer was 15 µm. At this time, a difference SP1 between the SP value of the base material sheet of the transfer material and the SP value of the transparent sheet thereof was 1.4.

60 Percent solid printing was performed on the resultant transfer material with a pigment ink by using the sixth manufacturing apparatus (manufacturing apparatus 700 illustrated in FIG. 44). The transfer material was thermally pressure-bonded onto an image support, and then the base material sheet was peeled. Thus, a recorded matter of Example 21 was obtained. The same pigment ink as that of Example 1 was used. The manufacturing apparatus illustrated in FIG. 44 was used and a line head-mounted print module (trade name: "PM-200Z", manufactured by Canon Finetech Inc.) was used as its recording portion 6. A card made of vinyl chloride (trade name: "C-4002", manufactured by Evolis) was used as the image support. The thermal pressure bonding was performed under the conditions of a temperature of 160° C., a pressure of 3.9 kg/cm, and a conveying speed of 50 mm/sec. A peeling angle upon peeling of the base material sheet was set to 90°. A difference SP2 between the SP value of the coloring material-receiving layer and the SP value of the image support was 0.1.

Example 22

A transfer material and a recorded matter were obtained in the same manner as in Example 21 except that the image support was changed to a card made of PET-G (trade name: "PET-G CARD", manufactured by Taihei Chemicals Limited).

Example 23

A transfer material and a recorded matter were obtained in the same manner as in Example 21 except that the image support was changed to a card made of an acrylic resin.

Example 24

A transfer material and a recorded matter were obtained in the same manner as in Example 21 except that the cationic resin to be used in the preparation of the coloring material-receiving layer was changed to diallylamine (trade name: "PAS-01 DIALLYLAMINE", melting point: −80° C., average molecular weight: 1,600, manufactured by Nitto Boseki Co., Ltd.).

Example 25

A transfer material and a recorded matter were obtained in the same manner as in Example 21 except that the cationic resin to be used in the preparation of the coloring material-receiving layer was changed to a cationic urethane resin (trade name: "CP-7050 cationic urethane resin", melting point: 190° C., manufactured by DIC Corporation).

Example 26

A transfer material and a recorded matter were obtained in the same manner as in Example 21 except that the cationic resin to be used in the preparation of the coloring material-receiving layer was changed to another polyallylamine (trade name: "PAA-05", average molecular weight: 5,000, manufactured by Nitto Boseki Co., Ltd.).

Example 27

A transfer material and a recorded matter were obtained in the same manner as in Example 21 except that the cationic resin to be used in the preparation of the coloring material-receiving layer was changed to another polyallylamine (trade name: "PAA-08", average molecular weight: 8,000, manufactured by Nitto Boseki Co., Ltd.).

Example 28

A transfer material and a recorded matter were obtained in the same manner as in Example 21 except that the cationic resin to be used in the preparation of the coloring material-receiving layer was changed to another polyallylamine (trade name: "PAA-15", average molecular weight: 15,000, manufactured by Nitto Boseki Co., Ltd.).

Example 29

A transfer material and a recorded matter were obtained in the same manner as in Example 21 except that the temperature at which the transfer material was thermally pressure-bonded onto the image support was changed to 120° C.

Example 30

A transfer material and a recorded matter were obtained in the same manner as in Example 21 except that the temperature at which the transfer material was thermally pressure-bonded onto the image support was changed to 180° C.

Example 31

A transfer material and a recorded matter were obtained in the same manner as in Example 21 except that the temperature at which the transfer material was thermally pressure-bonded onto the image support was changed to 110° C.

Example 32

A transfer material and a recorded matter were obtained in the same manner as in Example 21 except that the temperature at which the transfer material was thermally pressure-bonded onto the image support was changed to 190° C.

Example 33

A transfer material and a recorded matter were obtained in the same manner as in Example 21 except that: the transfer material was changed to a transfer material processed into a cut sheet shape; the coloring material was changed to an aqueous ink; and the apparatus for manufacturing the recorded matter was changed to the tenth manufacturing apparatus illustrated in each of FIG. 25 and FIG. 23. A line head-mounted card printer (trade name: "CXG-2400", manufactured by Canon Finetech Inc.) was used as an image-recording apparatus. An ink available under the trade name "BJI_P211 (Bk, C, M, Y)" (manufactured by Canon Finetech Inc.) was used as the dye ink. The image support and the transfer material were thermally pressure-bonded with a laminating machine (trade name: "LPD3223 CLIVIA", manufactured by FUJITEX Corporation).

Example 34

A transfer material and a recorded matter were obtained in the same manner as in Example 21 except that: the transfer material was processed into a cut sheet shape; the thickness of the base material sheet of the transfer material was changed to 100 μm; the thickness of the coloring material-receiving layer was changed to 20 μm; and the apparatus for manufacturing the recorded matter was changed to the tenth manufacturing apparatus illustrated in each of FIG. 25 and FIG. 23. It should be noted that the printing on the transfer material was performed by using a line head-mounted card printer (trade name: "CXG-2400", manufactured by Canon Finetech Inc.) in which the pigment ink used in Example 1 had been mounted. The image support and the transfer material were thermally pressure-bonded with a laminating machine (trade name: "LPD3223 CLIVIA", manufactured by FUJITEX Corporation).

Example 35

A transfer material and a recorded matter were obtained in the same manner as in Example 21 except that: the transfer material 1 was processed into a roll shape; the thickness of the base material sheet was changed to 15 µm; the thickness of the coloring material-receiving layer was changed to 10 µm; and the manufacturing apparatus was changed to the ninth manufacturing apparatus illustrated in each of FIG. 53 and FIG. 56 in the manufacture of the recorded matter. It should be noted that the printing on the transfer material was performed by using a line head-mounted label printer (trade name: "LXP-5500", manufactured by Canon Finetech Inc.). The transfer material after the printing was cut into a sheet shape and a laminating machine (LPD3223 CLIVIA manufactured by FUJITEX Corporation) was used as an apparatus for transferring the transfer material onto the image support.

Example 36

A transfer material and a recorded matter were obtained in the same manner as in Example 21 except that: the transfer material 1 was processed into a cut sheet shape; the thickness of the base material sheet was changed to 120 µm; the thickness of the coloring material-receiving layer was changed to 20 µm; and the eleventh manufacturing apparatus illustrated in each of FIG. 26 and FIG. 27 in which the printer portion and the transferring portion were separated from and independent of each other was used in the manufacture of the recorded matter. It should be noted that the printing on the transfer material was performed by using (PIXUS Pro9500) manufactured by Canon Inc. The transfer of the transfer material onto the image support was performed by using a laminating machine (LPD3223 CLIVIA manufactured by FUJITEX Corporation) as a transfer apparatus.

Example 37

A transfer material and a recorded matter were obtained in the same manner as in Example 21 except that: the transfer material 1 was processed into a roll shape; the thickness of the base material sheet of the transfer material was changed to 10 µm; the thickness of the coloring material-receiving layer was changed to 10 µm; and the eighth manufacturing apparatus illustrated in each of FIG. 53 and FIG. 20 was used in the manufacture of the recorded matter. It should be noted that the printing on the transfer material was performed by using a line head-mounted label printer (trade name: "LXP-5500", manufactured by Canon Finetech Inc.). The transfer of the transfer material onto the image support was performed by using, as a transfer apparatus, a transfer apparatus capable of conveying the transfer material by a roll-to-roll process (trade name: "DC-10", manufactured by Dynic Corporation).

Example 38

A transfer material and a recorded matter were obtained in the same manner as in Example 21 except that: the seventh manufacturing apparatus illustrated in FIG. 52 was used; the surface of the transfer material was treated with a urethane-based primer resin after the printing of the image; and the material for the image support was changed to PET (trade name: "WHITE PET CARD C-0002", manufactured by Goudou Giken).

Example 39

A transfer material and a recorded matter were obtained in the same manner as in Example 21 except that: the surface of the transfer material was treated with a urethane-based primer resin after the printing of the image with the seventh manufacturing apparatus illustrated in FIG. 52; and the material for the image support was changed to POM.

Comparative Example 4

A transfer material and a recorded matter were obtained in the same manner as in Example 21 except that the cationic resin to be used in the preparation of the coloring material-receiving layer was not added.

Comparative Example 5

A transfer material and a recorded matter were obtained in the same manner as in Example 21 except that the image support was changed to a card made of PET (trade name: "WHITE PET CARD C-0002", manufactured by Goudou Giken).

Comparative Example 6

A transfer material and a recorded matter were obtained in the same manner as in Example 21 except that the image support was changed to a card made of POM.

[Evaluation <Absorbability>]

A coloring material-receiving layer was evaluated for its absorbability of a coloring material (ink) by the beading (overflow state) of the ink in a recording surface (the coloring material-receiving layer) upon recording of an image on the image support with a coloring material-receiving layer according to Example or Comparative Example. The evaluation was performed by visual observation and by the following criteria. The results are collectively shown in Table 3 to Table 5.

◯: The coloring material-receiving layer satisfactorily absorbs the coloring material.
Δ: The absorption of the coloring material in the coloring material-receiving layer is slightly poor but no beading occurs.
x: The coloring material-receiving layer is not transferred onto the image support.

[Evaluation <Transferability and Peelability>]

The extent to which a coloring material-receiving layer was transferred, and the extent to which a base material sheet peeled, in the case where the coloring material-receiving layer was transferred onto an image support with the transfer material according to Example or Comparative Example, were evaluated. The evaluation was performed by visual observation and by the following criteria. The results are collectively shown in Table 3 to Table 8.

◯: The coloring material-receiving layer is satisfactorily transferred onto the image support and the base material sheet satisfactorily peels (foil cutting is satisfactory).
Δ: There is a portion where the coloring material-receiving layer is not transferred onto the image support or a portion where the base material sheet does not peel (foil cutting is poor).
x: The coloring material-receiving layer is not transferred onto the image support.

[Evaluation <Conveyability>]

The transfer material according to Example or Comparative Example was evaluated for its conveyability. The evaluation was performed by visually observing the state of the transfer material upon conveyance of the transfer material in each image-recording apparatus or recorded matter-manufacturing apparatus for manufacturing the recorded matter according to Example or Comparative Example, and the evaluation was performed by the following criteria. The results are collectively shown in Table 3 to Table 8.

○: The transfer material is satisfactorily conveyed in the image-recording apparatus or the recorded matter-manufacturing apparatus.

Δ: A wrinkle occurs in part of the transfer material upon conveyance of the transfer material in the image-recording apparatus or the recorded matter-manufacturing apparatus.

x: It is completely impossible to convey the transfer material in the image-recording apparatus or the recorded matter-manufacturing apparatus.

[Evaluation <Lightfastness>]

The recorded matter according to Example or Comparative Example was subjected to a lightfastness test. The recorded matter was loaded into an Atlas fadeometer (conditions: irradiation intensity at a wavelength of 340 nm: 0.39 W/m$^2$, temperature: 45° C., humidity: 50%), and 100 hours after that, the optical density of a Bk ink image was measured with an optical reflection densitometer (trade name: "RD-918", manufactured by GretagMacbeth). Then, a residual OD ratio was calculated from the following formula (A) and evaluated by the following criteria. The results are collectively shown in Table 3 to Table 8.

Residual OD ratio=(OD after test/OD before test)× 100%     Formula (A)

○: The residual OD ratio is 90% or more.
Δ: The residual OD ratio is 60% or more and less than 90%.
x: The residual OD ratio is less than 60%.

TABLE 3

|  | Example 1 | Example 2 | Example 3 | Example 4 | Example 5 | Example 6 | Example 7 | Example 8 |
|---|---|---|---|---|---|---|---|---|
| Inorganic fine particles | HP-14 | HP-14 | HP-14 | HP-14 | HP-14 | HP-14 | HP-14 | HP-14 |
| Water-soluble resin | PVA235 | PVA235 | PVA235 | PVA235 | PVA235 | PVA235 | PVA235 | PVA235 |
| Cationic resin | PAA | PAA-01 | PAA-01 | PAA-01 | PAS01 | Urethane | PAA-05 | PAA-08 |
| (molecular weight) | 1,600 | 1,600 | 1,600 | 1,600 | 1,600 | 1,600 | 5,000 | 8,000 |
| (melting point <° C.>) | 83.3 | 83.3 | 83.3 | 83.3 | −80.0 | 190 | 83.3 | 83.3 |
| Base material sheet thickness (μm) | 30 | 30 | 30 | 30 | 30 | 30 | 30 | 30 |
| Ink-receiving layer thickness (μm) | 15 | 15 | 15 | 15 | 15 | 15 | 15 | 15 |
| Pore volume | 38 | 35 | 38 | 25 | 38 | 38 | 38 | 33 |
| Image support material | PVC | PET-G | Acryl | PVC | PVC | PVC | PVC | PVC |
| Coloring material | Pigment | Pigment | Pigment | Pigment | Pigment | Pigment | Pigment | Pigment |
| Thermal pressure bonding temperature (° C.) | 160 | 160 | 160 | 160 | 160 | 160 | 160 | 160 |
| Primer layer | Absent | Absent | Absent | Absent | Absent | Absent | Absent | Absent |
| SP1 | 1.3 | 1.3 | 1.3 | 1.3 | 1.3 | 1.3 | 1.3 | 1.3 |
| SP2 | 0.2 | 0.2 | 0.3 | 0.2 | 0.2 | 0.2 | 0.2 | 0.2 |
| Manufacturing apparatus | FIG. 12 | FIG. 12 | FIG. 12 | FIG. 12 | FIG. 12 | FIG. 12 | FIG. 12 | FIG. 12 |
| Ink absorbability | ○ | ○ | ○ | Δ | ○ | ○ | ○ | ○ |
| Transferability | ○ | ○ | ○ | ○ | Δ | Δ | ○ | Δ |
| Lightfastness | ○ | ○ | ○ | ○ | ○ | ○ | ○ | ○ |
| Conveyability | ○ | ○ | ○ | ○ | ○ | ○ | ○ | ○ |

TABLE 4

|  | Example 9 | Example 10 | Example 11 | Example 12 | Example 13 | Example 14 | Example 15 | Example 16 | Example 17 |
|---|---|---|---|---|---|---|---|---|---|
| Inorganic fine particles | HP-14 | HP-14 | HP-14 | HP-14 | HP-14 | HP-14 | HP-14 | HP-14 | HP-14 |
| Water-soluble resin | PVA235 | PVA235 | PVA235 | PVA235 | PVA235 | PVA235 | PVA235 | PVA235 | PVA235 |
| Cationic resin | PAA-15 | PAA-01 | PAA-01 | PAA-01 | PAA-01 | PAA | PAA | PAA | PAA |
| (molecular weight) | 15,000 | 1,600 | 1,600 | 1,600 | 1,600 | 1,600 | 1,600 | 1,600 | 1,600 |
| (melting point <° C.>) | 83.3 | 83.3 | 83.3 | 83.3 | 83.3 | 83.3 | 83.3 | 83.3 | 83.3 |
| Base material sheet thickness (μm) | 30 | 30 | 30 | 30 | 30 | 30 | 30 | 15 | 120 |
| Ink-receiving layer thickness (μm) | 15 | 15 | 15 | 15 | 15 | 15 | 20 | 10 | 20 |
| Pore volume | 31 | 38 | 38 | 38 | 28 | 38 | 38 | 38 | 38 |
| Image support material | PVC | PVC | PVC | PVC | PVC | PVC | PVC | PVC | PVC |
| Coloring material | Pigment | Pigment | Pigment | Pigment | Pigment | Dye | Pigment | Pigment | Pigment |
| Thermal pressure bonding temperature (° C.) | 160 | 120 | 180 | 110 | 190 | 160 | 160 | 160 | 160 |
| Primer layer | Absent | Absent | Absent | Absent | Absent | Absent | Absent | Absent | Absent |
| SP1 | 1.3 | 1.3 | 1.3 | 1.3 | 1.3 | 1.3 | 1.3 | 1.3 | 1.3 |
| SP2 | 0.2 | 0.2 | 0.2 | 0.2 | 0.2 | 0.2 | 0.2 | 0.2 | 0.2 |
| Manufacturing apparatus | FIG. 12 | FIG. 12 | FIG. 12 | FIG. 12 | FIG. 12 | FIG. 23 and FIG. 25 Cut | FIG. 23 and FIG. 25 Roll | FIG. 20 and FIG. 23 Cut | FIG. 26 and FIG. 27 Roll |

TABLE 4-continued

|  | Example 9 | Example 10 | Example 11 | Example 12 | Example 13 | Example 14 | Example 15 | Example 16 | Example 17 |
|---|---|---|---|---|---|---|---|---|---|
| Ink absorbability | ○ | ○ | ○ | ○ | Δ | ○ | ○ | ○ | ○ |
| Transferability | Δ | ○ | ○ | Δ | ○ | ○ | ○ | ○ | Δ |
| Lightfastness | ○ | ○ | ○ | ○ | ○ | Δ | ○ | ○ | ○ |
| Conveyability | ○ | ○ | ○ | ○ | ○ | ○ | ○ | ○ | ○ |

TABLE 5

|  | Example 18 | Example 19 | Example 20 | Comparative Example 1 | Comparative Example 2 | Comparative Example 3 |
|---|---|---|---|---|---|---|
| Inorganic fine particles | HP-14 | HP-14 | HP-14 | HP-14 | HP-14 | HP-14 |
| Water-soluble resin | PVA235 | PVA235 | PVA235 | PVA235 | PVA235 | PVA235 |
| Cationic resin | PAA | PAA | PAA | — | PAA | PAA |
| (molecular weight) | 1,600 | 1,600 | 1,600 | — | 1,600 | 1,600 |
| (melting point <° C.>) | 83.3 | 83.3 | 83.3 | — | 83.3 | 83.3 |
| Base material sheet thickness (μm) | 10 | 30 | 30 | 30 | 30 | 30 |
| Ink-receiving layer thickness (μm) | 10 | 15 | 15 | 15 | 15 | 15 |
| Pore volume | 38 | 38 | 38 | 38 | 38 | 38 |
| Image support material | PVC | PET | POM | PVC | PET | POM |
| Coloring material | Pigment | Pigment | Pigment | Pigment | Pigment | Pigment |
| Thermal pressure bonding temperature (° C.) | 160 | 160 | 160 | 160 | 160 | 160 |
| Primer layer | Absent | Present | Present | Absent | Absent | Absent |
| SP1 | 1.3 | 1.3 | 1.3 | 1.3 | 1.3 | 1.3 |
| SP2 | 0.2 | 0.6 | 0.8 | 0.2 | 1.3 | 1.8 |
| Manufacturing apparatus | FIG. 20 and FIG. 23 | FIG. 18 | FIG. 18 | FIG. 12 | FIG. 12 | FIG. 12 |
| Ink absorbability | ○ | ○ | ○ | ○ | ○ | ○ |
| Transferability | ○ | ○ | ○ | x | x | x |
| Lightfastness | ○ | ○ | ○ | ○ | ○ | ○ |
| Conveyability | Δ | ○ | ○ | ○ | ○ | ○ |

TABLE 6

|  | Example 21 | Example 22 | Example 23 | Example 24 | Example 25 | Example 26 | Example 27 | Example 28 |
|---|---|---|---|---|---|---|---|---|
| Inorganic fine particles | HP-14 | HP-14 | HP-14 | HP-14 | HP-14 | HP-14 | HP-14 | HP-14 |
| Water-soluble resin | PVA235 | PVA235 | PVA235 | PVA235 | PVA235 | PVA235 | PVA235 | PVA235 |
| Cationic resin | PAA | PAA | PAA | PAS | Urethane | PAA-05 | PAA-08 | PAA-15 |
| (molecular weight) | 1,600 | 1,600 | 1,600 | 1,600 | 1,600 | 5,000 | 8,000 | 15,000 |
| (melting point <° C.>) | 83.3 | 83.3 | 83.3 | −80 | 190 | 83.3 | 83.3 | 83.3 |
| Base material sheet thickness (μm) | 30 | 30 | 30 | 30 | 30 | 30 | 30 | 30 |
| Ink-receiving layer thickness (μm) | 15 | 15 | 15 | 15 | 15 | 15 | 15 | 15 |
| Image support material | PVC | PET-G | Acryl | PVC | PVC | PVC | PVC | PVC |
| Coloring material | Pigment | Pigment | Pigment | Pigment | Pigment | Pigment | Pigment | Pigment |
| Thermal pressure bonding temperature (° C.) | 160 | 160 | 160 | 160 | 160 | 160 | 160 | 160 |
| Primer layer | Absent | Absent | Absent | Absent | Absent | Absent | Absent | Absent |
| SP1 | 1.4 | 1.4 | 1.4 | 1.4 | 1.4 | 1.4 | 1.4 | 1.4 |
| SP2 | 0.1 | 0.4 | 0.1 | 0.1 | 0.1 | 0.1 | 0.1 | 0.1 |
| Manufacturing apparatus | FIG. 44 | FIG. 44 | FIG. 44 | FIG. 44 | FIG. 44 | FIG. 44 | FIG. 44 | FIG. 44 |
| Transferability | ○ | ○ | ○ | Δ | Δ | ○ | Δ | Δ |
| Conveyability | ○ | ○ | ○ | ○ | ○ | ○ | ○ | ○ |
| Lightfastness | ○ | ○ | ○ | ○ | ○ | ○ | ○ | ○ |

TABLE 7

|  | Example 29 | Example 30 | Example 31 | Example 32 | Example 33 | Example 34 | Example 35 | Example 36 |
|---|---|---|---|---|---|---|---|---|
| Inorganic fine particles | HP-14 | HP-14 | HP-14 | HP-14 | HP-14 | HP-14 | HP-14 | HP-14 |
| Water-soluble resin | PVA235 | PVA235 | PVA235 | PVA235 | PVA235 | PVA235 | PVA235 | PVA235 |
| Cationic resin | PAA | PAA | PAA | PAA | PAA | PAA | PAA | PAA |
| (molecular weight) | 1,000 | 1,000 | 1,000 | 1,000 | 1,000 | 1,000 | 1,000 | 1,000 |
| (melting point <° C.>) | 83.3 | 83.3 | 83.3 | 83.3 | 83.3 | 83.3 | 83.3 | 83.3 |
| Base material sheet thickness (μm) | 30 | 30 | 30 | 30 | 30 | 100 | 15 | 120 |
| Ink-receiving layer thickness (μm) | 15 | 15 | 15 | 15 | 15 | 20 | 10 | 20 |
| Image support material | PVC | PVC | PVC | PVC | PVC | PVC | PVC | PVC |
| Coloring material | Pigment | Pigment | Pigment | Pigment | Dye | Pigment | Pigment | Pigment |
| Thermal pressure bonding temperature (° C.) | 120 | 180 | 110 | 190 | 160 | 160 | 160 | 160 |
| Primer layer | Absent | Absent | Absent | Absent | Absent | Absent | Absent | Absent |
| SP1 | 1.4 | 1.4 | 1.4 | 1.4 | 1.4 | 1.4 | 1.4 | 1.4 |
| SP2 | 0.1 | 0.1 | 0.1 | 0.1 | 0.1 | 0.1 | 0.1 | 0.1 |
| Manufacturing apparatus | FIG. 44 | FIG. 44 | FIG. 44 | FIG. 44 | FIG. 23 and FIG. 25 | FIG. 23 and FIG. 25 Cut | FIG. 53 and FIG. 56 Roll | FIG. 26 and FIG. 27 Cut |
| Transferability | ○ | ○ | Δ | Δ | ○ | ○ | ○ | Δ |
| Conveyability | ○ | ○ | ○ | ○ | ○ | ○ | ○ | ○ |
| Lightfastness | ○ | ○ | ○ | ○ | Δ | ○ | ○ | ○ |

TABLE 8

|  | Example 37 | Example 38 | Example 39 | Comparative Example 4 | Comparative Example 5 | Comparative Example 6 |
|---|---|---|---|---|---|---|
| Inorganic fine particles | HP-14 | HP-14 | HP-14 | HP-14 | HP-14 | HP-14 |
| Water-soluble resin | PVA235 | PVA235 | PVA235 | PVA235 | PVA235 | PVA235 |
| Cationic resin | PAA | PAA | PAA | — | PAA | PAA |
| (molecular weight) | 1,000 | 1,000 | 1,000 | — | 1,000 | 1,000 |
| (melting point <° C.>) | 83.3 | 83.3 | 83.3 | — | 83.3 | 83.3 |
| Base material sheet thickness (μm) | 10 | 30 | 30 | 30 | 30 | 30 |
| Ink-receiving layer thickness (μm) | 10 | 15 | 15 | 15 | 15 | 15 |
| Image support material | PVC | PET | POM | PVC | PET | POM |
| Coloring material | Pigment | Pigment | Pigment | Pigment | Pigment | Pigment |
| Thermal pressure bonding temperature (° C.) | 160 | 160 | 160 | 160 | 160 | 160 |
| Primer layer | Absent | Present | Present | Absent | Absent | Absent |
| SP1 | 1.4 | 1.4 | 1.4 | 1.4 | 1.4 | 1.4 |
| SP2 | 0.1 | 0.6 | 0.8 | 0.1 | 1.3 | 1.8 |
| Manufacturing apparatus | FIG. 26 and FIG. 27 | FIG. 52 | FIG. 52 | FIG. 44 | FIG. 44 | FIG. 44 |
| Transferability | ○ | ○ | ○ | x | x | x |
| Conveyability | Δ | ○ | ○ | ○ | ○ | ○ |
| Lightfastness | ○ | ○ | ○ | ○ | ○ | ○ |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2014-217824, filed on Oct. 24, 2014, No. 2014-217825, filed on Oct. 24, 2014, No. 2015-156741, filed on Aug. 7, 2015 and No. 2015-200612, filed on Oct. 8, 2015 which are hereby incorporated by reference herein in their entirety.

What is claimed is:

1. A transfer material, comprising:
   a coloring material-receiving layer;
   a releasing layer; and
   a base material sheet,
   wherein the transfer material has a laminated structure in which the base material sheet, the releasing layer, and the coloring material-receiving layer are sequentially laminated,
   wherein the coloring material-receiving layer contains at least inorganic fine particles, a water-soluble resin, and a cationic resin having a weight-average molecular weight of 1,000 to 5,000, and wherein the coloring material-receiving layer is capable of being bonded onto an image support and is separable from the releasing layer.

2. The transfer material according to claim 1, wherein the cationic resin has a melting point of 60° C. to 160° C.

3. The transfer material according to claim 1, wherein the cationic resin is a polyallylamine-based resin.

4. The transfer material according to claim 1, further comprising a transparent sheet, wherein, in the laminated structure, the base material sheet, the releasing layer, the transparent sheet, and the coloring material-receiving layer are sequentially laminated, and wherein the transparent sheet and the coloring material-receiving layer are separable from the releasing layer.

5. The transfer material according to claim 4, wherein the cationic resin has a melting point of 60° C. to 160° C.

6. The transfer material according to claim 4, wherein the cationic resin is a polyallylamine-based resin.

7. A recorded matter, comprising:

an image support; and a recording medium having an image recorded thereon, wherein the image is recorded on the coloring material-receiving layer of the transfer material of claim 4, and the recording medium is formed by peeling the base material sheet and the releasing layer, and wherein the recorded matter has a laminated structure in which the image support, the coloring material-receiving layer, and the transparent sheet are sequentially laminated.

8. The recorded matter according to claim 7, wherein the image is formed with a pigment ink.

9. A method of manufacturing a recorded matter comprising an image support and a recording medium having an image recorded thereon, the method comprising:

recording the image on the coloring material-receiving layer of the transfer material according to claim 4;

thermally pressure-bonding the coloring material-receiving layer of the transfer material onto the image support to laminate the coloring material-receiving layer; and peeling the base material sheet and the releasing layer from the transfer material.

10. The transfer material according to claim 1, wherein an amount of the water-soluble resin in the coloring material-receiving layer is 3.3 parts by mass to 20 parts by mass with respect to 100 parts by mass of the inorganic fine particles.

11. The transfer material according to claim 4, wherein an amount of the water-soluble resin in the coloring material-receiving layer is 3.3 parts by mass to 20 parts by mass with respect to 100 parts by mass of the inorganic fine particles.

12. The transfer material according to claim 1, wherein the image support is formed of at least one of polyvinyl chloride, polyethylene terephthalate glycol-modified, and an acrylic resin.

13. The transfer material according to claim 4, wherein the image support is formed of at least one of polyvinyl chloride, polyethylene terephthalate glycol-modified, and an acrylic resin.

14. A method of manufacturing an image support with a coloring material-receiving layer, the coloring material-receiving layer containing at least inorganic fine particles, a water-soluble resin, and a cationic resin having a weight-average molecular weight of 1,000 to 5,000, the method comprising:

thermally pressure-bonding the coloring material-receiving layer of the transfer material according to claim 1 onto the image support to laminate the coloring material-receiving layer; and peeling the base material sheet and the releasing layer from the transfer material after the thermally pressure-bonding the coloring material-receiving layer.

15. A method of manufacturing a recorded matter including an image support and a coloring material-receiving layer having an image recorded thereon, the coloring material-receiving layer containing at least inorganic fine particles, a water-soluble resin, and a cationic resin having a weight-average molecular weight of 1,000 to 5,000, the method comprising:

thermally pressure-bonding the coloring material-receiving layer of the transfer material according to claim 1 onto the image support to laminate the coloring material-receiving layer;

peeling the base material sheet and the releasing layer from the transfer material after the thermally pressure-bonding the coloring material-receiving layer; and recording the image on the coloring material-receiving layer.

* * * * *